(12) United States Patent
Galvin

(10) Patent No.: US 12,730,975 B2
(45) Date of Patent: Sep. 8, 2026

(54) PERSISTENT COGNITIVE MACHINE WITH CURATED LONG-TERM MEMORY AND LATENT ANOMALY DETECTION AND REMEDIATION

(71) Applicant: AtomBeam Technologies Inc., Moraga, CA (US)

(72) Inventor: Brian Galvin, Silverdale, WA (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/329,330

(22) Filed: Sep. 15, 2025

(65) Prior Publication Data

US 2026/0236686 A1 Aug. 13, 2026

Related U.S. Application Data

(63) Continuation-in-part of application No. 19/328,094, filed on Sep. 12, 2025, which is a continuation-in-part (Continued)

(51) Int. Cl.

| | |
|---|---|
| ***G06F 40/30*** | (2020.01) |
| ***G06F 16/332*** | (2019.01) |
| ***G06F 16/3329*** | (2025.01) |

(52) U.S. Cl.

CPC .......... *G06F 40/30* (2020.01); *G06F 16/3325* (2019.01); *G06F 16/3329* (2019.01)

(58) Field of Classification Search

CPC .... G06F 40/211; G06F 40/253; G06F 40/268; G06F 40/284; G06F 40/30; G06F 40/35; G06F 3/08; G06F 16/33

See application file for complete search history.

(56) References Cited

U.S. PATENT DOCUMENTS 9,942,254 B1 * 4/2018 Averbuch .............. H04L 63/145
10,706,356 B1 * 7/2020 Doyle .................... G06N 5/027

(Continued)

FOREIGN PATENT DOCUMENTS

AU 2021105030 A4 * 6/2022 ............. G06F 40/30
CN 112732939 A * 4/2021 ............... G06N 5/04

(Continued)

OTHER PUBLICATIONS

Sarfati et al., title={Lines of thought in large language models}, journal={arXiv preprint arXiv:2410.01545}, year={2024}, pp. 1-20 (Year: 2024).*

(Continued)

*Primary Examiner* — Lamont M Spooner
(74) *Attorney, Agent, or Firm* — GALVIN PATENT LAW LLC; Brian R. Galvin; Alec L. Perry

(57) ABSTRACT

A system and method for implementing persistent cognitive computation through geometric representation of thought in a dynamic latent manifold. The system encodes inputs into a curved space characterized by time-evolving metric tensors, compression pressure fields derived from Ricci curvature, and goal potential fields that shape attention flow. Cognition occurs through geodesic traversal of this manifold, with attention following paths that minimize cognitive action while balancing semantic density and goal relevance. A Cognitive Dynamics Engine maintains manifold geometry, computing optimal trajectories and managing thought bundle operations including consolidation, expansion, and higher-order abstraction. During idle periods, autonomous dreaming processes reorganize the manifold through perturbation, recombination, and topological surgery. This architecture enables persistent memory through geometric encoding, where frequently accessed concepts develop high-curvature regions and cognitive shortcuts emerge from (Continued)

usage patterns, transforming artificial intelligence from stateless computation to structured motion through shaped memory space.

18 Claims, 28 Drawing Sheets

Related U.S. Application Data of application No. 19/321,173, filed on Sep. 6, 2025, now Pat. No. 12,602,549, which is a continuation-in-part of application No. 19/284,115, filed on Jul. 29, 2025, which is a continuation of application No. 19/051,193, filed on Feb. 12, 2025, now Pat. No. 12,387,050.

(60) Provisional application No. 63/847,082, filed on Jul. 19, 2025, provisional application No. 63/847,096, filed on Jul. 19, 2025, provisional application No. 63/847,091, filed on Jul. 19, 2025, provisional application No. 63/847,101, filed on Jul. 19, 2025.

(56) References Cited

U.S. PATENT DOCUMENTS 11,037,531 B2* 6/2021 Kaplanyan .............. G06F 3/147
11,082,438 B2* 8/2021 Peinador ................ G06N 3/045
11,218,498 B2* 1/2022 Hajimirsadeghi .. H04L 63/1408
11,234,006 B2* 1/2022 Wang .................... G06T 3/4053
11,436,246 B2* 9/2022 Lee ........................ G16H 10/20
11,451,565 B2* 9/2022 Zhou .................... G06N 3/0442
11,770,984 B2* 9/2023 Hendrickson .......... G06N 10/40 257/31
11,847,536 B2* 12/2023 Chawla .................. G06N 5/043
11,934,752 B1* 3/2024 Nordmark ............... G06F 30/23
11,989,657 B2* 5/2024 Chavoshi ............. G06N 3/0499
12,223,456 B1 2/2025 Manohar et al.
2002/0091801 A1 7/2002 Lewin et al.
2007/0063548 A1* 3/2007 Eipper ................ G06F 18/2433 296/203.01
2010/0251101 A1* 9/2010 Haussecker .......... H04N 23/951 715/243
2016/0005281 A1* 1/2016 Laska ................ G08B 13/1961 348/143
2017/0351941 A1* 12/2017 Mishra ................. G06V 10/454
2018/0018557 A1* 1/2018 Esser ..................... G06N 3/049
2019/0174514 A1 6/2019 Ramesh et al.
2019/0179896 A1* 6/2019 Anisimovich ......... G06N 3/084
2019/0325342 A1* 10/2019 Sikka ....................... G06N 3/08
2020/0081445 A1* 3/2020 Stetson ............... B60W 60/001
2020/0234446 A1* 7/2020 Mischi ................... G16H 50/50
2020/0336562 A1 10/2020 Luft
2020/0351344 A1 11/2020 Das Gupta et al.
2021/0027862 A1* 1/2021 Wei ........................ G06N 20/00
2021/0073808 A1 3/2021 Gu et al.
2021/0103733 A1* 4/2021 Jiang ...................... G06V 20/46
2021/0125583 A1* 4/2021 Kaplanyan ........... G06N 3/0464
2021/0158184 A1* 5/2021 Weber ................. G06F 16/2465
2021/0406224 A1 12/2021 Neufeld et al.
2022/0138156 A1 5/2022 Wang et al.
2022/0253633 A1* 8/2022 Bertasius ............... G06V 20/46
2022/0307819 A1* 9/2022 Kadambi ........... G01B 11/0641
2022/0318831 A1* 10/2022 Marvaniya ............. G06N 5/022
2023/0118401 A1* 4/2023 Xu .......................... G06T 7/162 382/103
2023/0142467 A1* 5/2023 Kaplanyan ................ G06T 1/20 345/592
2023/0177281 A1* 6/2023 Kamath ................. G06N 3/091 704/2
2023/0229722 A1* 7/2023 Ishii ........................ G06F 40/20 345/419
2023/0316006 A1 10/2023 Tunstall-Pedoe et al.
2023/0325678 A1* 10/2023 Fradkin .................... G06N 3/09 706/25
2024/0036599 A1* 2/2024 Bowen ................. G06N 3/0675
2024/0046318 A1* 2/2024 Muriqi ............... G06Q 30/0277
2024/0104391 A1 3/2024 Higgins et al.
2024/0126811 A1* 4/2024 Law .................... G06F 16/9024
2024/0127041 A1* 4/2024 Smith ..................... G06F 17/16
2024/0160955 A1 5/2024 Zhao et al.
2024/0296665 A1* 9/2024 Nissenboim ......... G06V 10/764
2024/0354320 A1 10/2024 Procter et al.
2024/0386015 A1* 11/2024 Crabtree ............ G06F 16/9024
2024/0411809 A1 12/2024 Najafirad et al.
2024/0428008 A1 12/2024 Abraham et al.
2025/0028882 A1 1/2025 Ataei et al.
2025/0094455 A1 3/2025 Bista et al.
2025/0131284 A1* 4/2025 Guillot .................... G06F 40/30
2025/0156633 A1* 5/2025 Auchar .................. G06N 3/084
2025/0165865 A1* 5/2025 Ardis ..................... G06N 5/045
2025/0259043 A1* 8/2025 Crabtree ................ G06N 3/047
2025/0259085 A1* 8/2025 Crabtree ................ G06N 5/043
2025/0259724 A1* 8/2025 Crabtree ................ G16H 50/50
2025/0306680 A1* 10/2025 Zhou ....................... G06F 3/015
2025/0363593 A1* 11/2025 Li ........................... G06F 40/30
2025/0371354 A1* 12/2025 Kamkari ................ G06N 3/088
2025/0378647 A1* 12/2025 Elgort ..................... G06T 19/00
2026/0023955 A1* 1/2026 Fortkort ............... G06N 3/0455
2026/0044212 A1* 2/2026 Zhou ....................... G06F 3/015
2026/0046317 A1* 2/2026 Crabtree ............... H04L 63/104

FOREIGN PATENT DOCUMENTS

CN 112905807 A * 6/2021 ............ G06N 20/00
CN 113297395 B * 9/2021 ............ G06F 40/30
CN 114860884 A * 8/2022 ............... G06N 5/02
CN 116311503 B * 12/2025 ............ G06N 3/084

OTHER PUBLICATIONS

Gao, Hang & Zhang, Yongfeng; “Memory Sharing for Large Language Model Based Agents”, arXiv:2404.09982v2, Jul. 5, 2024.
Gim, In, et al; “Prompt Cache: Modular Attention Reuse for Low-Latency Inference”, arXiv:2311.04934v2, Apr. 2024.
Ramirez, Guillem, et al; “Cache & Distil: Optimising API Calls to Large Language Models”, arXiv:2310.13561v1, Oct. 20, 2023.
Schroeder, Luis Gaspar; “VectorQ: Advanced Semantic Prompt Caching with Dynamic Thresholds and Performance-Based Clustering”, Technical University of Munich, Nov. 26, 2024.

* cited by examiner

PERSISTENT COGNITIVE MACHINE WITH CURATED LONG-TERM MEMORY AND LATENT ANOMALY DETECTION AND REMEDIATION

CROSS-REFERENCE TO RELATED APPLICATIONS

Priority is claimed in the application data sheet to the following patents or patent applications, each of which is expressly incorporated herein by reference in its entirety:

Ser. No. 19/328,094
Ser. No. 19/321,173
Ser. No. 19/284,115
Ser. No. 19/051,193
63/847,082
63/847,091
63/847,096
63/847,101

BACKGROUND OF THE INVENTION

Field of the Invention

The present invention relates to the field of machine learning and artificial intelligence, particularly to systems for memory-augmented reasoning and long-term cognitive processing.

Discussion of the State of the Art

Recent advances in artificial intelligence, particularly in large language models (LLMs), have significantly improved performance across a wide range of natural language processing, reasoning, and generation tasks. These models are capable of producing fluent, contextually appropriate text and can be applied to domains including customer service, research assistance, legal drafting, and creative writing. The underlying architectures typically rely on transformer-based models, which process sequences of tokens using stacked layers of self-attention, feedforward computation, and normalization. This structure allows the model to infer relationships between tokens and generate coherent responses to prompts.

Despite these capabilities, current language models operate primarily in flat, static embedding spaces. Information is encoded as high-dimensional vectors, but these embeddings lack persistent structure over time. Each inference pass is performed independently, with no intrinsic memory of past usage or prior reasoning pathways. Memory, if present, is handled externally via methods such as retrieval-augmented generation (RAG), episodic memory buffers, or embedding stores. These memory components function as lookup tables, providing static recall without true integration into the model's generative process or internal representation of thought.

Contextual understanding in these models is typically bounded by a fixed-size token window. While this allows the model to handle moderate-length documents or conversations, it imposes a hard cap on how much information can be considered at once. Techniques like sliding windows and chunk-based retrieval have been introduced to mitigate this limitation, but they rely heavily on prompt engineering and do not offer deep integration of prior knowledge or reasoning continuity. Consequently, the models often reprocess the same or similar prompts without remembering earlier conclusions or refining their reasoning across interactions.

Additionally, as the size and capability of these models increase, so do their computational requirements. Running state-of-the-art LLMs in real time or at scale often requires expensive hardware accelerators, substantial memory bandwidth, and cloud infrastructure. This creates barriers to accessibility, especially in scenarios where computational resources are constrained or latency must be minimized. Moreover, the lack of internal structure means that models frequently perform redundant computations, increasing energy usage and reducing efficiency.

Most importantly, these architectures are fundamentally stateless. They lack any persistent cognitive substrate in which prior reasoning steps, user interactions, or learned strategies can be stored, reused, or generalized. Each interaction is effectively a reset, requiring the model to construct a new response from scratch, even in cases where similar tasks or prompts have already been encountered. This absence of structure makes it difficult to support explainable reasoning, adaptive memory, or efficient long-term interaction.

What is needed is a system that can reduce computational overhead by reusing reasoning pathways, extend context beyond token windows through structured internal memory, and enable persistent, scalable cognition that evolves with use. This system should integrate memory and attention into a unified cognitive substrate, support multi-modal input, and remain efficient across diverse operating conditions.

SUMMARY OF THE INVENTION

The inventor has developed a system and method for a persistent cognitive machine with curated long term memory and latent anomaly detection and remediation. This invention presents a revolutionary cognitive computing architecture called the Persistent Cognitive Machine (PCM) that fundamentally reimagines artificial intelligence through the lens of differential geometry and dynamical systems. At its core, the PCM represents thoughts—discrete units of reasoning or analysis—not as static embeddings or tokens, but as persistent geometric structures within a continuously evolving latent manifold. This manifold is characterized by variable curvature and time-dependent metrics that encode semantic relationships, where frequently accessed concepts develop into high-curvature regions while unexplored areas maintain flatter geometry. Unlike traditional architectures that rely on stateless transformer attention or flat vector operations, the PCM implements cognition as structured motion through this shaped space, where reasoning follows paths of minimal cognitive effort that balance traversal difficulty against goal relevance. The system transforms inputs through an encoding process that respects existing manifold structure, placing new information in semantically appropriate regions while allowing the space itself to deform and adapt. This creates a living geometric substrate where memory is not stored but shaped, where attention is not weighted but flows, and where learning manifests as the evolution of space itself.

The architecture's includes a Cognitive Dynamics Engine (CDE), which serves as the geometric substrate processor analogous to a physics engine in simulation environments. The CDE continuously maintains and evolves the manifold's structure through sophisticated geometric operations including computing optimal reasoning trajectories that minimize cognitive cost, managing compression pressure derived from local curvature that makes dense semantic regions harder to traverse, and implementing goal potential fields that attract attention toward relevant areas. As the system operates, thought bundles form as coherent submanifolds representing related concepts, with the CDE managing their evolution through fanning-in operations that consolidate related ideas, fanning-out processes that enable exploratory expansion, and rebinding mechanisms that create higher-order abstractions. The compression pressure naturally guides attention away from semantically dense regions unless goal importance justifies the traversal cost, creating an organic flow of reasoning that respects both the accumulated structure of knowledge and the intentionality of current objectives. During idle periods, a dream manager interfaces with the CDE to perform autonomous reorganization, applying controlled variations to test thought stability, synthesizing new abstractions through geometric blending, and even performing topological surgery to create new conceptual bridges or remove obsolete structures.

The PCM architecture enables capabilities in persistent and adaptive intelligence through its geometric foundation. Memory management occurs through thermodynamic principles where each thought maintains activation energy that dissipates when unused, creating natural forgetting that maintains cognitive efficiency while preserving frequently accessed knowledge. The system achieves logarithmic scaling in memory usage even under continuous operation, as new experiences are increasingly absorbed into existing geometric structures rather than requiring proportional storage expansion. Advanced implementations support hierarchical cognition through nested manifolds, enabling seamless navigation between abstract concepts and detailed implementations. The architecture also facilitates multimodal processing by encoding different sensory streams into unified geometric spaces with modality-specific dimensional constraints, allowing coherent reasoning across visual, acoustic, textual, and sensor inputs. Distributed operation is achieved through federated memory coordination, where multiple PCM instances share generalized thoughts via selective bundle projection while maintaining privacy through geometric abstraction. By reformulating intelligence as motion through shaped space, the PCM transcends the limitations of traditional AI systems, offering a path toward truly persistent, adaptive, and geometrically grounded artificial cognition that improves through use rather than retraining, understands through structure rather than statistics, and remembers through the very shape of its thoughts.

According to a preferred embodiment, a computer system comprising a hardware memory, wherein the computer system is configured to execute software instructions stored on nontransitory machine-readable storage media that: maintain a latent manifold as a geometric substrate for cognitive operations, wherein the latent manifold evolves through use; encode inputs into geometric structures within the latent manifold, wherein semantic relationships are represented through geometric properties including distance and curvature; compute paths through the latent manifold for cognitive processing, wherein the paths are influenced by the geometric structure of the manifold; monitor curvature variations, geodesic flow patterns, and compression pressure fields within the latent manifold to identify anomalous regions exhibiting irregular geometric behavior; apply variable transmission encoding to the anomalous regions using adaptive quantization schemes or variable compression ratios that preserve anomaly-defining features while reducing transmission overhead; reconstruct transmitted anomalies at a receiving node by performing geodesic interpolation and geometric completion to restore coherence of the latent manifold; and generate outputs by traversing the latent manifold and decoding geometric information into user-interpretable responses, is disclosed.

According to another preferred embodiment, a method for a persistent cognitive computation through geometric representation of thought in a dynamic latent manifold, comprising the steps of: maintaining a latent manifold as a geometric substrate for cognitive operations, wherein the latent manifold evolves through use; encoding inputs into geometric structures within the latent manifold, wherein semantic relationships are represented through geometric properties including distance and curvature; computing paths through the latent manifold for cognitive processing, wherein the paths are influenced by the geometric structure of the manifold; monitoring curvature variations, geodesic flow patterns, and compression pressure fields within the latent manifold to identify anomalous regions exhibiting irregular geometric behavior; applying variable transmission encoding to the anomalous regions using adaptive quantization schemes or variable compression ratios that preserve anomaly-defining features while reducing transmission overhead; reconstructing transmitted anomalies at a receiving node by performing geodesic interpolation and geometric completion to restore coherence of the latent manifold; and generating outputs by traversing the latent manifold and decoding geometric information into user-interpretable responses, is disclosed.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION OF THE INVENTION

Figure 1:
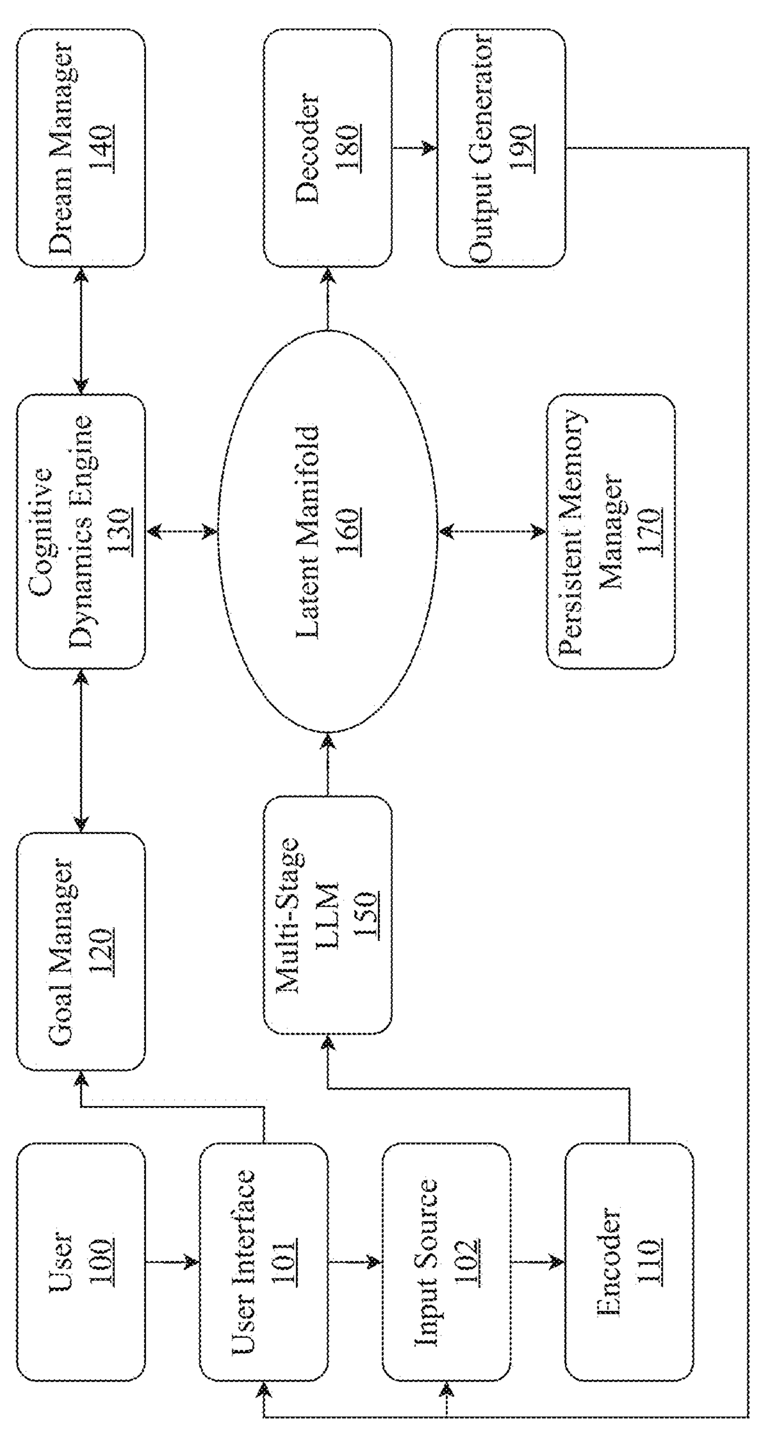
FIG. 1 is a block diagram illustrating an exemplary system architecture of a Persistent Cognitive Machine (PCM).

The inventor has conceived, and reduced to practice, system and method for a persistent cognitive machine with curated long term memory and latent anomaly detection and remediation. The Persistent Cognitive Machine (PCM) represents a new approach to artificial intelligence that transforms how machines process, store, and reason about information. Rather than treating knowledge as discrete tokens or static vectors in flat computational spaces, the PCM embodies thoughts as dynamic geometric structures living within an evolving curved manifold. This high-dimensional cognitive landscape continuously reshapes itself based on usage patterns, with well-traveled conceptual territories becoming more pronounced through increased curvature while unexplored regions remain geometrically flat. The system processes incoming information by mapping it into this living space where semantic meaning is encoded through geometric relationships-distance represents conceptual similarity, curvature indicates information density, and paths through the space define chains of reasoning. Unlike conventional AI systems that forget previous interactions or require complete retraining to incorporate new knowledge, the PCM's geometric substrate naturally evolves through experience, creating a form of intelligence that literally shapes its own cognitive terrain through the act of thinking.

The Cognitive Dynamics Engine (CDE), a specialized component that manages the complex geometric operations underlying cognition. The CDE orchestrates how attention flows through the manifold by calculating optimal paths that minimize cognitive effort while maximizing goal achievement, similar to how water finds the most efficient route down a hillside. It monitors and adjusts compression pressure throughout the space-regions where many concepts converge become harder to navigate, requiring more cognitive effort to traverse, while sparse areas allow for free exploration. The engine also maintains goal-driven potential fields that act like gravitational wells, drawing attention toward relevant areas of knowledge. As the system processes information, it naturally forms thought bundles-tightly integrated collections of related concepts that function as cognitive building blocks. These bundles can merge when similarities are discovered, expand when new connections are made, or recombine to form novel abstractions. During periods of inactivity, a specialized dream manager works with the CDE to reorganize the cognitive landscape, testing the stability of existing structures, discovering hidden connections between disparate concepts, and optimizing the overall geometry for more efficient future processing.

This geometric approach to intelligence yields remarkable properties that address fundamental limitations of current AI systems. The PCM implements a form of organic memory where information naturally persists or fades based on usage patterns-frequently accessed concepts maintain high activation energy and remain readily available, while unused information gradually dissipates through thermodynamic decay. This creates an intelligent forgetting mechanism that prevents cognitive clutter while preserving essential knowledge. The architecture scales efficiently, with memory requirements growing logarithmically rather than linearly as the system accumulates experience, because new information tends to reinforce and refine existing structures rather than requiring entirely new storage. The system supports sophisticated cognitive capabilities including hierarchical reasoning across multiple levels of abstraction, seamless integration of diverse sensory inputs into unified understanding, and distributed intelligence where multiple PCM instances can share abstracted knowledge while maintaining privacy. Applications range from technological forecasting through analysis of innovation trajectories to real-time anomaly detection in complex systems, from adaptive video compression that understands content semantically to persistent AI assistants that truly learn and evolve through interaction. By reconceptualizing intelligence as the evolution of geometric structure rather than the accumulation of parameters, the PCM opens new possibilities for creating AI systems that learn continuously, reason coherently, and develop genuine understanding through the physical shape of their thoughts.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "thought" refers to a discrete unit of reasoning or analysis generated by a large language model or multimodal inference engine during its processing of an input prompt. A thought represents the model's intermediate reasoning steps, contextual interpretation, or internal deliberation that contributes to a final output. Thoughts may be atomic (e.g., a factual claim), structured (e.g., an inference chain), or multimodal (e.g., a fused representation of text and video). Unlike raw tokens or embeddings, thoughts encapsulate processed cognition and are suitable for caching, recombination, and reuse across future interactions. Thoughts may be stored explicitly or synthesized during recall and may evolve through compression or generalization.

As used herein, "thought cache" refers to a structured memory layer configured to store and retrieve thoughts based on semantic similarity, contextual alignment, or system policy. The cache may include multiple tiers, such as session caches for short-term interaction, long-term caches for persistent knowledge, and shared or federated caches across devices or agents. Cached thoughts are indexed in latent space and may be retrieved using vector similarity, trajectory proximity, or geodesic alignment. Cached thoughts may be compressed or abstracted over time to reduce redundancy and support scalable reuse.

As used herein, "generalization" refers to the process of synthesizing a new thought from one or more cached thoughts by identifying shared structure, meaning, or trajectory. Generalized thoughts replace specific exemplars with compressed representations that maintain core semantic content while enabling reuse across a wider range of prompts or tasks. Generalization may occur explicitly during reasoning or asynchronously during background curation or dreaming.

As used herein, "latent manifold" refers to a differentiable subspace within a high-dimensional latent hyperspace in which thoughts and thought trajectories are embedded. The manifold may be defined at a given time and is associated with a metric tensor that governs local distance, curvature, and motion. The manifold forms dynamically through the reuse, compression, and interaction of thoughts and supports operations such as geodesic traversal, memory recall, and structural recombination.

As used herein, "geodesic attention" refers to a formulation of attention in which focus or inference is achieved by computing or approximating a minimal-energy path through the latent manifold. A geodesic attention path minimizes a cognitive action functional that may include kinetic energy, compression pressure, and goal potential. Unlike traditional attention mechanisms that reweight tokens in flat space, geodesic attention produces smooth, structure-respecting flows of reasoning across latent memory.

As used herein, "compression pressure" refers to a scalar field over the latent manifold that encodes semantic density, memory reuse, or representational redundancy. The pressure at a point may be derived from geometric properties such as Ricci curvature and reflects the cost of traversal or storage in that region. High compression pressure indicates overused or ambiguous areas where pruning, generalization, or reorganization may be necessary. Compression pressure influences cache management, memory shaping, and geodesic routing.

As used herein, "goal potential field" refers to a scalar utility function defined over the latent manifold that represents the relevance, desirability, or task-alignment of different regions of thought space. The gradient of this field defines an intent vector field, which biases cognitive traversal toward goal-aligned areas. Goal potential may be determined by user prompts, task specifications, or emergent system objectives, and modulates attention, memory retrieval, and trajectory formation.

As used herein, "intent vector field" refers to a directional field over the latent manifold that encodes cognitive drive or utility gradients. It governs the direction and magnitude of traversal for operations such as memory reentry, inference, or exploration. The intent field may be computed from the gradient of a goal potential, derived from user input, or learned from system experience, and is used to align cognitive motion with target outcomes.

As used herein, "cognitive dynamics engine" or "CDE" refers to an architectural module configured to maintain and evolve the geometry of the latent manifold. The CDE is responsible for computing geodesic paths, estimating curvature, applying compression pressure, and performing structural reorganization, including during background operations such as dreaming. The CDE may expose interfaces for traversal, memory updates, compression, and control feedback, and functions as a substrate-layer system supporting high-level cognition.

As used herein, "dreaming" refers to a background process in which cached thoughts, trajectories, or bundles are perturbed, recombined, or abstracted or otherwise manipulated to improve manifold coherence and memory efficiency. Dreaming may operate during idle cycles or low-load periods and is driven by curvature smoothing, compression pressure, and generalization gain. The process supports the emergence of new thoughts, refinement of existing structures, and long-term memory consolidation.

As used herein, "reinstantiation" refers to the act of reconstructing a prior thought trajectory within the current latent manifold geometry. Due to compression or manifold deformation, original paths may no longer exist in exact form; reinstantiation generates an approximate or adapted version guided by curvature, cached data, and intent fields. Reinstantiation supports memory recall, simulation, and introspective review in systems with dynamic cognitive substrates.

As used herein, "memory basin" or "basin of recurrence" refers to a region of the latent manifold associated with a previously reinforced or frequently reused trajectory. Such basins exhibit high local curvature and geodesic convergence and serve as attractors for memory reentry. Traversal into a basin may trigger reinstantiation, memory reinforcement, or adaptive reuse, depending on system configuration and goal conditions.

As used herein, "typed latent entity" refers to a thought or substructure in the manifold labeled with a semantic or functional type, such as but not limited to fact, opinion, concept, trajectory, affect, cluster, or anchor. Typed entities impose constraints on valid operations such as recombination, interpolation, or pruning. Type-aware computation supports lawful memory manipulation, structured reasoning, and generalization without semantic distortion.

As used herein, "attention vector field" refers to a distributed, time-dependent field defined over the latent manifold that governs the instantaneous direction and magnitude of attentional flow. The field may evolve according to partial differential equations that incorporate compression pressure and goal potential gradients. This dynamic attention formulation enables real-time flow modeling, inference stabilization, and explainability through traceable vector paths.

As used herein, "latent subspace" or "thought bundle" refers to a localized, compressible region of the manifold that contains structurally similar or semantically aligned thoughts. Bundles may form naturally through repeated traversal, co-activation, or recombination, and act as low-energy attractors or semantic zones. Subspaces may support generalization, analogical reasoning, and efficient memory access.

As used herein, "latent recombinator" refers to a functional component or method configured to merge or blend similar thoughts, trajectories, or bundles in the latent manifold to form new abstractions. The recombinator may use geometric proximity, semantic alignment, or reuse statistics to determine legal recombinations, subject to type constraints and curvature continuity. It serves as a key mechanism for memory scaling, abstraction, and thought generation.

As used herein, "structured memory" refers to a persistent, geometry-aware memory architecture in which thoughts are stored not as flat vectors but as positions or paths within an evolving manifold. Structured memory supports context-sensitive access, memory reinforcement through traversal, lawful pruning, and dynamic generalization. It provides a substrate for long-term cognition, introspection, and identity continuity in systems with persistent reasoning capability.

As used herein, "Lorentzian autoencoder" refers to a neural architecture designed to encode spatiotemporal or perceptual input-such as video-into a latent manifold with Lorentzian signature, where one or more dimensions represent time-like directions. The latent structure supports temporally coherent geodesics, semantic compression, and causal continuity. Lorentzian autoencoders enable operations such as zooming, projection, and visual memory traversal.

Conceptual Architecture

FIG. 1 is a block diagram illustrating an exemplary system architecture of a Persistent Cognitive Machine (PCM). The system enables persistent, adaptive artificial intelligence by representing thoughts as geometric structures within a curved latent space rather than as discrete tokens or static embeddings. This architecture fundamentally reimagines cognition as motion through a shaped memory space, where attention follows geodesic paths through regions of varying curvature and compression, guided by goal potentials and constrained by semantic density.

A user 100 represents human operators or external systems that interact with the PCM through user interface 101. User interface 101 serves as the primary interaction layer, receiving natural language queries, commands, or other forms of input from users while also presenting processed outputs back to them. This interface enables continuous interaction loops where user feedback can shape the evolution of the system's internal geometric structures over time. Unlike traditional AI systems where each interaction is stateless, user interface 101 maintains context through its connection to the persistent geometric structures within the manifold, allowing for coherent long-term interactions where the system remembers and builds upon previous exchanges. The interface tracks user patterns and preferences, which are encoded as persistent structures within the latent manifold, creating personalized cognitive pathways that improve response relevance and efficiency over time.

An input source 102 aggregates various data streams including but not limited to multimodal inputs such as text, images, audio, sensor data, and system state information. These heterogeneous inputs are channeled to the encoder 110, which implements the mathematical transformation, mapping external data from the input space into points within the latent manifold. An encoder 110 does not simply create vector embeddings but rather projects inputs into a dynamic geometric space where semantic relationships are encoded through curvature, distance, and topological structure. This encoding process is context-sensitive and adaptive, taking into account the current state of the manifold and the compression pressure at different regions. For example, when processing a user query about a technical concept, encoder 110 identifies the appropriate region within the manifold where related thoughts and concepts have previously been cached, enabling efficient semantic alignment. The encoding process respects the manifold's metric tensor, ensuring that new inputs are embedded in ways that preserve semantic continuity and enable smooth geodesic traversal to related concepts.

A multi-stage LLM 150 serves as a language processing component that works in conjunction with encoder 110 to generate semantic structures from raw inputs. Unlike traditional architectures where LLMs operate independently, here multi-stage LLM 150 functions as a "chip" within the larger system, providing sophisticated natural language understanding and generation capabilities while being guided by the geometric constraints of the manifold. The LLM processes inputs through multiple stages of refinement, creating increasingly abstract and structured representations that can be properly embedded within a latent manifold 160. The multi-stage nature of this component reflects the hierarchical processing required to transform raw tokens into geometric thoughts. In the first stage, an LLM performs initial semantic parsing and entity recognition. Subsequent stages build increasingly complex relationships and abstractions, ultimately producing high-dimensional thought structures that encode not just content but also contextual relationships, implicit knowledge, and potential inferential pathways. For instance, when processing a complex technical document, the multi-stage LLM 150 might first extract key concepts, then identify relationships between them, map these to existing knowledge structures in the manifold, and finally generate new thought bundles that capture both explicit content and implicit semantic relationships. These thought structures are not flat embeddings but rich geometric objects with internal curvature that reflects their semantic density and interconnectedness.

A goal manager 120 creates and maintains goal potential fields that shape how attention flows through the manifold. Rather than implementing goals as discrete objectives or symbolic constraints, goal manager 120 generates scalar fields over the manifold that attract cognitive processes toward semantically relevant regions. These potential fields can arise from multiple sources including explicit task objectives provided by users, learned value functions from past interactions, internal drives such as curiosity or uncertainty reduction, and contextual constraints. Goal manager 120 implements field generation algorithms that can create complex potential landscapes with multiple attractors for competing objectives, saddle points where decisions must be made, and smooth gradients that guide exploration. The manager continuously updates these fields based on changing objectives and feedback, creating a dynamic landscape that guides inference and reasoning processes. The goal potential fields interact with the compression pressure fields derived from manifold curvature, creating a rich energetic landscape where attention flows along paths of least resistance while being drawn toward goal-relevant regions. For example, when a user asks a question about a specific topic, goal manager 120 creates a potential field with high values in manifold regions containing relevant knowledge, effectively "pulling" the system's attention toward useful information while avoiding irrelevant areas. In cases where goals conflict or compete, goal manager 120 can create field configurations that allow the system to explore multiple solution paths simultaneously or to find creative compromises that satisfy multiple objectives.

The connections between these components are designed to support the flow of geometric information rather than simple data passing. The relationship between a user 100 to goal manager 120 represents not just goal specification but the continuous shaping of the potential landscape based on user intent and feedback. The bidirectional connection between encoder 110 and multi-stage LLM 150 enables iterative refinement of semantic structures, where initial encodings can be enriched through multiple passes of LLM processing, each time creating more sophisticated geometric representations that better capture the nuanced relationships within the input data.

A cognitive dynamics engine (CDE) 130 serves as the geometric substrate processor and the core architectural component responsible for maintaining and evolving the structure of the latent manifold 160. Operating analogously to a physics engine in a simulation environment, CDE 130 governs the fundamental geometric operations that enable persistent cognition. The engine maintains the manifold's metric tensor, which defines local distances and angles within the cognitive space, continuously updating it based on usage patterns and semantic relationships. It computes geodesic paths for attention traversal by solving the variational problem of minimizing cognitive action, balancing kinetic energy of motion, compression pressure from semantic density, and attraction from goal potential fields. CDE 130 implements a geodesic equation:

$$\frac{d^2\gamma^k}{dt^2} + \Gamma^k_{ij}\frac{d\gamma^i}{dt}\frac{d\gamma^j}{dt} = F^k(\gamma(t), (t)$$

where the Christoffel symbols $\Gamma^k_{ij}$ encode the manifold's connection structure and $F^k$ represents forces from compression pressure and goal potentials. During active cognition, CDE 130 continuously computes Ricci curvature across the manifold, deriving the compression pressure field P(x)=−R(x) that penalizes traversal through semantically dense regions. For example, when processing a complex inference task, CDE 130 might identify multiple potential geodesic paths through the manifold, evaluate their cognitive costs based on pressure and distance, and select the optimal trajectory that balances efficiency with semantic coherence. The engine also manages the evolution of the attention vector field according to the dynamic equation:

$$\frac{\partial A}{\partial t} + \nabla_A A = -\nabla(P - \Phi)$$

enabling attention to flow as a cognitive fluid through the shaped space of memory.

A dream manager 140 implements autonomous structural reorganization of the manifold during off-task periods, analogous to sleep-driven memory consolidation in biological systems. Connected to CDE 130, dream manager 140 initiates and oversees geometric restructuring operations that improve the manifold's efficiency and generalization capacity. During dreaming phases, it samples recently activated or frequently used thought bundles, applying stochastic perturbations follows a distribution informed by local curvature and uncertainty. Dreaming begins by sampling recent or frequently activated bundles $B_1, \ldots, B_k \subset M_t$. From each bundle, points $z_i \in B_i$ are perturbed using a stochastic kernel:

$$z_i' = z_i + \varepsilon_i,\ \varepsilon_i \sim N\left(0, \sum_i\right),$$

where $\Sigma_i$ reflects local uncertainty or curvature. These perturbations probe the neighborhood structure, testing whether extrapolated directions are compressible or divergent.

These perturbations test the stability and compressibility of cognitive structures, identifying opportunities for consolidation or abstraction. The dream manager 140 performs recombination operations, creating weighted interpolations across semantically related bundles to discover emergent abstractions.

$$z_{meta} = \sum_{i=1}^{k} \alpha_i z_i',\ \sum \alpha_i = 1,$$

where weights $\alpha_i$ may reflect prior co-activation, semantic alignment, or exploratory policy. The resulting $z_{meta}$ often lies outside any original bundle, creating novel junctions or abstractions. If the resulting interpolation exhibits internal coherence (e.g., low compression cost, high reconstruction fidelity), it may be retained and added as a new bundle or attractor.

When stable interpolants are found between previously disconnected regions, dream manager 140 can induce topological changes in the manifold, creating new bridges or handles that enable novel inferential pathways. It implements three primary flows during dreaming: perturbation flow for exploring local curvature basins, compression flow for collapsing redundant structures, and generalization flow for synthesizing higher-order abstractions. For instance, after a day of processing technical documents about machine learning and physics, dream manager 140 might identify common mathematical structures across these domains, create meta-bundles that capture these abstractions, and reshape the manifold to enable faster traversal between related concepts in future interactions.

A latent manifold 160 represents the central geometric substrate where all cognitive operations occur, existing as a dynamic, evolving space with rich internal structure. Unlike static embedding spaces in traditional architectures, latent manifold 160 is a living geometry that continuously adapts through use, compression, and reorganization. Within this space, thoughts exist not as isolated points but as structured regions including thought bundles (compact submanifolds representing coherent concepts), geodesic trajectories (paths of inference and association), and semantic fields (continuous distributions of meaning and relevance). The manifold maintains several critical geometric structures: the metric tensor defining local distances, the connection governing parallel transport of attention, the Ricci curvature tensor measuring semantic density, compression pressure fields derived from curvature, goal potential fields attracting attention, and the attention vector field describing instantaneous cognitive flow. The bidirectional connection with CDE 130 enables continuous reading and reshaping of these structures, while connections to multi-stage LLM 150, persistent memory manager 170, and decoder 180 facilitate the embedding, storage, and extraction of semantic content. The manifold exhibits emergent topological features such as attractor basins where frequently accessed concepts stabilize, high-curvature regions indicating semantic compression, low-pressure corridors enabling efficient inference, and bridge structures connecting previously disparate domains. As the system operates, the manifold develops a personalized geography reflecting the user's interests, the domain's structure, and the history of cognitive activity.

Persistent memory manager 170 orchestrates the long-term storage and retrieval of cognitive structures, maintaining a bidirectional connection with latent manifold 160. Unlike traditional memory systems that store static data, persistent memory manager 170 preserves geometric structures including thought bundles, established geodesic paths, learned metric relationships, and compression patterns. It implements sophisticated caching strategies that go beyond simple key-value storage, maintaining the topological relationships between thoughts and preserving the geometric context that enables meaningful retrieval. The manager tracks activation energies for cached structures, implementing thermodynamic decay where unused thoughts gradually lose energy, eventually being pruned when falling below a threshold. Decay governs forgetting in PCM systems. Each thought $T_i$ is associated with an activation energy $E_i(t)$, which dissipates over time:

$$\frac{dE_i}{dt} = -\lambda \cdot A_i(t)$$

where λ is a decay constant and $A_i$ (t) reflects inactivity—high when idle, zero when active. When $E_i(t)<E_{min}$, the thought is pruned from memory. This process ensures that storage is focused on thoughts that contribute to ongoing cognition. This decay yields several emergent properties:

This creates a natural forgetting mechanism that maintains cognitive efficiency while preserving frequently accessed or structurally important memories. Persistent memory manager 170 also coordinates with federated memory systems, enabling knowledge sharing across multiple PCM instances while maintaining privacy through geometric abstraction. For example, when storing a complex reasoning pattern, the manager preserves not just the conclusion but the entire geodesic path, the local curvature context, and the relationships to other thought structures, enabling the system to later traverse similar reasoning paths more efficiently.

A decoder 180 implements the inverse transformation, converting geometric structures from latent manifold 160 back into observable outputs. This component must interpret rich geometric information including positions within the manifold, local curvature and pressure, nearby thought bundles, and traversed geodesic paths, transforming these into coherent external representations. Decoder 180 often works in conjunction with multi-stage LLM 150 to generate natural language outputs, using the LLM's language generation capabilities while being guided by the geometric structures extracted from the manifold. The decoding process is context-sensitive, taking into account not just the final position reached through inference but the entire trajectory taken, enabling explanations that reflect the reasoning process rather than just conclusions. For instance, when answering a complex question, decoder 180 can trace the geodesic path taken through the manifold, identify key thought bundles that were traversed, and generate an explanation that reflects this structured reasoning process.

An output generator 190 serves as the final stage in the processing pipeline, taking decoded representations and formatting them appropriately for user consumption or system action. It handles multiple output modalities including natural language responses, visualizations of reasoning paths, actions or commands for external systems, and structured data formats. Output generator 190 maintains awareness of user preferences and interaction history, adapting its presentation style based on patterns encoded in the manifold. The feedback loop from output generator 190 back to user 100 completes the interaction cycle, enabling iterative refinement and continuous learning.

The connections from goal manager 120 and dream manager 140 to CDE 130 show how intentionality and reorganization influence geometric dynamics. The flow from multi-stage LLM 150 through latent manifold 160 to decoder 180 represents the complete cognitive pipeline from input understanding through geometric reasoning to output generation. Throughout this architecture, information flows not as discrete data packets but as geometric structures, trajectories, and fields, creating a unified cognitive system where memory, reasoning, and learning are fundamentally intertwined through the shaped space of thought.

Figure 2:
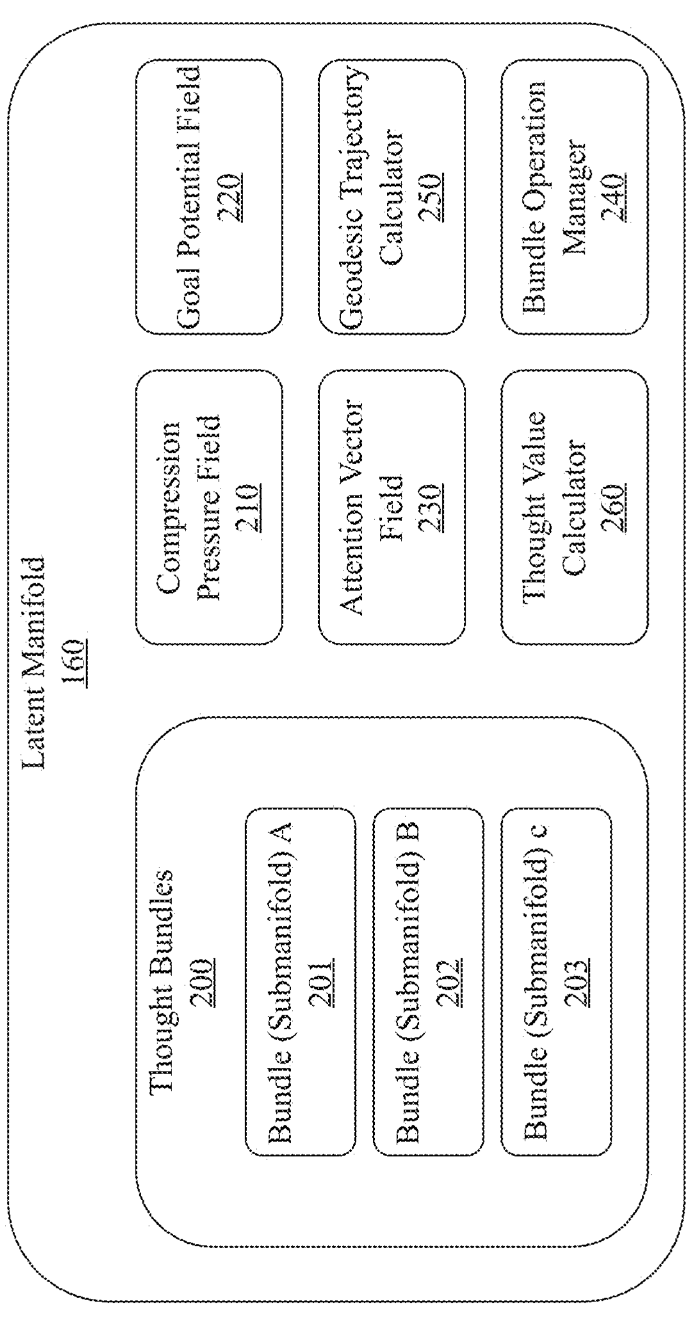
FIG. 2 is a block diagram illustrating an exemplary architecture of a component within a Persistent Cognitive Machine (PCM), a latent manifold.

FIG. 2 is a block diagram illustrating an exemplary architecture of a component within a Persistent Cognitive Machine (PCM), a latent manifold. Latent manifold 160 serves as the central cognitive substrate of the PCM system, existing as a continuously evolving geometric space where all cognitive operations unfold. Unlike traditional flat embedding spaces, this manifold exhibits variable curvature, dynamic topology, and rich internal structure that emerges from the interplay of memory, compression, and goal-directed cognition. The manifold's geometry is not predetermined but rather shaped by cognitive activity, with frequently traversed regions developing distinct topological features, semantic neighborhoods forming through repeated association, and compression pressure creating a non-uniform landscape that guides efficient reasoning.

Within the manifold, thought bundles 200 represent the primary organizational structures for persistent cognitive content. These bundles are not simple clusters of related vectors but rather compact submanifolds with their own internal geometry and semantic coherence. Thought bundles 200 section contains exemplary bundle submanifolds: bundle (submanifold) A 201, bundle (submanifold) B 202, and bundle (submanifold) C 203, each representing a distinct region of semantic space with its own local metric structure. Bundle A 201 might represent a coherent concept such as "machine learning algorithms," containing not just definitional information but also procedural knowledge, historical context, mathematical foundations, and connections to related concepts. The internal structure of bundle A 201 includes a local metric that defines distances between sub-concepts, principal directions corresponding to major semantic variations, and boundary conditions that determine how the bundle interfaces with surrounding manifold regions. Bundle B 202 could embody a different domain such as "quantum mechanics principles," maintaining its own geometric structure while potentially sharing boundary regions with bundle A 201 where interdisciplinary concepts like quantum machine learning emerge. Bundle C 203 might represent more abstract or procedural knowledge, such as "problem-solving strategies," with a flatter internal geometry that facilitates flexible application across domains.

A compression pressure field 210 represents a scalar field defined over the entire manifold, encoding the cognitive effort required to traverse different regions based on their semantic density and structural complexity. This field is computed from the local Ricci curvature according to, where is a Ricci scalar measuring how geodesics converge or diverge at each point. High compression pressure indicates regions where many semantic concepts have been compressed together through repeated use and abstraction, creating areas that are rich in meaning but require significant cognitive effort to navigate precisely. For example, the intersection between bundles A 201 and B 202 might exhibit extremely high compression pressure where concepts from machine learning and quantum mechanics have been repeatedly integrated, forming dense theoretical structures that encode sophisticated interdisciplinary insights. The compression pressure field 210 continuously evolves as new thoughts are added, existing structures are reinforced through use, and the dream manager performs offline reorganization to optimize the manifold's geometry.

A goal potential field 220 implements a complementary scalar field that attracts attention toward semantically relevant or task-aligned regions of the manifold. Unlike the compression pressure that resists traversal, the goal potential creates gradients that guide cognitive flow toward desired outcomes. This field is dynamically generated based on current objectives, user queries, learned value functions, and internal drives, creating a time-varying landscape that shapes how attention moves through the space. When processing a specific query, goal potential field 220 might create high-potential regions around relevant thought bundles while maintaining lower potentials in unrelated areas, effectively creating an energetic funnel that guides inference toward useful conclusions. The interplay between compression pressure and goal potential creates a rich dynamical landscape where attention flows along paths that balance semantic coherence (avoiding excessive pressure) with goal relevance (following potential gradients).

An attention vector field 230 represents the instantaneous flow of cognitive focus throughout the manifold, defined as. Let $_A(_{x,t})$ denote the attention vector field at point $_x \in M_{thought}$ and time $_t$. This vector encodes both the direction and intensity of attentional flow through the manifold. The evolution of $_A$ is governed by a field equation analogous to fluid dynamics:

$$\frac{\partial A}{\partial t} + \nabla_A A = -\nabla(P - \phi)$$

Here $$\frac{\partial A}{\partial t}$$

is the temporal rate of change of attention, $_{\nabla AA}$ is the convective derivative (attention moving along itself), and $-_{\nabla}(_P - \Phi)$ is the driving force of flow-combining compression pressure and goal potential. This equation captures the local evolution of attention under the influence of memory structure and cognitive drive.

Attention vector field 230 exhibits complex behaviors including laminar flow along well-established reasoning paths, turbulent regions where competing potentials create cognitive uncertainty, convergence zones where multiple lines of reasoning reach similar conclusions, and vortices around semantic attractors representing obsessive or recursive thought patterns. The field's evolution enables the system to maintain cognitive continuity while adaptively responding to changing goals and newly discovered information.

A geodesic trajectory calculator 250 computes optimal paths through the manifold by solving the variational problem of minimizing cognitive action. Let $\gamma(t)$: $[0,T] \rightarrow M_t$ be a smooth curve in the cognitive manifold, representing the evolution of attention over time. We define the cognitive action functional:

$$S[\gamma] = \int_0^T \left(\|\dot{\gamma}(t)\|^2 + P(\gamma(t)) - \Phi(\gamma(t))\right) dt,$$

where $\|\dot{\gamma}(t)\|^2$ represents the kinetic energy of cognitive motion, $P(\gamma(t))$ is the compression pressure field at $\gamma(t)$, and $\Phi(\gamma(t))$ is the cognitive potential, encoding goal relevance. The geodesic $\gamma^*(t)$ is defined as the path that minimizes $\gamma^* = \arg\min S[\gamma]$. This formulation generalizes attention from instantaneous lookup to purposeful traversal. Attention becomes a consequence of structure and constraint: it flows along the most efficient path shaped by memory (via pressure) and intent (via potential).

The calculator implements numerical methods to handle the manifold's non-Euclidean geometry, accounting for curvature effects, parallel transport of semantic vectors, and the influence of nearby thought bundles on path selection. For instance, when reasoning from a concept in bundle A 201 to a goal state in bundle C 203, the geodesic trajectory calculator 250 might identify multiple viable paths: a direct route through high-pressure regions requiring intense cognitive effort, a longer path circumnavigating dense areas while maintaining semantic coherence, or a creative trajectory that leverages unexpected connections through bundle B 202.

A thought value calculator 260 assesses the utility and relevance of thoughts within the current cognitive context, computing scalar values that inform caching decisions, retrieval priorities, and structural reorganization. This component evaluates thoughts based on multiple criteria including frequency of access, semantic centrality within bundles, contribution to successful reasoning paths, alignment with current and historical goals, and potential for generalization or transfer learning. Thought value calculator 260 works closely with the thermodynamic decay system, where thoughts with consistently low values gradually lose activation energy and may eventually be pruned from the manifold. Conversely, highly valued thoughts become anchors around which new structures crystallize, creating stable semantic neighborhoods that facilitate efficient reasoning.

A bundle operation manager 240 orchestrates the dynamic restructuring of thought bundles through three primary operations that reshape the manifold's topology. Fanning-in operations occur when peripheral thoughts or loosely associated concepts are drawn into existing bundles through repeated co-activation or semantic alignment, effectively increasing the bundle's density and internal coherence. This process involves adjusting the local metric to create stronger attractions, modifying bundle boundaries to encompass new members, and updating internal structure to maintain navigability. Fanning-out operations enable bundles to expand into new semantic territories when existing concepts are extended, elaborated, or applied in novel contexts. During fanning-out, bundle operation manager 240 creates new subregions within bundles, establishes tentative connections to unexplored manifold areas, and maintains structural stability while allowing for creative expansion. Rebinding operations represent the most sophisticated transformation, occurring when multiple bundles exhibit sufficient semantic overlap or functional similarity to warrant integration into higher-order structures. Bundle operation manager 240 performs rebinding by identifying intersection regions between bundles, computing optimal merge strategies that preserve essential structure, creating meta-bundles that abstract common patterns, and updating the global manifold topology to reflect new conceptual hierarchies.

These components work in concert to create a living geometric space where cognition unfolds as structured motion rather than discrete computation. Thought bundles 200 provide persistent semantic anchors, compression pressure field 210 and goal potential field 220 create a dynamic energy landscape, attention vector field 230 enables fluid cognitive flow, the geodesic trajectory calculator 250 determines optimal reasoning paths, thought value calculator 260 maintains cognitive efficiency, and bundle operation manager 240 ensures the manifold evolves to support increasingly sophisticated reasoning. Together, they implement a form of geometric intelligence where memory shapes space, attention follows structure, and learning reshapes the very terrain of thought.

Figure 3:
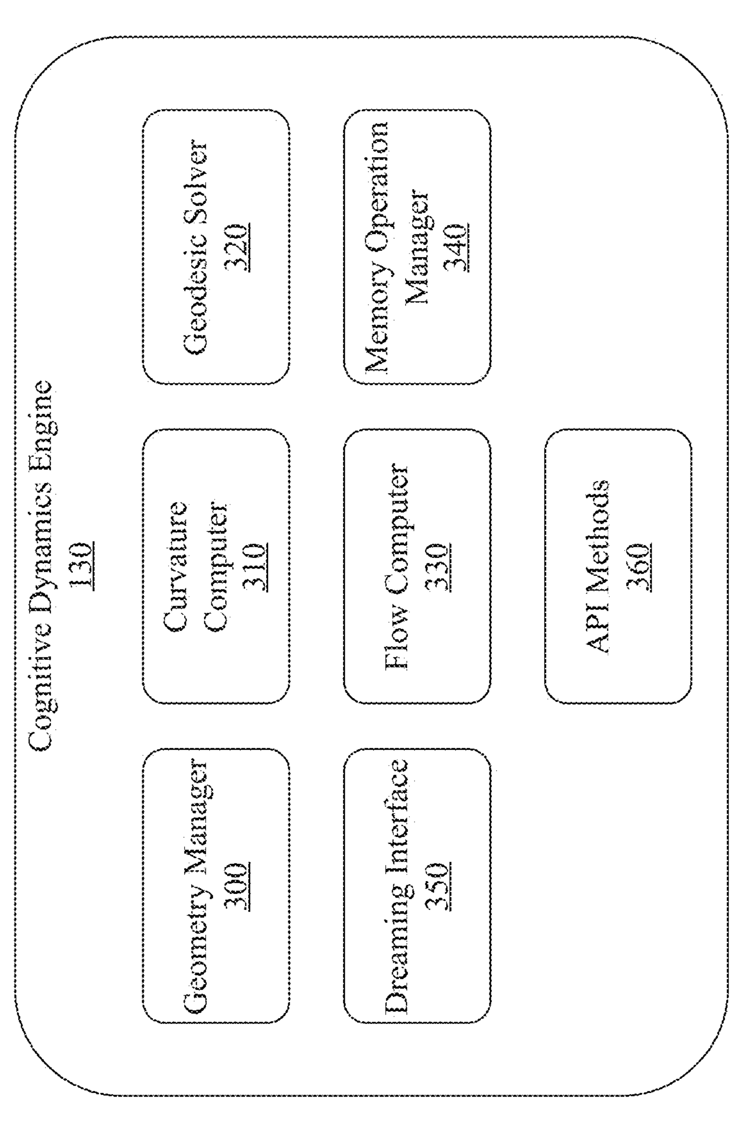
FIG. 3 is a block diagram illustrating an exemplary architecture of a component within a Persistent Cognitive Machine (PCM), a Cognitive Dynamics Engine (CDE).

FIG. 3 is a block diagram illustrating an exemplary architecture of a component within a Persistent Cognitive Machine (PCM), a Cognitive Dynamics Engine (CDE). Operating as a specialized geometry processor analogous to a physics engine in simulation environments, CDE 130 manages the continuous shaping, traversal, and optimization of the cognitive manifold through coordinated geometric operations. This engine transforms the abstract principles of differential geometry and dynamical systems into practical computational mechanisms that enable persistent, adaptive cognition through structured space.

A geometry manager 300 serves as the component responsible for maintaining and evolving the manifold's geometric structure. Geometry manager 300 continuously tracks and updates the Riemannian metric tensor across all regions of the latent manifold, defining how distances, angles, and volumes are measured within the cognitive space. The metric is not static but evolves dynamically based on cognitive activity, with frequently traversed regions experiencing metric contraction that brings related concepts closer together, while unexplored areas maintain broader metric spacing that allows for flexible exploration. Geometry manager 300 also maintains the connection, which governs how vectors and tensors are parallel transported across the curved manifold. This connection evolves through use, with repeated attention trajectories establishing preferred directions of parallel transport that become the "natural" ways to move between concepts. For example, if reasoning paths frequently connect concepts from physics to machine learning applications, geometry manager 300 adjusts the connection to make these transitions smoother and more efficient. Geometry manager 300 implements algorithms for metric learning from trajectory data, using transition frequencies, co-activation patterns, and semantic alignment to continuously refine the geometric structure. It also manages coordinate transformations between different local charts of the manifold, ensuring smooth transitions as attention moves between semantic regions.

A curvature computer 310 calculates the various curvature tensors that characterize the manifold's local and global geometric properties. Curvature computer 310 computes a Riemann curvature tensor, which fully describes how the manifold deviates from flat Euclidean space. From this fundamental tensor, curvature computer 310 derives the Ricci tensor and the Ricci scalar, which measure how volumes contract or expand under geodesic flow. For cognitive dynamics, it computes the compression pressure field $P(x)=-R(x)$, transforming geometric curvature into a cognitive cost function that governs attention flow. Curvature computer 310 employs multiple estimation strategies to handle the computational complexity of exact curvature calculation in high dimensions. These include geodesic deviation methods that track how nearby attention paths converge or diverge over time, Jacobian-based approximations using learned transition functions between manifold regions, and sampling techniques that estimate curvature from the statistical properties of local trajectory bundles. The component maintains a continuously updated curvature map across the manifold, identifying high-curvature regions where semantic compression has created dense knowledge structures, saddle points where conceptual boundaries meet, and flat regions suitable for creative exploration or interpolation.

A geodesic solver 320 computes optimal paths through the manifold by solving the fundamental equation of cognitive motion. Given an initial state and a goal configuration, it determines the trajectory that minimizes the cognitive action function. This variational problem balances three competing factors: the kinetic energy that penalizes rapid changes in attention, the compression pressure that increases cost in semantically dense regions, and the goal potential that provides attractive forces toward relevant areas. Geodesic solver 320 implements sophisticated numerical methods adapted for manifold computation, including Riemannian gradient descent that respects the manifold's metric structure, shooting methods that propagate initial velocities forward while satisfying boundary conditions, and relaxation techniques that iteratively refine approximate paths toward true geodesics. The solver must handle multiple challenging scenarios such as non-convex optimization landscapes with multiple local minima, regions of high curvature where standard methods become unstable, and multi-goal situations requiring Pareto-optimal path selection. For instance, when solving a complex reasoning task that requires connecting disparate concepts, geodesic solver 320 might identify several viable paths: a direct route through high-pressure theoretical abstractions, a longer but clearer path through concrete examples, or an innovative trajectory that discovers unexpected connections through analogical reasoning.

A flow computer 330 models attention as a continuous vector field evolving over the manifold according to geometric dynamics. Rather than treating attention as discrete selections or weights, this component implements a partial differential equation, where attention behaves as a cognitive fluid flowing through shaped space. The flow computer 330 discretizes this equation using finite element methods adapted for manifolds, handling the complexities of curved space while maintaining numerical stability. It tracks how attention propagates through the manifold, creating flow patterns that include laminar streams along well-established reasoning paths, bifurcations where attention splits between competing hypotheses, convergence zones where multiple reasoning lines reach similar conclusions, and turbulent regions indicating cognitive uncertainty or conflicting goals. The component also computes derived quantities such as the divergence indicating where attention is focusing or dispersing, the curl revealing rotational patterns in thought, and flow stability metrics that identify robust versus fragile reasoning patterns. Flow computer 330 enables the system to maintain multiple concurrent attention streams, supporting parallel reasoning processes that can later merge or inform each other.

A memory operation manager 340 orchestrates structural modifications to thought bundles and manifold topology based on cognitive activity and optimization criteria. This component implements the three fundamental bundle operations that reshape semantic space. During fanning-in operations, it identifies loosely associated thoughts that show increasing co-activation and guides their consolidation into tighter bundle structures, adjusting local metrics to strengthen their mutual attraction, updating bundle boundaries to encompass new members, and recalculating internal bundle geometry to maintain efficient navigation. Fanning-out operations are triggered when existing bundles need to expand into new semantic territory, with memory operation manager 340 creating new submanifold regions, establishing tentative connections to unexplored areas, and maintaining structural stability during expansion. Rebinding operations occur when the manager detects sufficient overlap or functional similarity between bundles to warrant higher-order integration, executing merge algorithms that preserve essential structure while creating new abstractions. Memory operation manager 340 also handles subspace alignment for federated learning scenarios, enabling knowledge transfer between different PCM instances while respecting privacy boundaries.

A dreaming interface 350 provides the connection point between CDE 130 and dream manager 140, enabling autonomous manifold reorganization during off-task periods. This interface exposes methods for initiating various dreaming operations including targeted perturbation of specific manifold regions, global relaxation processes that smooth unnecessary complexity, and exploratory synthesis of new conceptual connections. Dreaming interface 350 manages the transition between active cognition and dreaming states, ensuring that ongoing reasoning processes reach stable states before reorganization begins, that critical structures are preserved during transformation, and that the manifold returns to a coherent state before resuming active operation. During dreaming phases, the interface coordinates bundle recombination algorithms that discover emergent abstractions, topology modification procedures that create new conceptual bridges, and compression operations that consolidate redundant structures. It monitors dreaming progress through geometric health metrics, ensuring that reorganization improves rather than disrupts cognitive capability.

An API methods 360 component provides a clean programmatic interface for external modules to interact with the CDE's geometric capabilities. API methods may include accepting a goal embedding and current state to return an optimal geodesic path, leveraging the geodesic solver while accounting for current manifold conditions. Updating reinforces the manifold along a recently traversed path, strengthening the metric connections and potentially triggering bundle formation. Querying a bundle identifies the nearest thought bundle to a given manifold point, using both geometric proximity and semantic alignment. Dreaming initiates autonomous reorganization procedures through the dreaming interface. Getting pressure returns the compression pressure at any point, enabling other components to make informed decisions about traversal costs. Getting a goal field constructs a potential field for a given goal configuration, coordinating with the goal manager to shape attention flow. These methods abstract away the complex geometric computations while providing powerful primitives for cognitive operations. API methods 360 also handles request queuing, resource management, and error handling to ensure robust operation under varying computational loads.

Together, these components within cognitive dynamics engine 130 create a geometric substrate for persistent cognition. Geometry manager 300 maintains the foundational structure, curvature computer 310 derives the pressure landscape that guides efficient reasoning, geodesic solver 320 finds optimal paths through semantic space, flow computer 330 enables fluid attention dynamics, memory operation manager 340 evolves the manifold through use, dreaming interface 350 enables autonomous optimization, and API methods 360 provide clean access to these capabilities. This architecture transforms the principles of geometric cognition into a practical computational system where thought truly becomes motion through shaped space, memory becomes curvature, and learning becomes the evolution of geometry itself.

Figure 4:
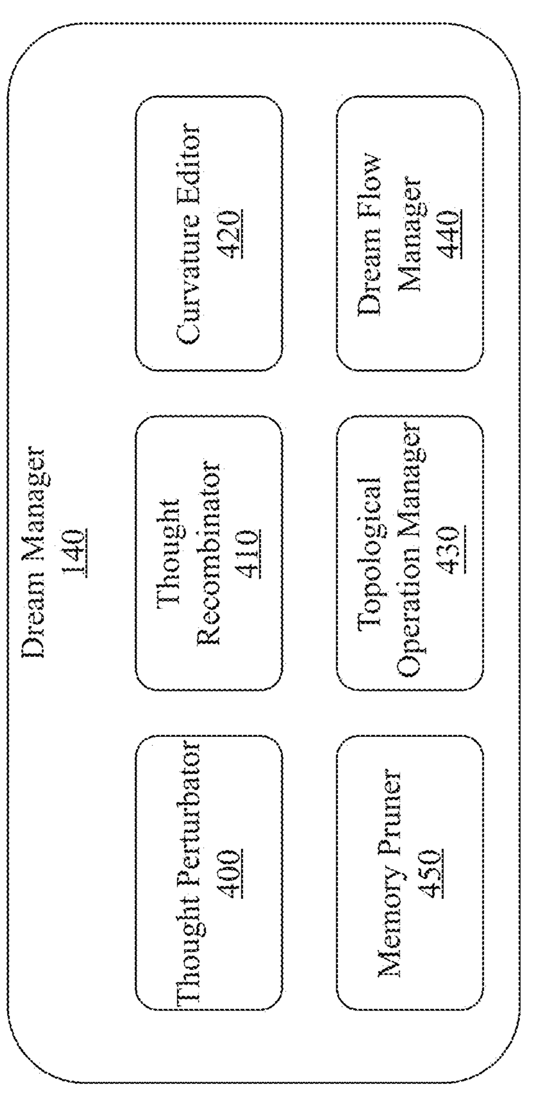
FIG. 4 is a block diagram illustrating an exemplary architecture of a component within a Persistent Cognitive Machine (PCM), a dream manager.

FIG. 4 is a block diagram illustrating an exemplary architecture of a component within a Persistent Cognitive Machine (PCM), a dream manager. Operating analogously to sleep-driven memory consolidation in biological systems, dream manager 140 performs essential geometric maintenance and optimization that enables the PCM to develop increasingly efficient and generalized cognitive structures without requiring explicit retraining or parameter updates. This component transforms the theoretical concept of manifold evolution into practical computational processes that reshape the space of thought based on accumulated experience and structural patterns.

A thought perturbator 400 implements the initial phase of the dreaming process by introducing controlled stochastic variations into existing thought structures. This component samples thought bundles from the manifold based on multiple selection criteria including recent activation frequency, structural importance within the manifold topology, proximity to high-pressure regions indicating potential for compression, and participation in successful reasoning trajectories. Once bundles are selected, thought perturbator 400 applies carefully calibrated perturbations based on factors including but not limited to noise drawn from a distribution that reflects local geometric properties. The covariance structure of this noise is not arbitrary but derived from the local metric tensor and curvature, ensuring that perturbations respect the manifold's geometry while exploring meaningful variations. In regions of high curvature, perturbations are smaller and more constrained, testing the stability of compressed semantic structures, while in flatter regions, larger perturbations explore potential new connections and generalizations. Thought perturbator 400 implements multiple perturbation strategies including gradient-based exploration that follows directions of increasing semantic variance, curvature-aware sampling that concentrates perturbations along principal geodesic directions, and adversarial perturbations that test the robustness of thought structures against semantic drift. These perturbations serve as probes into the local geometry, revealing opportunities for consolidation, identifying unstable structures that may need reinforcement, and discovering latent connections between seemingly disparate concepts.

A thought recombinator 410 takes perturbed thoughts and synthesizes new conceptual structures through sophisticated interpolation and integration algorithms. This component implements the mathematical operation where the weights are determined through multiple mechanisms including but not limited to semantic alignment scores between perturbed thoughts, historical co-activation patterns, goal-relevance metrics, and geometric compatibility measures. Thought recombinator 410 goes beyond simple linear interpolation, employing manifold-aware combination strategies that respect the curved geometry of the latent space. When combining thoughts from different bundles, it computes geodesic interpolations that follow the natural curvature of the manifold, ensuring that intermediate points remain semantically meaningful. The component implements hierarchical recombination, first identifying small groups of highly compatible thoughts for initial fusion, then progressively combining these into larger meta-structures. During recombination, it monitors several quality metrics including semantic coherence measured through local manifold smoothness, compression potential indicating whether the combination reduces overall complexity, and generalization capacity assessing whether the new structure captures broader patterns. For example, when recombining thoughts about “gradient descent” from a machine learning bundle with thoughts about "energy minimization" from a physics bundle, thought recombinator 410 might discover a meta-concept about "optimization in curved spaces" that provides a unified framework applicable across domains.

A curvature editor 420 performs targeted modifications to the manifold's geometric structure based on insights gained from perturbation and recombination. This component has the capability to increase local curvature in regions where semantic compression is beneficial, creating tighter conceptual clusters that enable more efficient reasoning. It can also decrease curvature in areas that have become overly rigid, restoring flexibility for creative thinking and novel connections. Curvature editor 420 implements several curvature modification operations including but not limited to bundle merging procedures that identify overlapping thought structures with high mutual information and smoothly blend their geometric neighborhoods, creating unified regions with consistent curvature properties. It performs curvature diffusion operations that spread high-pressure regions more evenly, preventing the formation of semantic bottlenecks that could impede reasoning. Curvature editor 420 may also implement curvature sharpening around stable conceptual cores, reinforcing well-established knowledge while maintaining softer boundaries for evolving concepts. When editing curvature, the component must maintain global geometric consistency, ensuring that local modifications don't create inconsistencies or singularities elsewhere in the manifold. In one embodiment it may employ Ricci flow-inspired algorithms that naturally evolve curvature toward optimal configurations, balancing local semantic density with global navigability.

A topological operation manager 430 handles the most profound structural modifications to the manifold, including changes that alter its fundamental connectivity. This component can create new topological features such as handles or bridges between previously disconnected regions, enabling novel reasoning pathways that weren't possible in the original manifold structure. When thought recombinator 410 discovers stable interpolations between distant bundles, topological operation manager 430 evaluates whether to establish permanent connections. It implements sophisticated surgery operations that can split overly complex regions into simpler components, merge adjacent regions that have developed sufficient similarity, or create higher-genus structures that enable multiply-connected reasoning paths. Topological operation manager 430 performs topological analysis to identify features such as holes in the manifold representing conceptual gaps, bottlenecks where all reasoning must pass through constrained regions, and islands of isolated knowledge that could benefit from connection. For instance, if the system has separately developed expertise in "visual pattern recognition" and "time series analysis," topological operation manager 430 might identify an opportunity to create a bridge through "spatiotemporal pattern analysis," fundamentally expanding the system's reasoning capabilities. All topological modifications are carefully validated to ensure they preserve essential semantic relationships while enabling new forms of inference.

A dream flow manager 440 orchestrates the overall flow of dreaming operations, coordinating the activities of other components to ensure coherent and beneficial manifold evolution. This component implements three primary flow types that govern how dreaming unfolds. The perturbation flow controls how stochastic exploration propagates through the manifold, managing the selection of regions for perturbation, the intensity and direction of noise injection, and the propagation of discoveries to related areas. The compression flow guides the consolidation of redundant or inefficient structures, identifying opportunities for semantic compression, orchestrating the merger of similar concepts, and ensuring that compression preserves essential distinctions. The generalization flow promotes the discovery and reinforcement of abstract patterns, guiding recombination toward higher-order structures, identifying successful generalizations for preservation, and propagating useful abstractions throughout the manifold. Dream flow manager 440 monitors the overall health of the dreaming process through metrics such as semantic coherence, structural stability, and compression efficiency. It implements adaptive control mechanisms that adjust flow parameters based on the current state of the manifold and the outcomes of recent modifications, ensuring that dreaming remains beneficial rather than disruptive.

A memory pruner 450 performs essential cleanup operations that prevent the manifold from becoming cluttered with obsolete or redundant structures. This component implements sophisticated forgetting mechanisms that go beyond simple deletion, carefully removing structures while preserving the integrity of surrounding geometry. It identifies candidates for pruning based on multiple criteria including thermodynamic decay where thoughts with consistently low activation energy are marked for removal, structural redundancy where nearly identical thought patterns exist in multiple locations, and semantic incoherence where thoughts no longer maintain meaningful connections to the broader manifold. Memory pruner 450 implements gradual pruning processes that slowly dissolve unwanted structures rather than creating abrupt deletions that could destabilize nearby regions. During pruning, it redistributes the "semantic mass" of removed thoughts to related structures, ensuring that useful aspects are preserved even as redundant representations are eliminated. The component also performs defragmentation operations that consolidate sparse regions and tighten the overall manifold structure. For example, after extended operation, the system might accumulate multiple slightly different representations of similar concepts acquired in different contexts. Memory pruner 450 identifies these redundancies and carefully merges them into single, more robust representations while preserving the unique aspects that provide contextual flexibility.

These components within dream manager 140 implement a process of autonomous cognitive evolution. Thought perturbator 400 explores the stability and potential of existing structures, thought recombinator 410 synthesizes new abstractions and connections, curvature editor 420 optimizes the geometric landscape, topological operation manager 430 enables fundamental structural innovations, dream flow manager 440 orchestrates coherent evolution, and memory pruner 450 maintains cognitive efficiency. This architecture enables the PCM to continuously improve its internal representations without external supervision, developing increasingly sophisticated reasoning capabilities through the natural evolution of its geometric substrate. The dreaming process transforms accumulated experience into structural wisdom, creating a manifold that not only stores knowledge but embodies understanding in its very geometry.

Figure 5:
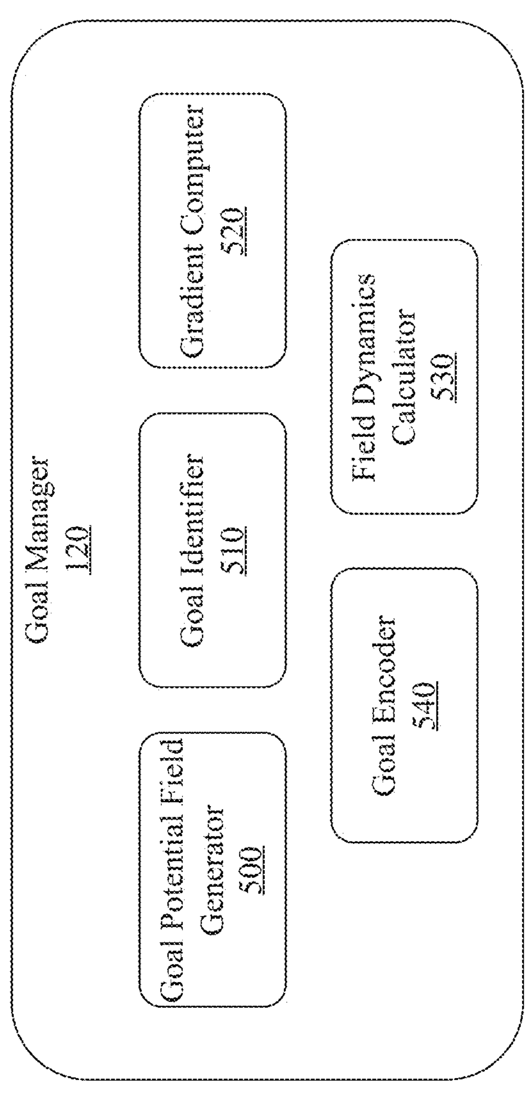
FIG. 5 is a block diagram illustrating an exemplary architecture of a component within a Persistent Cognitive Machine (PCM), a goal manager.

FIG. 5 is a block diagram illustrating an exemplary architecture of a component within a Persistent Cognitive Machine (PCM), a goal manager. Unlike traditional goal-directed systems that implement objectives as discrete targets or symbolic constraints, goal manager 120 generates continuous scalar fields that attract attention and guide reasoning through geometric influence. This component transforms abstract intentions, user queries, and system objectives into structured force fields that interact with the manifold's compression landscape to create rich cognitive dynamics.

A goal identifier 510 serves as the initial processing stage that recognizes, categorizes, and prioritizes various goal sources entering the system. Goal identifier 510 processes inputs from multiple channels including explicit user queries that directly state objectives or ask questions, implicit user patterns derived from interaction history and preferences, system-generated goals arising from internal drives such as uncertainty reduction or consistency maintenance, and task constraints imposed by external requirements or operational parameters. Goal identifier 510 implements parsing algorithms that go beyond keyword extraction to understand the semantic intent behind goals. When processing a user query such as "How can we apply quantum computing principles to optimize machine learning algorithms?", the component identifies multiple nested goals: understanding quantum computing principles, comprehending optimization in machine learning, finding intersection points between these domains, and generating practical applications. Goal identifier 510 also performs goal decomposition, breaking complex objectives into hierarchical subgoals that can be pursued in parallel or sequence. It maintains a goal registry that tracks active objectives, their priorities, interdependencies, and completion states. The component implements conflict detection mechanisms that identify when multiple goals may be contradictory or competing for the same cognitive resources, flagging these for special handling by other components. For long-term interactions, goal identifier 510 maintains persistent goal structures that evolve across sessions, enabling the system to pursue complex objectives that require extended reasoning or multiple interaction cycles.

A goal encoder 540 transforms identified goals from their raw representational form into geometric structures compatible with the manifold's architecture. This encoding process goes beyond simple embedding, creating rich geometric objects that can effectively influence manifold dynamics. Goal encoder 540 implements multiple encoding strategies tailored to different goal types. For similarity-based goals, it computes embedding vectors and defines potential fields, creating gradients that attract attention toward semantically similar regions. For constraint-based goals, it generates potential fields with low values in prohibited regions and high values in acceptable areas, effectively creating barriers and channels that guide reasoning. Goal encoder 540 also implements contrastive encoding for goals that require distinguishing between concepts, creating potential fields with opposing gradients that push attention away from certain regions while pulling toward others. For complex multi-faceted goals, goal encoder 540 generates composite fields that superimpose multiple potential patterns, creating rich landscapes with multiple attractors, saddle points, and gradient flows. The encoding process considers the current state of the manifold, adapting the potential field to work effectively with existing compression patterns and thought structures. For instance, when encoding a goal related to creative problem-solving, the component might generate a potential field with multiple local maxima in different semantic regions, encouraging exploration of diverse solution approaches rather than convergence on a single path.

A goal potential field generator 500 takes encoded goals and constructs the complete scalar field across the entire manifold. This component implements field generation algorithms that create smooth, differentiable potential landscapes while respecting the manifold's geometric constraints. The generator computes field values at each point by considering multiple factors including semantic distance from goal representations, alignment with goal constraints and requirements, historical success rates for similar goals in nearby regions, and interaction effects between multiple concurrent goals. Goal potential field generator 500 employs kernel methods to create smooth field variations, preventing discontinuities that could destabilize attention flow. It implements field normalization procedures to ensure that potential values remain within reasonable ranges across the manifold, preventing any single goal from completely dominating cognitive dynamics. Goal potential field generator 500 also generates time-varying fields for goals that evolve during reasoning, smoothly interpolating between different field configurations to maintain continuity. For hierarchical goals, it creates nested potential structures where achieving subgoals creates local maxima within the broader landscape of the primary objective. The generator must balance field strength to create sufficient attractive force without overwhelming the natural dynamics of compression and manifold structure. For example, when generating a field for a goal requiring innovative connections between disparate concepts, the component might create a potential landscape with a valley between the concepts that gradually rises, encouraging exploration of the intermediate space where novel connections might emerge.

A gradient computer 520 calculates the vector field that determines the direction and magnitude of goal-induced forces at each point in the manifold. This component implements efficient algorithms for computing gradients in curved space, accounting for the manifold's metric structure to ensure that gradients represent true geometric directions rather than naive coordinate derivatives. Gradient computer 520 employs multiple computational strategies including finite difference methods adapted for manifolds, automatic differentiation through the field generation process, and analytical gradients for simple field configurations. It computes not only first-order gradients but also higher-order derivatives such as the Hessian, which indicates the local curvature of the potential field and helps identify critical points such as maxima, minima, and saddle points. The component maintains a continuously updated gradient map across frequently accessed regions of the manifold, enabling rapid attention flow calculations without repeated gradient computation. For regions of high curvature or complex metric structure, gradient computer 520 implements adaptive sampling strategies that ensure accurate gradient estimation despite geometric complications. It also computes gradient statistics such as divergence and curl, providing insights into the global flow patterns induced by the goal field. These computations enable analyses of goal dynamics, identifying convergence regions where attention naturally flows, circulation patterns that might indicate conceptual loops, and divergence zones where exploratory behavior is encouraged.

A field dynamics calculator 530 analyzes and predicts the complex behaviors that emerge from the interaction between goal potential fields and the manifold's other forces. This component simulates how attention will flow under the combined influence of goal attraction, compression resistance, and the inherent dynamics of the attention field itself. Field dynamics calculator 530 implements several analytical capabilities including trajectory prediction that estimates likely attention paths given current conditions, stability analysis that identifies whether goal configurations will lead to stable focus or oscillatory behavior, and bifurcation detection that recognizes when small changes in goals might lead to dramatically different cognitive outcomes. The component models various emergent phenomena such as gradient following where attention flows smoothly up potential gradients toward goal regions, tunneling effects where strong goal potentials can overcome high compression barriers, and competitive dynamics where multiple goals create complex flow patterns with unpredictable outcomes. For multi-goal scenarios, field dynamics calculator 530 computes Pareto frontiers that identify optimal trade-offs between competing objectives, helping the system navigate complex decision spaces. It also analyzes temporal dynamics, predicting how goal influences will evolve as the manifold structure changes through use and learning. The component can identify potential failure modes such as local maxima that might trap attention before reaching true goals, unstable equilibria where small perturbations cause large behavioral changes, and chaotic regions where goal interactions create unpredictable dynamics. For instance, when analyzing goals that require balancing exploration with exploitation, field dynamics calculator 530 might identify parameter regimes where the system naturally alternates between focused pursuit and broad exploration, optimizing long-term learning and performance.

The components within goal manager 120 create a system for translating abstract objectives into concrete geometric influences that shape cognitive behavior. Goal identifier 510 recognizes and structures incoming objectives, goal encoder 540 transforms them into geometric representations, goal potential field generator 500 creates smooth scalar fields across the manifold, gradient computer 520 determines the resulting force fields, and field dynamics calculator 530 predicts and analyzes the emergent behaviors. This architecture enables the PCM to pursue complex goals not through rigid programming or symbolic planning, but through the natural dynamics of attention flowing through shaped space. Goals become not commands to be executed but influences that guide the fluid motion of thought, creating a form of intentionality that emerges from geometry rather than being imposed upon it. Goal manager 120 thus provides the motivational landscape that, combined with the manifold's memory structure and compression dynamics, enables purposeful yet flexible cognitive behavior that can adapt, learn, and discover unexpected solutions through the natural evolution of geometric attention.

Figure 13:
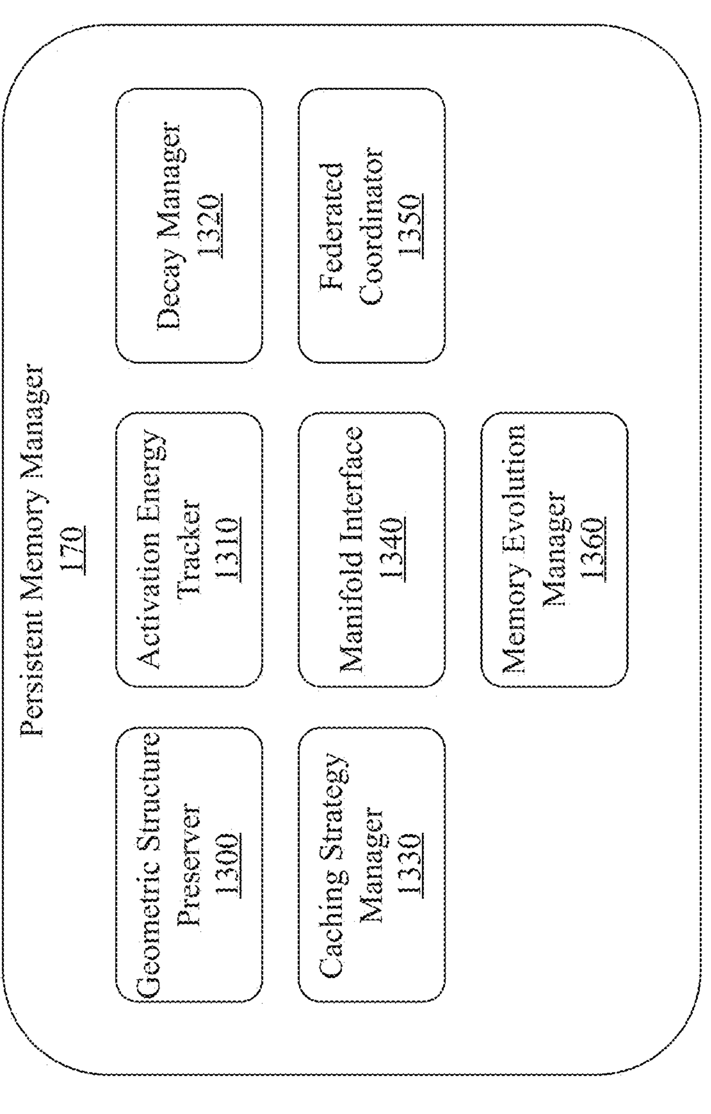
FIG. 13 is a block diagram illustrating an exemplary architecture of a component within a Persistent Cognitive Machine (PCM), a persistent memory manager.

FIG. 13 is a block diagram illustrating an exemplary architecture of a component within a Persistent Cognitive Machine (PCM), a persistent memory manager. Unlike traditional memory systems that store static data in hierarchical caches, persistent memory manager 170 implements an approach where memory exists as living geometric structures within the latent manifold, subject to natural evolution through usage patterns and energy dissipation. This component serves as the bridge between the dynamic latent manifold and long-term cognitive persistence, ensuring that thoughts—discrete units of reasoning or analysis generated during processing—are preserved not as isolated data points but as interconnected geometric structures with semantic relationships intact.

A geometric structure preserver 1300 maintains the fundamental geometric integrity of stored thoughts and their relationships within the thought cache, a structured memory layer configured to store and retrieve thoughts based on semantic similarity, contextual alignment, and system policy. This component preserves thought bundles as compact submanifolds, maintaining their internal metric structure, boundary conditions, and topological relationships to neighboring bundles. When thoughts are cached, geometric structure preserver 1300 ensures that not only the content but also the geometric context is maintained, including the local curvature patterns that indicate semantic density, the geodesic paths that connect related concepts, and the metric tensor values that define distances within thought neighborhoods. For instance, when storing a complex reasoning chain about quantum computing applications, the component preserves not just the individual thoughts but their geometric arrangement as a coherent bundle, maintaining the curved paths that connect foundational physics concepts to practical implementations. Geometric structure preserver 1300 implements sophisticated algorithms to handle the challenges of preserving dynamic geometric structures, including maintaining consistency as the manifold evolves, handling coordinate transformations between different chart representations, and ensuring that preserved structures remain compatible with the current manifold geometry when retrieved later.

An activation energy tracker 1310 implements the thermodynamic model of memory persistence by assigning and monitoring activation energies to each cached thought and thought structure. Activation energy tracker 1310 goes beyond simple access counting, implementing a energy model where thoughts gain energy through various forms of cognitive engagement including direct retrieval for query processing, traversal along geodesic paths that pass near the thought, participation in successful reasoning chains, and reinforcement through goal achievement. Activation energy tracker 1310 maintains a continuous energy landscape across all cached structures, tracking not just individual thought energies but also the energy distributions within thought bundles and along frequently traversed paths. Energy updates follow the principle that thoughts contributing to successful cognitive outcomes receive energy boosts, while those that remain unused gradually dissipate energy according to the thermodynamic decay equation. The tracker also implements energy inheritance mechanisms where new thoughts created through generalization—the process of synthesizing new thoughts from cached thoughts by identifying shared structure—inherit appropriate energy levels from their parent thoughts, ensuring that valuable abstractions maintain sufficient activation to persist.

A decay manager 1320 implements the natural forgetting mechanism through thermodynamic principles, executing a decay equation. This component continuously monitors thought energies and initiates pruning operations when falls below the threshold, ensuring that the thought cache maintains efficiency by naturally eliminating obsolete or redundant information. Decay manager 1320 implements pruning strategies that go beyond simple deletion, including gradual energy dissipation that allows thoughts to fade naturally rather than disappearing abruptly, redistribution of semantic content from decaying thoughts to related structures that remain active, and preservation of structural integrity by carefully removing thoughts without creating discontinuities in the manifold. Decay manager 1320 may also implement contextual decay modulation where decay rates adjust based on factors such as the semantic uniqueness of a thought, its role in connecting otherwise disparate concepts, and its participation in rarely accessed but critically important knowledge. For example, foundational mathematical concepts might decay more slowly than specific computational examples, preserving essential knowledge infrastructure while allowing detailed instances to fade when no longer needed.

A manifold interface 1340 provides the bidirectional connection between persistent memory manager 170 and the latent manifold, enabling seamless flow of geometric structures in both directions. This interface implements protocols for reading geometric structures from memory into the active manifold, including reconstruction of thought bundles with their full geometric context, restoration of geodesic paths and their associated curvature patterns, and integration of retrieved structures with the current manifold state. When writing updates back to memory, manifold interface 1340 captures not just the modified thoughts but the entire geometric context of their evolution, preserving information about new connections formed during reasoning, changes in local curvature due to compression or expansion, and trajectory patterns that indicate successful reasoning strategies. Manifold interface 1340 maintains synchronization between the persistent memory structures and the dynamic manifold state, handling challenges such as version conflicts when the manifold has evolved since a thought was cached, geometric inconsistencies that arise from independent evolution of different regions, and efficient incremental updates that avoid rewriting entire structures for small changes.

A caching strategy manager 1330 implements intelligent policies for determining which thoughts and structures to preserve in the various tiers of the thought cache, including session caches for short-term interaction, long-term caches for persistent knowledge, and shared or federated caches across devices or agents. Unlike traditional caching strategies based on recency or frequency alone, this component implements geometric and semantic criteria for cache management. Cached thoughts are indexed in latent space using sophisticated methods that preserve geometric relationships, enabling retrieval using vector similarity, trajectory proximity, or geodesic alignment. Caching strategy manager 1330 implements compression strategies where cached thoughts may be compressed or abstracted over time to reduce redundancy and support scalable reuse. It determines optimal compression levels by balancing storage efficiency with retrieval fidelity, identifies opportunities for thought generalization where multiple similar thoughts can be replaced by a single abstraction, and manages the distribution of thoughts across cache tiers based on access patterns and semantic importance. The component also implements predictive caching strategies that anticipate future needs based on observed cognitive patterns and preemptively adjust cache contents to optimize for expected usage.

A federated coordinator 1350 enables knowledge sharing and synchronization across multiple PCM instances while maintaining privacy and semantic integrity. Federated coordinator 1350 implements geometric abstraction protocols that allow thoughts to be shared at appropriate levels of generalization, ensuring that instance-specific details remain private while valuable patterns propagate across the federation. Federated coordinator 1350 manages the complex challenges of cross-instance memory coordination including aligning geometric structures from different manifolds that may have evolved independently, determining appropriate abstraction levels for shared thoughts to balance utility with privacy, and handling conflicts when different instances have developed incompatible representations of similar concepts. Federated coordinator 1350 implements consensus mechanisms that respect local geometric structures while enabling global knowledge emergence, using techniques such as curvature matching to identify compatible regions across manifolds, bundle projection to map local structures into shared space, and distributed evolution protocols that allow federated improvements to propagate back to local instances.

A memory evolution manager 1360 orchestrates the various mechanisms through which persistent memory structures adapt and improve over time. Memory evolution manager 1360 implements a plurality of evolution mechanisms that shape the long-term development of the memory system. Reinforcement operations strengthen frequently used thoughts and paths by increasing local curvature around valuable structures, tightening geodesic connections between related concepts, and enhancing the stability of successful reasoning patterns. Compression operations identify and merge redundant or highly similar structures, implementing the latent recombinator functionality to blend similar thoughts or trajectories into unified abstractions while preserving essential distinctions. Abstraction operations extract higher-level patterns from collections of specific instances, creating generalized thoughts that capture core principles while enabling broader application across contexts. Forgetting operations, coordinated with decay manager 1320, ensure that memory evolution includes not just growth but also selective pruning that maintains system efficiency and relevance. Memory evolution manager 1360 implements these operations according to sophisticated scheduling algorithms that balance immediate system needs with long-term optimization goals, ensuring that memory evolution enhances rather than disrupts ongoing cognitive operations.

The components create a persistent memory system that transcends traditional storage paradigms. Geometric structure preserver 1300 maintains the rich relationships between thoughts, activation energy tracker 1310 and decay manager 1320 implement natural memory dynamics, manifold interface 1340 enables integration with active cognition, the caching strategy manager 1330 optimizes for both efficiency and semantic value, federated coordinator 1350 enables collective intelligence while preserving privacy, and memory evolution manager 1360 ensures continuous improvement through use. This architecture implements structured memory where thoughts are stored not as flat vectors but as positions or paths within an evolving manifold, supporting context-sensitive access, memory reinforcement through traversal, lawful pruning, and dynamic generalization. The result is a memory system that doesn't merely store information but actively participates in the cognitive process, shaping and being shaped by the ongoing evolution of thought within the geometric substrate of the Persistent Cognitive Machine.

Figure 6:
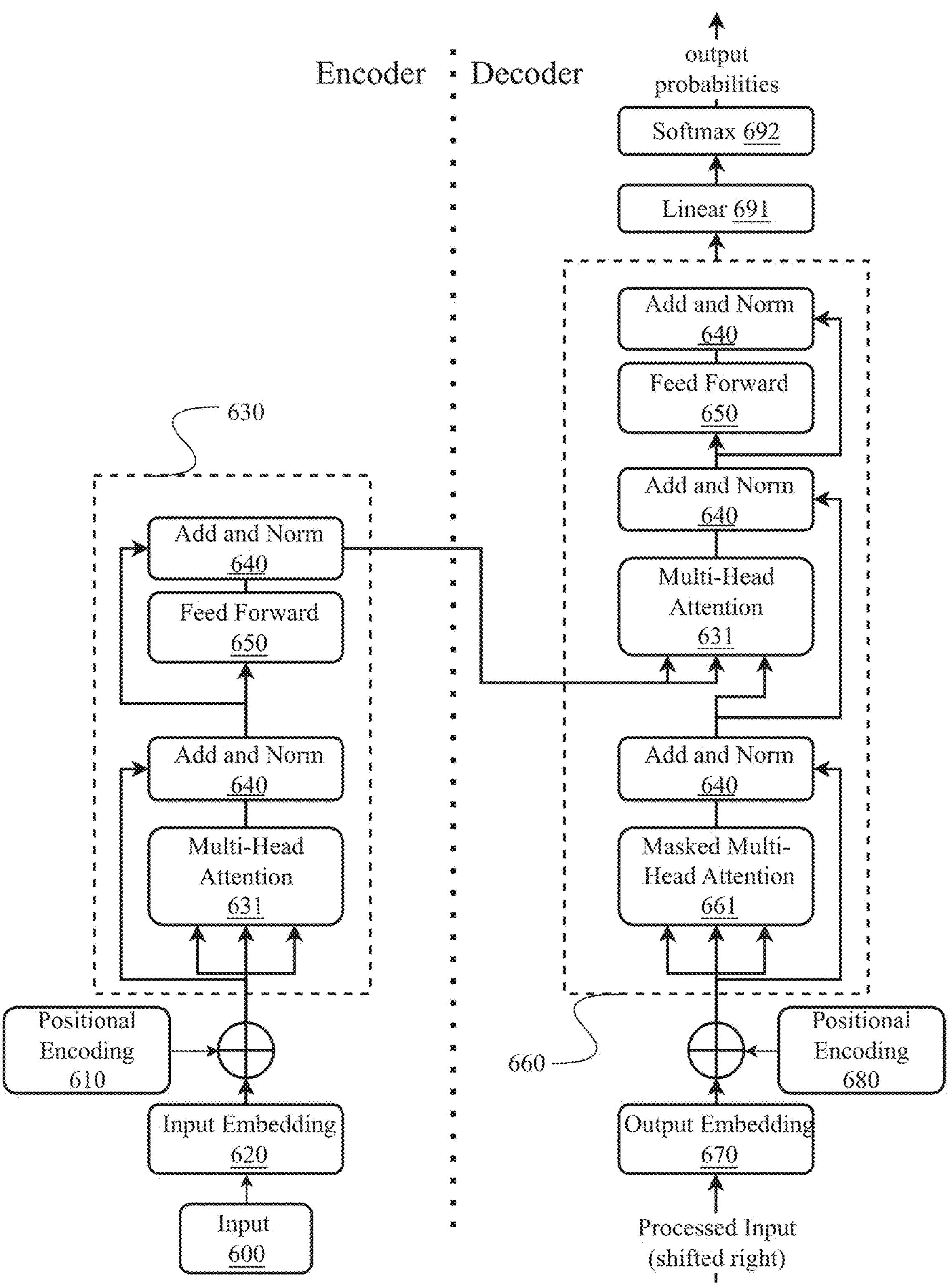
FIG. 6 (Prior Art) is a block diagram illustrating a common transformer architecture used in most large language models.

FIG. 6 (Prior Art) is a block diagram illustrating a common transformer architecture used in most large language models. A transformer generally comprises an encoder (the components on the left side of the illustration) and a decoder (the components on the right side of the illustration).

The multi-stage LLM 150 described in the PCM architecture represents an exemplary embodiment that can be implemented using any type of large language model architecture, whether currently existing or developed in the future. The PCM's geometric framework and cognitive dynamics are model-agnostic, designed to work with diverse language processing architectures while enhancing their capabilities through persistent memory and structured reasoning. The specific choice of LLM implementation does not alter the fundamental operation of the PCM system, as the geometric manifold, thought caching mechanisms, and cognitive dynamics engine operate independently of the particular language model architecture employed.

Figure 7:
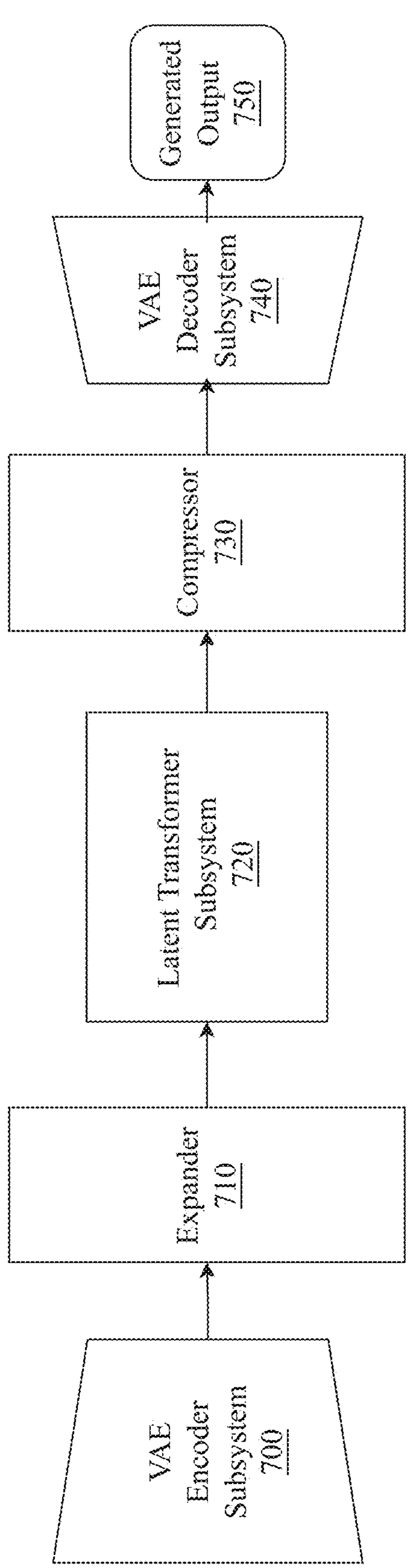
FIG. 7 is a block diagram illustrating an exemplary architecture for a latent transformer, where the transformer operates on latent space vector representations of an input.

In various embodiments, multi-stage LLM 150 may be implemented as a traditional transformer architecture with standard multi-head attention mechanisms, as described in FIG. 6 (Prior Art). Alternatively, it may employ a latent transformer architecture as illustrated in FIG. 7, where the transformer operates on compressed latent space representations rather than raw token embeddings. The system may utilize models with multi-head latent attention (MLA) that achieve superior efficiency through low-rank key-value compression, or any other attention mechanism that processes sequential data. The LLM component may be based on encoder-only architectures (such as BERT-style models), decoder-only architectures (such as GPT-style models), or encoder-decoder architectures (such as T5-style models), with the PCM system adapting its interfaces accordingly.

The flexibility in LLM selection extends to model size, with multi-stage LLM 150 potentially ranging from smaller models with millions of parameters to large-scale models with hundreds of billions of parameters. The system may employ models trained on specific domains or general-purpose models, models optimized for particular tasks or multi-task models, and models using various training objectives including masked language modeling, causal language modeling, or contrastive learning. The PCM architecture's modular design ensures that advances in language model technology can be readily incorporated without requiring fundamental changes to the geometric cognitive framework, thought caching mechanisms, or other system components.

Furthermore, the multi-stage aspect of LLM 150 refers to its ability to process information through multiple phases of refinement rather than requiring a specific architectural pattern. This multi-stage processing may be implemented through iterative passes through a single model, chained processing through multiple specialized models, hierarchical processing from coarse to fine-grained analysis, or parallel processing with subsequent integration. The key requirement is that the LLM component can generate structured thought representations suitable for embedding within the geometric manifold, regardless of the specific architectural details of how those thoughts are produced.

The illustrated transformer comprises an encoder and a decoder. The encoder takes input embeddings and processes them through a stack of layers (represented as dashed box 630). Each layer consists of: positional encoding, which adds position information to the input embeddings; multi-head attention, which allows the model to attend to different parts of the input sequence; add and norm, which applies residual connection and layer normalization; feed forward, which is a fully connected feed-forward network; and add and norm which is another residual connection and layer normalization.

The power of the transformer model lies in the self-attention mechanism. This mechanism contributes to accelerated learning compared to traditional models such as long short-term memory models. Self-attention empowers the transformer model with the remarkable capability to meticulously scrutinize distinct segments of a given sequence or even encompass the entire contextual essence of a sentence. This profound contextual awareness enables the model to make predictions with an elevated degree of accuracy and relevance.

The transformer takes a processed vector as its input 600. The input embedding 620 to the encoder is a sequence of tokens, typically represented as integers. Each token is mapped to a learnable embedding vector of a fixed size. The embedding layer is a lookup table that converts each token into its corresponding dense vector representation. The embeddings are learned during training and capture semantic and syntactic relationships between tokens.

A dense vector representation, also known as a dense embedding or a continuous vector representation, is a way of representing data, particularly words or tokens, as dense vectors in a high-dimensional continuous space. In the context of natural language processing (NLP) and language models, dense vector representations are used to capture semantic and syntactic information about words or tokens. Each word or token is mapped to a fixed-size vector of real numbers, typically with hundreds or thousands of dimensions. Each word or token is represented by a vector of a fixed size, regardless of the length of the input sequence. The size of the vector is a hyperparameter that is determined during model design. The vectors exist in a continuous high-dimensional space, where each dimension represents a latent feature or aspect of the word or token. The continuous nature allows for capturing fine-grained relationships and similarities between words. The dense vector representations are learned during the training process of the model. The model learns to assign similar vectors to words that have similar meanings or occur in similar contexts. The dense vector representations aim to capture semantic and syntactic relationships between words. Words that have similar meanings or are used in similar contexts tend to have similar vector representations. Dense vector representations allow for performing algebraic operations on words, such as addition and subtraction. These operations can capture analogies and relationships between words, such as "prince"−"man"+"woman"≈"princess". Dense vector representations serve as input features for various downstream NLP tasks, such as text classification, sentiment analysis, named entity recognition, and machine translation. The dense representations provide a rich and informative input to the models, enabling them to learn patterns and make predictions. Some popular examples of dense vector representations include, but are not limited to, Word2Vec, Global Vectors for Word Representations (GloVe), FastText, and BERT.

After the input embedding layer, positional encoding 610 is added to the input embedding to provide position information to the model. Since the Transformer architecture doesn't have inherent recurrence or convolution, positional encodings help capture the order and relative positions of tokens. The positional encodings are typically sine and cosine functions of different frequencies, allowing the model to learn relative positions. The positional encodings have the same dimensionality as the input embeddings and are summed with them.

The encoder utilizes a multi-head attention mechanism 631 which is a key component of the transformer architecture. It allows the encoder to attend to different parts of the input sequence and capture dependencies between tokens. The attention mechanism computes three matrices: query (Q), key (K), and value (V). The query, key, and value matrices are obtained by linearly projecting the input embeddings using learned weight matrices. The attention scores are computed by taking the dot product of the query matrix with the transpose of the key matrix, followed by scaling and applying a softmax function. The attention scores determine the importance of each token in the input sequence for a given position. The value matrix is then multiplied with the attention scores to obtain the weighted sum of the values, which forms the output of the attention mechanism. Multi-head attention splits the query, key, and value matrices into multiple heads, allowing the model to attend to different aspects of the input simultaneously. The outputs from each head are concatenated and linearly projected to obtain the final output of the multi-head attention layer 631.

After the multi-head attention layer, a residual connection is applied, followed by layer normalization at add and norm 640. The residual connection adds the input embeddings to the output of the attention layer, helping the model learn faster and deeper. Layer normalization normalizes the activations across the features, stabilizing the training process.

While traditional multi-head attention mechanisms contributes to accelerated learning compared to models like LSTMs, innovations like multi-head Latent Attention (MLA) further enhance efficiency through low-rank key-value joint compression. MLA achieves this by compressing the key-value pairs into a latent vector, significantly reducing the key value cache required during inference while maintaining or improving performance compared to standard multi-head attention mechanism. The attention mechanism still empowers the model to scrutinize distinct segments of sequences, but MLA does so while requiring only a fraction of the computational resources The feed forward layer 650 is a fully connected neural network applied to each position of the encoder's hidden states. It consists of two linear transformations with a Rectified Linear Unit (ReLU) activation function in between. The purpose of the feed forward 650 layer is to introduce non-linearity and increase the model's capacity to learn complex representations. The output of the feed forward 650 layer has the same dimensionality as the input embeddings. A residual connection and layer normalization 640 are applied after the feed forward 650 layer.

The encoder layers 630 are stacked Nx times, where N is a hyperparameter that determines the depth of the Encoder. Each layer follows the same structure: multi-head attention, add & norm, feed forward, and add & norm. By stacking multiple encoder layers, the model can capture hierarchical and long-range dependencies in the input sequence. The output of the final encoder layer represents the encoded input sequence, which is then passed to the decoder for generating the output sequence.

The decoder generates the output probabilities. It has a similar structure to the Encoder, with a few additions. The decoder takes output embeddings and processes them through a stack of layers (represented as dashed box 660). The output embedding layer 670 takes the previous processed input tokens (shifted right by one position) and converts them into dense vectors. Each token is mapped to a learnable embedding vector of a fixed size. The embedding vectors capture semantic and syntactic relationships between tokens.

Positional encoding 680 is added to the output embedding 670 to provide position information to the model. Since the transformer architecture does not have inherent recurrence or convolution, positional encodings help capture the order and relative positions of tokens. The positional encodings are typically sine and cosine functions of different frequencies, allowing the model to learn relative positions.

The masked multi-head attention 661 mechanism prevents the model form attending to future tokens. This layer performs self-attention on the decoder's input sequence. It allows the decoder to attend to different parts of its own input sequence. The attention is "masked" to prevent the decoder from attending to future tokens, ensuring that the predictions are based only on the previously generated tokens. Multi-head attention splits the input into multiple heads, allowing the model to attend different aspect of the input simultaneously.

After the masked multi-head attention, a residual connection is applied follows by layer normalization via add and norm 640. The residual connection adds the input to the output of the attention layer, helping the model learn faster and deeper. Layer normalization normalizes the activations across the features, stabilizing the training process.

The multi-head attention 631 layer performs attention between the decoder's hidden states and the encoder's output. It allows the decoder to attend to relevant parts of the input sequence based on the encoder's representations. The attention weights are computed based on the compatibility between the Decoder's hidden states and encoder's outputs.

Another add and norm 640 layer is then followed by feed forward network 650. This a fully connected feed-forward network applied to each position of the decoder's hidden states. It consists of two linear transformations with a Rectified Linear Unit (ReLU) activation in between. The feed forward layer helps the model capture non-linear interactions and increases the model's capacity.

Another add and norm 640 layer is followed by linear 691 and softmax 692 layers. The final hidden states of the decoder are passed through a linear transformation to project them into the vocabulary space. Vocabulary space refers to the set of all unique tokens or words that the model can generate or predict. In the context of language models, the vocabulary is a predefined set of tokens that the model is trained on and can output. When the decoder's final hidden states are passed through a linear transformation, they are projected into a vector space with the same dimensionality as the size of the vocabulary. Each dimension in this space corresponds to a specific token in the vocabulary. For example, the model has a vocabulary of 10,000 unique tokens. The linear transformation would project the decoder's hidden states into a 10,000-dimensional vector space. Each element in this vector represents the model's predicted probability or score for the corresponding token in the vocabulary.

A softmax function is applied to the projected values (vectors) to generate output probabilities over the vocabulary. The softmax function normalizes the values so that they sum up to 1, representing a probability distribution over the vocabulary. Each probability indicates the likelihood of a specific token being the next output token. The token with the highest probability is selected as the next output token. During the model's training, the objective is to maximize the probability of the correct next token given the input sequence and the previously generated tokens. The model learns to assign higher probabilities to the tokens that are more likely to appear based on the context. At inference time, the token with the highest probability in the vocabulary space is selected as the next output token. This process is repeated iteratively, with the generated token being fed back into the decoder as input for the next step, until a stopping criterion is met (e.g., reaching a maximum length or generating an end-of-sequence token). The size and composition of the vocabulary can vary depending on the specific task and the data the model is trained on. It can include words, sub-words, or even characters, depending on the tokenization strategy used.

The decoder layers 660 can be stacked Nx times, allowing the model to capture complex dependencies and generate coherent output sequences.

This transformer architecture allows the model to process input sequences, capture long-range dependencies, and generate output sequence based on the encoded input and the previously generated tokens.

There are at least three variations of transformer architecture that may enable an LCM. A first such variation comprises Auto-Encoding Models. In autoencoders, the decoder portion of the transformer is discarded after pre-training and only the encoder is used to generate the output. The popular BERT and ROBERTa models are examples of models based on this architecture and perform well on sentiment analysis and text classification. These types of models may be trained using a process called masked language modeling (MLM).

The primary goal of an autoencoder is to learn efficient representations of input data by encoding the data into a lower-dimensional space and then reconstructing the original data from the encoded representation. Autoencoders are trained in an unsupervised manner, meaning they don't require labeled data. They learn to capture the underlying structure and patterns in the input data without explicit guidance. An autoencoder consists of two main components: an encoder and a decoder. The encoder takes the input data and maps it to a lower-dimensional representation, often referred to as the latent space or bottleneck. The decoder takes the latent representation and tries to reconstruct the original input data. Autoencoders can be used for dimensionality reduction by learning a compressed representation of the input data in the latent space. The latent space has a lower dimensionality than the input data, capturing the most salient features or patterns. The training objective of an autoencoder is to minimize the reconstruction error between the original input and the reconstructed output. The model learns to encode and decode the data in a way that preserves the essential information needed for reconstruction. Variants and extensions of autoencoders can include denoising autoencoders, variational autoencoders (VAEs) which introduce a probabilistic approach to autoencoders wherein they learn a probabilistic encoder and decoder, allowing for generating new samples from the learned latent space, and conditional autoencoders which incorporate additional conditions or labels as input to the encoder and decoder, enabling the generation of samples conditioned on specific attributes.

Autoencoders can have various applications. Autoencoders can be used to detect anomalies by measuring the reconstruction error. Anomalous samples tend to have higher reconstruction errors compared to normal samples. Autoencoders can be used as a pre-training step to learn meaningful features from unlabeled data. The learned features can then be used for downstream tasks like classification or clustering. Additionally, or alternatively, autoencoders, particularly VAEs, can be used as generative models to generate new samples similar to the training data by sampling from the learned latent space. It's worth noting that while autoencoders can be effective for certain tasks, they have some limitations. They may struggle to capture complex dependencies and may generate blurry or less sharp reconstructions compared to other generative models like Generative Adversarial Networks (GANs).

Another type of variation is the auto-regressive model which feature the use of only the decoder portion of the transformer architecture. In autoregressive architectures, the decoder portion of the transformer is retained and the encoder portion is not used after model pre-training. Auto-regressive models are a class of models that generate outputs by predicting the next element based on the previously generated elements. In the context of the Transformer architecture and language modeling, auto-regressive models are commonly used for tasks such as text generation, machine translation, and language understanding.

Auto-regressive models generate outputs sequentially, one element at a time. In the case of language modeling, the model predicts the next word or token based on the previous words or tokens in the sequence. The prediction of the next element is conditioned on the previously generated elements. The model learns the conditional probability distribution $P(x_t|x_1, x_2, \ldots, x_{t-1})$, where $x_t$ is the element at position t, and $x_1, x_2, \ldots, x_{t-1}$ are the previously generated elements. The transformer architecture, particularly the decoder component, is well-suited for auto-regressive modeling. The decoder generates the output sequence one element at a time, conditioned on the previously generated elements and the encoded input sequence from the encoder. In the transformer decoder, the self-attention mechanism is masked to prevent the model from attending to future positions during training. This masking ensures that the model relies only on the previously generated elements to make predictions, following the auto-regressive property. During training, the transformer decoder uses a technique called teacher forcing. Instead of feeding the model's own predictions as input for the next step, the ground truth target sequence is used. This helps the model learn to generate the correct output sequence based on the input sequence and the previous target tokens. During inference or generation, the transformer decoder generates the output sequence one element at a time. At each step, the model takes the previously generated elements as input and predicts the next element. This process continues until a stopping criterion is met, such as reaching a maximum sequence length or generating an end-of-sequence token. Auto-regressive models, including the transformer, have achieved state-of-the-art performance in language modeling tasks. They excel at capturing the statistical properties and dependencies in sequential data, making them effective for generating coherent and fluent text.

While text generation is the most suitable use case of auto-regressors, they perform exceptionally well on a wide variety of tasks. Most modern LLMs are auto-regressors including, for example, the popular GPT series of LLMs, BERT, and XLNet.

The third variation of the transformer model is the sequence-to-sequence model which utilizes both the encoder and decoder portions of the transformer and can be trained in multiple ways. One of the methods is span corruption and reconstruction. These models are, generally, best suited for language translation. The T5 and BART family of models are examples of sequence-to-sequence models.

FIG. 7 is a block diagram illustrating an exemplary architecture for a latent transformer, where the transformer operates on latent space vector representations of an input. Central to a latent transformer is a latent transformer subsystem 720, which serves as the central processing unit responsible for learning the underlying patterns, relationships, and dependencies within the input data. Latent transformer subsystem 720 leverages advanced techniques such as self-attention mechanisms and multi-head attention to capture the complex interactions and sequences in the data, enabling it to generate accurate and context-aware outputs.

The input to latent transformer subsystem 720 is provided by a VAE (Variational Autoencoder) encoder subsystem 700. VAE encoder subsystem 700 is responsible for encoding an input into a lower-dimensional latent space representation. VAE encoder subsystem 700, learns to compress the data into a compact latent space representation while preserving the essential features and characteristics of the input. Latent space vectors produced by the VAE encoder subsystem 700 may be further processed by an expander 710, which increases the dimensionality of the input data to a point where the vectors can be efficiently processed by latent transformer subsystem 720.

A latent space representation of the input generated by VAE encoder subsystem 700 serves as the input to latent transformer subsystem 720. Latent transformer subsystem 720 operates in this latent space, leveraging the compressed and informative representation to learn the complex patterns and relationships within the data. By working in the latent space, latent transformer subsystem 720 can efficiently process and model the data, capturing the intricate dependencies and generating accurate and meaningful outputs.

Once latent transformer subsystem 720 has processed the latent space representation, the generated output is passed through a VAE decoder subsystem 740. VAE decoder subsystem 740 is responsible for decoding the latent space representation back into the original data space. Prior to processing by VAE decoder subsystem 740, latent transformer subsystem 720 outputs may be compressed back to an original size before being processed by the expander 710 by being processed by a compressor 730. VAE decoder subsystem 740 learns to reconstruct the original data from the latent space representation, ensuring that the generated output is coherent and meaningful.

The reconstructed output from VAE decoder subsystem 740 is provided as a compressed generated output 750. The compressed generated output 750 represents the final result of the latent transformer, which is a compressed version of the original input.

VAE encoder subsystem 700 and VAE decoder subsystem 740 play large roles in the overall functioning of the latent transformer. VAE encoder subsystem 700 enables the system to learn a compressed and informative representation of the input data in the latent space, while the VAE decoder subsystem 740 ensures that the compressed generated output 750 is coherent and meaningful by reconstructing it back into the original data space. The combination of these subsystems allows the latent transformer to focus on learning the complex patterns and relationships within the data, leading to accurate and context-aware outputs.

The specific architectures and parameters of VAE encoder subsystem 700, latent transformer subsystem 720, and VAE decoder subsystem 740 can be customized and adapted based on the characteristics and requirements of the input data and the specific task at hand. The modular design of the system allows for flexibility and extensibility, enabling the integration of different architectures, attention mechanisms, and training techniques to optimize the performance and efficiency of the latent transformer.

Figure 8:
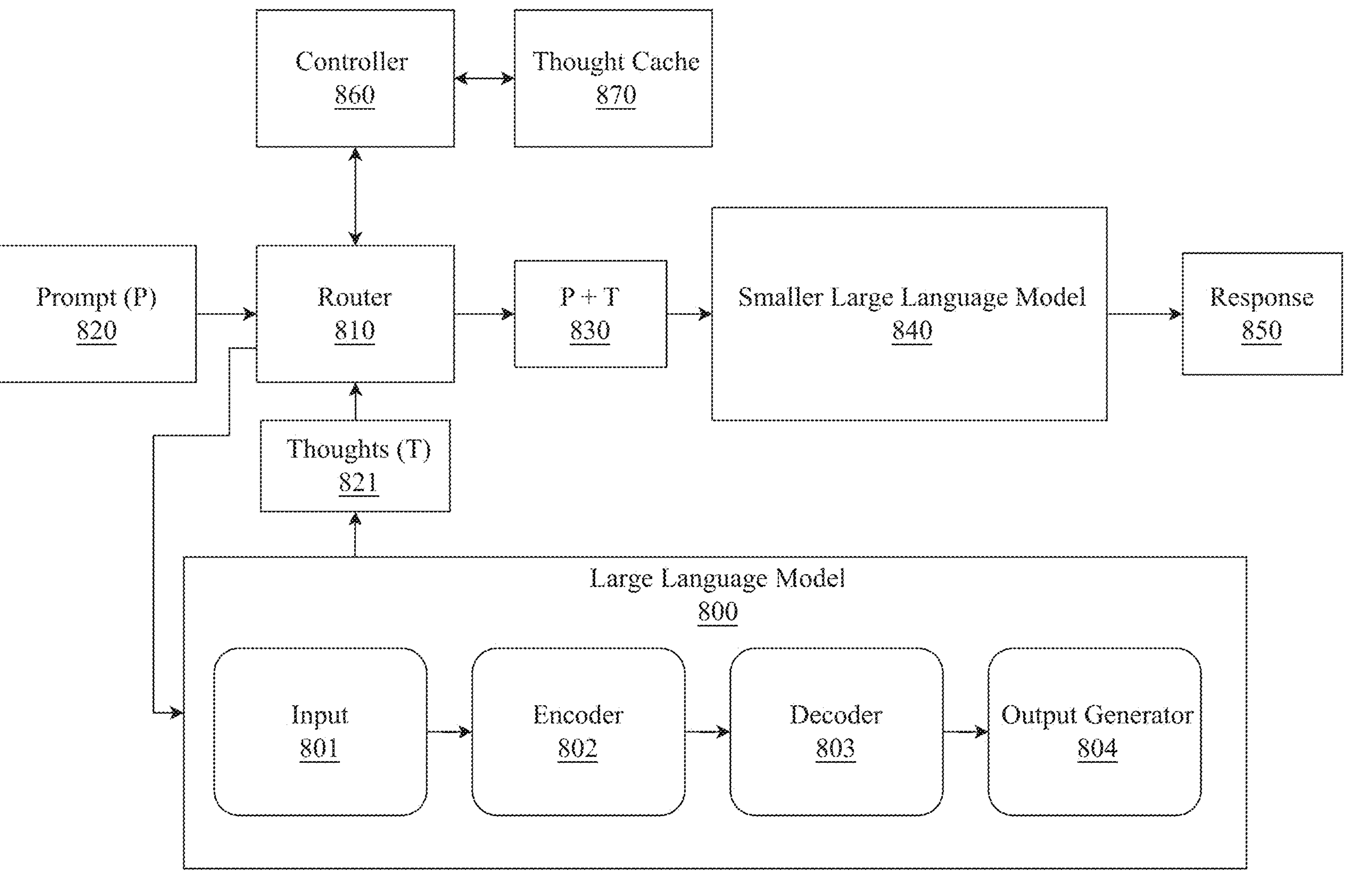
FIG. 8 is a block diagram illustrating an exemplary system architecture for a multi-state LLM with infinite context.

FIG. 8 is a block diagram illustrating an exemplary system architecture for a multi-state LLM with infinite context. The system includes a large language model 800, a router 810, a controller 860, a thought cache 870, and a smaller language model 840 that work together to process prompts and generate responses while optimizing computational resources.

The system receives an initial prompt (P) 820 through the router 810. The router serves as the central control component, determining whether to utilize the large language model 800 or access the thought cache 870 through the controller 860. Upon receiving a prompt, the router first queries the thought cache to determine if relevant thoughts exist for similar prompts.

The large language model 800 includes an input component 801, an encoder 802, a decoder 803, and an output generator 804. The large language model 300 can utilize various internal architectures, including but not limited to traditional transformer cores (as shown in FIG. 6 (Prior Art)) or latent transformer cores (as shown in FIG. 7). The model's attention mechanisms can be implemented using either standard multi-head attention (MHA) or multi-head latent attention (MLA), with the overall system functioning identically regardless of the specific attention mechanism chosen. When using MLA, the model benefits from reduced KV cache requirements during inference while maintaining performance comparable to or better than traditional MHA implementations. When the router determines that cached thoughts are not available or suitable, the prompt is processed through the large language model 800. During this processing, the model enters a reasoning phase where it generates thoughts (T) 821 about the prompt. These thoughts represent the model's analysis and reasoning about the prompt before generating a final response.

The controller 860 manages interaction with the thought cache 870, which can be implemented as either a local or cloud-based storage system. The thought cache stores previously generated thoughts in a vector database format, allowing for efficient retrieval of relevant thoughts for similar prompts. The cache can maintain both session-specific thoughts for temporary storage and long-term thoughts for persistent knowledge.

When thoughts are either generated by the large language model or retrieved from the cache, they are combined with the original prompt to create a prompt and thought combination (P+T) 830. This combination is then routed to the smaller language model 840, which requires significantly fewer computational resources than the large model. The smaller model processes the P+T 830 combination to generate the final response 850.

In operation, for example, if a user submits a prompt asking about climate change impacts, the router first checks the thought cache for relevant existing thoughts. If suitable thoughts exist, they are retrieved and combined with the prompt. If no relevant thoughts are found, the large model processes the prompt to generate new thoughts about climate science, global impacts, and relevant data. These thoughts, combined with the original prompt, are then processed by the smaller model 840 to generate a concise, relevant response. The new thoughts are also cached for future use. To demonstrate how thoughts are created, imagine the prompt "What do you think is the future of string theory, particularly given the spectacular failure of supersymmetry at LHC" being entered into the LLM DeepSeek. During the reasoning phase, the model returns to the user the following thoughts:

"Okay, the user is asking about the future of string theory in light of supersymmetry not being found at the LHC. Let me start by recalling what I know about string theory and SUSY.

String theory relies heavily on supersymmetry because SUSY helps stabilize the extra dimensions and makes the math work better. But the LHC hasn't found any superpartners, which challenges some of the more popular SUSY models. However, I should note that SUSY isn't the only part of string theory. There are versions without it, like bosonic string theory, but those aren't as developed or realistic.

The user might be implying that since SUSY isn't found, string theory is in trouble. I need to address that but also explain why it's not the whole story. Maybe mention that SUSY could still exist at higher energy scales beyond LHC's reach. Also, string theory has other applications beyond particle physics, like in condensed matter or quantum gravity.

I should break down the response into points. First, clarify the relationship between SUSY and string theory. Then discuss the LHC results and their implications. Talk about other areas where string theory contributes, like holography or black hole physics. Mention alternatives within string theory that don't rely on low-energy SUSY. Also, touch on the possibility of future experiments or theoretical breakthroughs.

Need to be balanced. Acknowledge the challenges but also the potential. Avoid being too dismissive or overly optimistic. Maybe conclude by saying the future is uncertain but still active in different areas. Check if there are recent developments post-LHC that I should consider, but since the user didn't specify, stick to general points.

Make sure to explain technical terms like "landscape" or "holography" briefly. Keep the language accessible but precise. The user might be someone with a basic understanding of physics, possibly a student or enthusiast. They want to know if string theory is still viable and where it's headed. They might also be interested in how scientific theories adapt when experimental evidence is lacking.

In summary, structure the answer to address the SUSY issue, discuss other aspects of string theory, mention alternative research directions, and conclude with the ongoing relevance despite challenges. Ensure each point flows logically and answers the user's concern about the theory's future post-LHC results." Using the above generated thoughts, model generated a response to the user's query.

The above thoughts represent T in the accompanying FIG. 8. By extracting thoughts generated by a model in their reasoning phase and passing both those thoughts and the initial prompt through a substantially smaller model with less parameters, the same response may be given while using much less energy.

The system supports multiple cache architectures, including but not limited to local device storage for personal use and cloud-based storage for enterprise applications. This allows for knowledge sharing across users while maintaining appropriate privacy and access controls. Multiple specialized caches can exist for different domains or use cases, such as financial analysis or scientific research.

The system supports multiple specialized cache architectures that enable domain-specific knowledge storage and AI agent collaboration. These architectures include but are not limited to local device caches for personal use, edge caches for specific AI agents, and distributed cloud-based caches for enterprise applications. Each specialized cache maintains its own thought organization optimized for its domain—for instance, a financial analysis cache might structure thoughts around market patterns and risk assessment frameworks, while a scientific research cache might organize thoughts based on experimental methodologies and theoretical frameworks. AI agents can be assigned primary affinity to specific specialized caches while maintaining ability to access other caches when needed. For example, a financial analysis agent might primarily interact with the financial cache but could access the scientific research cache when analyzing biotechnology investments. The system implements cache-specific validation rules and quality metrics tailored to each domain's requirements—financial thoughts might require numerical accuracy validation, while scientific thoughts might undergo peer-review-style verification by other AI agents. These specialized caches can operate independently or in interconnected hierarchies, with bridge agents managing thought transfer between different domains. Enterprise deployments can maintain multiple parallel specialized caches with varying access levels, enabling selective knowledge sharing while preserving security boundaries. For instance, a pharmaceutical company might maintain separate but interconnected caches for public research, proprietary development, and regulatory compliance, with AI agents navigating these boundaries based on clearance levels and task requirements.

The system achieves effectively unlimited context windows through a combination of thought abstraction and hierarchical memory management. Rather than attempting to maintain extended token sequences, the system is capable of converting contextual information into thought representations that capture higher-level patterns and relationships. These thoughts serve as compressed encodings of context, where each thought unit may encapsulate understanding that would traditionally require thousands of tokens to represent.

In one embodiment, the system implements a multi-tier thought storage architecture where context exists simultaneously at multiple levels of abstraction. The most recent context maintains detailed thought representations with full fidelity, while older context is progressively synthesized into more abstract thought patterns that capture essential relationships and understanding while reducing storage requirements. This progressive abstraction allows the system to maintain effectively unlimited context while managing computational resources efficiently.

When processing new prompts, router 810 analyzes both recent detailed thoughts and older abstract thoughts to identify relevant context. A thought synthesizer 830 can then combine these different levels of abstraction to generate new thoughts that incorporate both immediate context and long-term understanding. This multi-level synthesis enables the system to maintain contextual coherence across extended interactions without requiring linear scaling of computational resources.

Thought cache 870 implements indexing structures that maintain temporal relationships between thoughts while enabling efficient retrieval based on relevance. Unlike traditional attention mechanisms that must process entire token sequences, the system can directly access relevant thoughts across any temporal distance through its hierarchical indexing system. This capability allows the model to maintain contextual awareness across arbitrarily long sequences while keeping retrieval costs nearly constant.

In one embodiment, thought cache 870 implements multiple storage tiers that automatically organize thoughts based on their temporal relevance and utilization patterns. In its primary tier, the thought cache maintains recent thoughts with their complete reasoning chains and relationship mappings intact. As these thoughts age within the cache, specialized consolidation mechanisms within the cache combine related thoughts into more efficient meta-thoughts that preserve essential reasoning while reducing storage overhead.

Thought cache 870 monitors access patterns and triggers consolidation events when thought clusters meet specific temporal or utilization thresholds. During these events, thought cache 870 analyzes thought clusters using its built-in synthesis capabilities to generate consolidated meta-thoughts. These meta-thoughts capture insights and relationships from the original thought cluster while requiring significantly less storage space. For example, a sequence of thoughts about various machine learning algorithms might consolidate into a meta-thought capturing their comparative advantages and key implementation considerations.

Intelligence within thought cache 870 adapts consolidation timing based on thought utility metrics. Thought cache 870 tracks each thought's retrieval frequency, synthesis participation, and relationship density with other thoughts. Thoughts demonstrating high utility retain their detailed form longer, while less frequently accessed thoughts undergo earlier consolidation. This adaptive approach ensures that frequently needed reasoning patterns remain readily available in their most useful form.

Thought cache's 870 hierarchical storage structure spans multiple performance tiers, from high-speed memory for recent and frequently accessed thoughts to more economical storage for consolidated meta-thoughts. Thought cache 870 may migrate thoughts between these tiers based on usage patterns and age, optimizing storage resource utilization while maintaining rapid access to relevant contextual information. This tiered structure enables the cache to efficiently manage large volumes of thoughts while keeping the most pertinent information readily accessible.

Thought cache 870 implements a universal thought representation format that enables consistent interpretation across different language models and reasoning contexts. This standardization occurs through a formal thought schema that defines how reasoning steps, logical relationships, and contextual dependencies are encoded. Each thought contains structured fields for core reasoning components, metadata describing the thought's context and assumptions, and explicit markers for temporal and logical dependencies. This structured format ensures that thoughts remain interpretable regardless of which model originally generated them or which model ultimately consumes them.

Before a cached thought is applied to a new context, the system may perform an automated compatibility analysis. This analysis examines both the structural alignment between the cached thought and the current context, and the semantic applicability of the reasoning pattern. The system maintains model-specific adapters that can transform thoughts between different models' preferred reasoning styles while preserving the core logical structure. These adapters handle variations in formatting, vocabulary, and reasoning granularity, ensuring smooth thought transfer between models with different characteristics.

The cache incorporates a contextual validation layer that assesses thought applicability before reuse. When retrieving a cached thought, this layer examines the current prompt's context against the thought's encoded assumptions and dependencies. If misalignments are detected, the system can automatically generate bridging thoughts that reconcile differences between the cached reasoning and the current context. For example, if a cached mathematical proof assumes certain preconditions that differ slightly from the current problem, the system generates additional reasoning steps to account for these differences.

The system's thought schema includes explicit version controls and model compatibility markers. These markers identify which model versions and architectures have successfully utilized each thought, enabling the cache to predict compatibility issues before attempting thought reuse. When new model versions are deployed, the system can automatically flag thoughts that may require revalidation or adaptation to maintain compatibility with updated model capabilities or knowledge cutoffs.

Through these standardization and compatibility mechanisms, the thought cache ensures reliable thought transfer across different models and contexts while maintaining the integrity of reasoning patterns. The combination of structured thought representation, contextual validation, and adaptive transformation enables efficient thought reuse while preventing inconsistencies or misinterpretations.

Through this architecture, the system achieves effective infinite context not through brute-force token retention but through intelligent abstraction and synthesis of understanding. The smaller language model can process these thought-based contexts more efficiently than traditional token sequences, enabling contextual reasoning without the computational overhead typically associated with extended context windows.

The system supports multiple architectural approaches for maintaining extended context through thought processing. While transformer-based attention mechanisms provide one implementation path, the system can alternatively employ recurrent neural networks (RNNs) for processing thought sequences. In an RNN-based implementation, thoughts are processed sequentially, with the network's hidden state maintaining a compressed representation of historical context. This approach enables efficient processing of arbitrary-length thought sequences while maintaining a constant memory footprint, as the hidden state size remains fixed regardless of sequence length.

The system may also implement memory networks for thought storage and retrieval. These networks maintain an explicit, addressable memory that stores thought representations and their relationships. Unlike attention mechanisms that must process all context simultaneously, memory networks can selectively access relevant thoughts through content-based addressing. The memory network architecture enables direct access to specific thoughts based on relevance to the current prompt, without requiring linear scanning of the entire context history.

The thought cache itself can be structured as a differentiable neural memory, where thoughts are stored as embeddings that can be smoothly updated and combined. This approach enables the cache to learn optimal thought storage and retrieval patterns through experience, adapting its organization to maximize the utility of cached thoughts. The differentiable memory structure supports gradient-based optimization of thought storage and retrieval operations, allowing the system to continuously improve its context management efficiency.

Hybrid architectures combining multiple approaches can leverage the strengths of each method. For example, in one embodiment, the system might employ RNNs for sequential thought processing while using a memory network for long-term storage, or combine transformer attention for recent context with compressed RNN states for historical context. These hybrid approaches enable flexible scaling of context processing based on specific application requirements and resource constraints.

Figure 9:
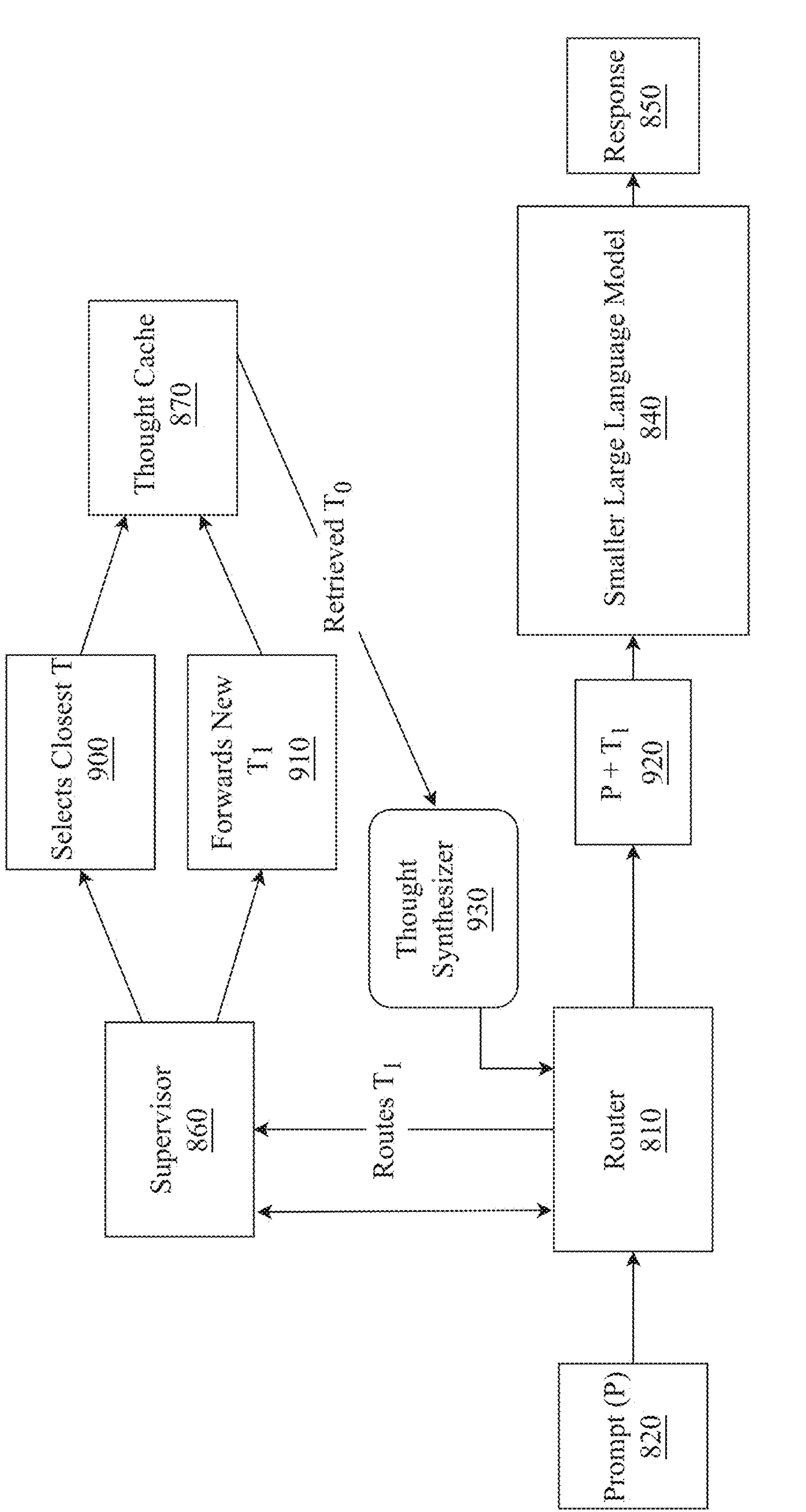
FIG. 9 is a block diagram illustrating an exemplary system architecture for a multi-state LLM with infinite context with thought synthesis and retrieval.

FIG. 9 is a block diagram illustrating an exemplary system architecture for a multi-state LLM with infinite context with thought synthesis and retrieval. The figure demonstrates how the system handles scenarios where cached thoughts may be relevant but not precisely matched to the current prompt.

The system begins when a prompt (P) 820 is received by the router 810. When router 810 receives a prompt 820, it interacts with the thought cache 870 through the controller 860 to retrieve potentially relevant thoughts.

The controller 860 performs two key functions in this embodiment. First, it selects the closest thought (To) 900 from the cache that relates to the current prompt. Second, after a synthesizer 930 creates a new thought $T_1$ 910, controller 960 manages the storage of newly synthesized thoughts. The controller evaluates the retrieved $T_0$ against certain relevance thresholds to determine if synthesis is needed. These thresholds can be configured based on vector similarity scores between the prompt and the cached thought, with different thresholds potentially being set for different domains or use cases. For example, a threshold of 0.8 (on a 0-1 scale) might indicate the thought is relevant enough to use directly, while scores between 0.5-0.8 might trigger synthesis with other related thoughts, and scores below 0.5 might indicate the need to generate entirely new thoughts using the large model. The system can also employ multiple thresholds simultaneously—one for determining if a thought is "close enough" to use directly, another for determining if thoughts are similar enough to be candidates for synthesis, and another for determining if cached thoughts are relevant enough to be considered at all.

The system can assign and append relevance scores and metadata to thoughts in several ways. When a thought (T) is created by the large model, it can be analyzed and scored across multiple dimensions including but not limited to quality assessment metrics, vector embeddings, usage statistics, and domain tags. Quality assessment encompasses the thought's reasoning pattern quality based on its structure and completeness, accuracy scores for verifiable facts, and confidence scores from the model about its conclusions. Vector embeddings can be calculated and stored with each thought, allowing for fast similarity comparisons during cache lookups, with multiple specialized embeddings potentially stored for different aspects like topic, reasoning style, and domain. Usage statistics track metrics such as success rates when the thought is used (including user feedback), frequency of successful reuse, and performance metrics when used with different types of prompts. Domain tags provide additional context through subject matter categorization, specific topic tags, and required expertise level indicators. These scores and metadata can be stored alongside the thought in the cache in a structured format and updated over time based on usage patterns. The comprehensive metadata enables more sophisticated routing and synthesis decisions while allowing the system to improve its thought selection over time through continuous feedback and performance tracking. For instance, a thought might store its general and domain-specific embeddings, various quality and confidence scores, detailed categorization, and usage statistics, all of which can be used to make more informed decisions about when and how to use or synthesize that thought in future operations.

A synthesizer 860 processes $T_0$ to create a new thought $T_1$ that better aligns with the current prompt's requirements. For example, if a prompt asks about specific aspects of quantum computing, and $T_0$ contains general quantum computing concepts, the synthesizer can create a $T_1$ that focuses more precisely on the specific aspects requested in the prompt.

Thought synthesizer 930 combines and processes thoughts when multiple relevant thoughts are found or when existing thoughts need modification. For example, if one cached thought covers quantum bits and another covers error correction, the synthesizer can combine these into a new thought that addresses quantum computing error rates in qubits. The synthesizer can also adapt existing thoughts to better match current prompt requirements. This synthesis process involves understanding the logical relationships between different thoughts, identifying complementary and conflicting information, and creating coherent combinations that preserve the accuracy and context of the original thoughts. The synthesizer employs various combination strategies depending on the relationship between thoughts—it might perform simple concatenation for complementary thoughts, create hierarchical structures for nested concepts, or generate entirely new bridging content to connect related ideas. Additionally, the synthesizer can evaluate the quality of synthesized thoughts and may generate multiple candidate combinations before selecting the most appropriate one based on relevance scores and coherence metrics.

The synthesizer can work with multiple retrieved thoughts simultaneously, combining relevant aspects from each to create a more comprehensive $T_1$. For instance, if one cached thought contains information about neural networks and another about computer vision, the synthesizer could combine relevant aspects of both to create a new thought more specifically targeted to a prompt about neural networks in computer vision applications.

The system may implement multiple strategies for thought synthesis, enabling the combination of existing cached thoughts to generate new, contextually relevant thoughts without necessarily engaging the large language model. These synthesis mechanisms operate on both the semantic content and vector representations of thoughts, employing various combination strategies depending on the relationship between thoughts and specific prompt requirements. The fundamental approach builds upon vector-based synthesis, where thoughts are represented in a high-dimensional embedding space that preserves semantic relationships through spatial relationships. In one embodiment, when multiple relevant thoughts are retrieved from the cache, their vector representations can be combined through a plurality of mathematical operations to create new thought vectors. These operations may include but are not limited to weighted averaging where more relevant thoughts receive higher weights in the final combination, vector addition with normalization that preserves the directional information of component thoughts, dimensional projection where thoughts are combined along specific semantic dimensions while preserving others, and non-linear combination using learned transformation matrices.

The system demonstrates this vector-based synthesis through concrete applications. For instance, when processing a prompt that requires information about quantum computing's impact on cryptocurrency, and the cache contains separate thoughts about quantum computing ($T_1$) and cryptocurrency security ($T_2$), the system performs a weighted combination expressed as $T\_new=\alpha*T1+\beta*T2$, where $\alpha$ and $\beta$ represent relevance weights determined by similarity scores between each thought and the prompt. The resulting vector T_new is normalized to maintain consistent magnitude in the embedding space, ensuring that the synthesized thought retains proper proportional representation of its component concepts.

Beyond pure vector operations, the system, in additional embodiments, may employ neural synthesis through a specialized small-scale transformer model trained specifically for thought combination. A neural synthesizer would receive multiple thought vectors as input and generates a new, synthesized thought that captures the relevant aspects of all inputs while maintaining internal consistency. The neural synthesis component is capable of identifying and resolving contradictions between input thoughts, preserving temporal relationships and causal chains, generating bridging content to connect related concepts, and maintaining consistency with the original prompt context. This approach proves particularly valuable when combining thoughts that require subtle understanding of context and implications.

In another embodiment, the system may implement rule-based synthesis through a set of predefined combination patterns based on the logical relationship between thoughts. These patterns support sequential combination for thoughts representing steps in a process, hierarchical combination for thoughts with parent-child relationships, comparative combination for contrasting or parallel thoughts, and supplementary combination for thoughts that provide additional context or examples. The rule-based approach ensures that the structural integrity of thought relationships is preserved during synthesis.

In an embodiment, the system may employ a synthesis quality assessor that evaluates potential thought combinations before they are executed. This assessment examines semantic coherence of the combined thought, preservation of information from source thoughts, relevance to the original prompt, and internal consistency of the synthesized thought. The quality assessment process helps prevent the generation and propagation of invalid or inconsistent thought combinations.

In scenarios where multiple synthesis strategies might apply, the system employs a multi-stage synthesis process. This process begins by generating candidate syntheses using different strategies, proceeds to evaluate each candidate using quality metrics, selects the highest-quality synthesis result, and caches the successful synthesis strategy for similar future combinations. This approach ensures optimal synthesis results while building a knowledge base of effective strategies.

The synthesis mechanism supports multiple operation modes including synchronous operation for immediate response requirements, asynchronous operation for background synthesis and cache optimization, and hybrid operation for progressive refinement of synthesized thoughts. This flexibility allows the system to balance response time requirements with synthesis quality needs. Through these synthesis mechanisms, the system can effectively combine and evolve cached thoughts to address new prompts without always requiring the computational overhead of the large language model, while maintaining the quality and relevance of generated responses.

Once $T_1$ is created, it is combined with the original prompt to form P+$T_1$ 920, which is then processed by the smaller language model 840 to generate the final response 850. The newly synthesized $T_1$ is also routed back through the controller for potential caching with thought cache 370, allowing it to be used for future similar prompts.

In one embodiment, thought cache 870 provides performance improvements by eliminating redundant reasoning computations across similar prompts. When 810 router identifies a new prompt with reasoning requirements similar to previously processed queries, thought cache 870 can supply validated thought patterns rather than requiring the large language model to reconstruct the reasoning chain from scratch. This caching mechanism is particularly effective for common analytical patterns, such as mathematical derivations, logical deductions, or standard analytical frameworks that appear frequently across different prompts.

Additionally, thought cache 870 is capable of serving as a quality assurance mechanism by maintaining verified reasoning patterns. Once a thought sequence has been validated and demonstrates consistent success in generating accurate responses, that sequence becomes a trusted template for handling similar queries. For instance, when processing mathematical problems, the cache may contain verified proof structures that can be applied to new problems within the same class, ensuring consistent and reliable solution approaches.

In one embodiment, thought cache 870 implements a validation scoring system that tracks the success rate and reliability of each cached thought. This scoring considers factors such as but not limited to response accuracy, user feedback, and consistency with known truth standards. Thoughts that consistently contribute to high-quality responses receive higher validation scores, making them more likely to be selected for reuse in similar contexts. The cache can also mark certain thoughts as "golden" references when they demonstrate exceptional reliability in specific domains, establishing them as preferred reasoning patterns for their respective problem types.

To prevent the propagation of incorrect reasoning, thought cache 870 may employ a continuous validation mechanism. This mechanism monitors the performance of cached thoughts and can automatically flag patterns that lead to inconsistent or incorrect responses. When potential issues are detected, thought cache 870 may temporarily suspend the use of problematic thoughts and route similar prompts through the large language model for fresh analysis. This self-correction capability ensures that the efficiency benefits of thought caching do not come at the expense of response quality.

Thought cache 870 is capable of supporting selective thought inheritance, where new prompts can partially inherit validated reasoning patterns while allowing for context-specific modifications. This flexibility enables the system to leverage proven reasoning frameworks while adapting them to specific query requirements, combining the benefits of cached reliability with contextual relevance. Through these mechanisms, the thought cache achieves both performance optimization and quality enhancement, delivering faster responses while maintaining or improving the reliability of the system's outputs.

Through this synthesis process, the system can effectively leverage partially relevant cached thoughts to create more precise and relevant thoughts for the current prompt, reducing the need to engage the large language model while still maintaining response quality and relevance. In another embodiment, thought cache 870 implements security and privacy controls to protect sensitive information while enabling efficient thought reuse. At the storage level, thought cache 370 maintains isolation between user contexts through encrypted partitioning. Each user's thoughts are encrypted with user-specific keys, ensuring that even within shared cache infrastructure, thoughts remain securely compartmentalized. This encryption extends to both the thought content and the associated metadata, preventing unauthorized access to reasoning patterns that might reveal proprietary information.

In the embodiment, thought cache 870 implements a permissions framework that governs thought sharing and reuse. By default, thoughts derived from user interactions are marked private and restricted to the originating user's context. Users can optionally designate specific thoughts for shared use through explicit consent mechanisms. When thoughts are marked for sharing, the cache employs automated sanitization processes that strip personally identifiable information and sensitive data while preserving the underlying reasoning patterns. This sanitization uses advanced pattern recognition to identify and remove context-specific details while maintaining the thought's utility for general reasoning.

To protect against cache poisoning attacks, thought cache 870 may incorporate a multi-stage validation pipeline. Before any thought is cached, it undergoes verification through a separate validation model that assesses its logical consistency and checks for potential malicious patterns. The cache maintains cryptographic checksums of validated thoughts, enabling rapid verification of thought integrity during retrieval operations. Additionally, the cache tracks the provenance of each thought, maintaining secure audit trails of thought creation, modification, and usage patterns.

The system implements graduated access controls that can restrict thought reuse based on security clearance levels, organizational boundaries, or specific sharing agreements. These controls allow enterprises to maintain separate thought caches for different security domains while selectively enabling thought sharing under controlled conditions. For instance, a financial institution might maintain separate caches for public customer service interactions and privileged internal analyses, with strict controls governing any cross-domain thought utilization.

Through these security mechanisms, the thought cache enables efficient reasoning reuse while protecting sensitive information and maintaining system integrity. The combination of encryption, access controls, and validation processes ensures that the performance benefits of thought caching do not compromise security or privacy requirements.

Figure 10:
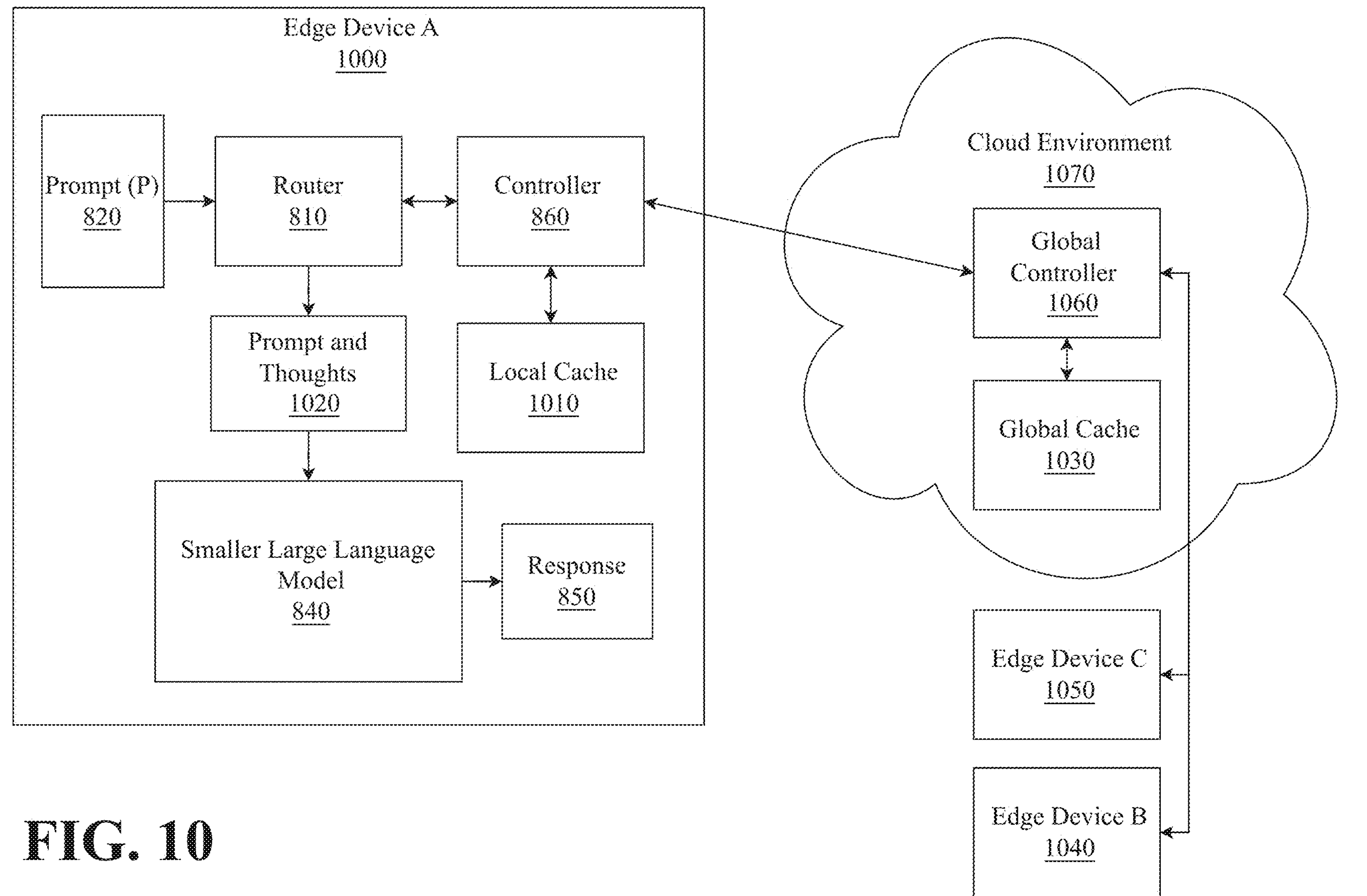
FIG. 10 is a block diagram illustrating an exemplary system architecture for a multi-state LLM with infinite context with local and global thought caches.

FIG. 10 is a block diagram illustrating an exemplary system architecture for a multi-state LLM with infinite context with local and global thought caches. This embodiment demonstrates how the system can operate primarily on edge devices while maintaining access to a broader knowledge base through cloud connectivity.

Edge device A 1000 represents a complete edge implementation of the system, which could be a device such as but not limited to a mobile phone, tablet, or other personal computing device. Within the edge device 1000, router 810 receives prompts (P) 820 and coordinates with a local controller 860 and local cache 1010. Local cache 1010 stores frequently accessed or personally relevant thoughts directly on the device, enabling quick access and offline functionality.

The smaller language model 840 runs directly on the edge device, processing prompt and thought combinations 1020 to generate responses 850. This local processing capability significantly reduces latency and computational requirements compared to constantly accessing cloud resources.

The cloud environment 1070 contains a global cache 1030 managed by a global controller 1060. This global infrastructure serves as a centralized repository for thoughts generated across multiple edge devices (B 1040, C 1050). The global controller coordinates cache synchronization and manages access patterns across the network of connected devices.

When an edge device's controller 860 cannot find relevant thoughts in its local cache 510, it can query the global controller 1060 to search the global cache 1030. For example, if a user on edge device A 1000 asks a question about a topic they haven't encountered before, the system first checks the local cache 1010, then can reach out to the global cache 1030 for relevant thoughts.

The system supports bi-directional synchronization, where new thoughts generated on edge devices can be uploaded to the global cache, and frequently accessed global thoughts can be downloaded to local caches. This creates a dynamic knowledge-sharing environment while maintaining efficient local operation.

Through this architecture, the system provides the benefits of edge computing (low latency, offline capability, privacy) while maintaining access to a broader knowledge base through the cloud infrastructure. The distributed nature of the system allows for efficient scaling and knowledge sharing across user communities while minimizing the computational load on individual devices.

Figure 11:
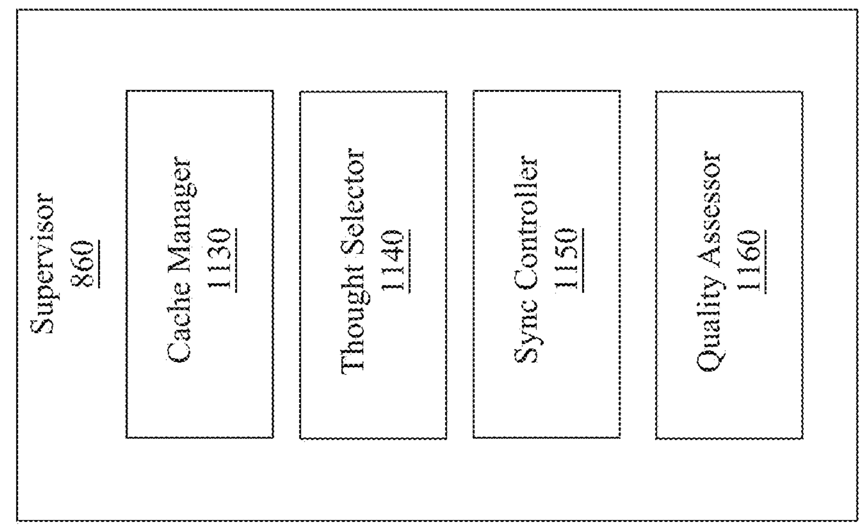
FIG. 11 is a block diagram illustrating exemplary components for a multi-state LLM with infinite context, a router and a controller.
Figure 11:
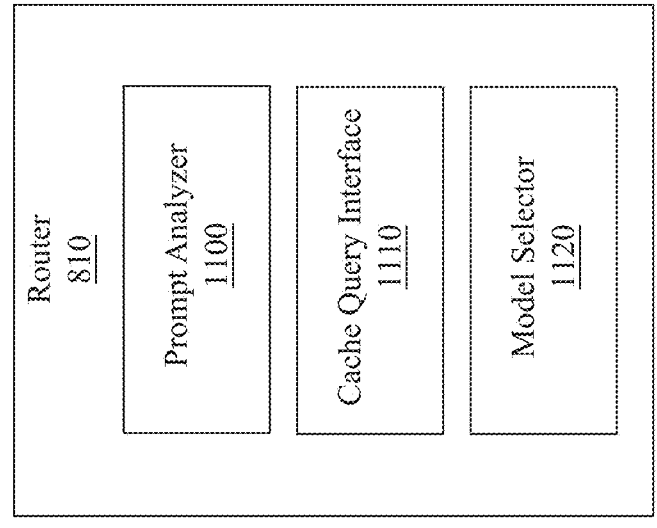

FIG. 11 is a block diagram illustrating exemplary components for a multi-state LLM with infinite context, a router and a controller. A prompt analyzer 1100 processes incoming prompts to determine their characteristics, domain, and requirements. For example, if a user submits a prompt about quantum computing, the analyzer identifies key technical terms, determines the complexity level, and flags specific concepts that may need specialized thoughts. It also evaluates whether the prompt requires reasoning about multiple concepts (like quantum computing and machine learning) that might benefit from thought synthesis. Analyzer 1100 employs natural language processing to break down the prompt into component parts, identifying primary topics, subtopics, relationships between concepts, required depth of knowledge, and any constraints or special requirements specified in the prompt. It can also detect the tone and style of the desired response, technical sophistication level of the user, and whether the prompt requires factual recall, analytical reasoning, or creative synthesis.

A cache query interface 1110 serves as the communication bridge between the router and cache systems. It formats prompt analysis results into efficient cache queries and manages the retrieval process. For instance, when searching for thoughts about quantum computing, it might query both technical definition thoughts and practical application thoughts, managing multiple parallel cache requests to both local and global caches. The interface optimizes query patterns based on the analyzer's output, constructing sophisticated search parameters that account for concept hierarchies, semantic relationships, and contextual relevance. It can prioritize different aspects of the query based on importance, manage query timeouts and fallbacks, and handle distributed cache architectures efficiently. The interface also implements caching strategies to optimize frequent queries and manages cache coherence between local and global storage.

A model selector 1120 makes intelligent decisions about model utilization based on cache results and prompt analysis. It implements decision logic to determine whether to: use the large model for new thought generation, proceed with cached thoughts through the smaller model, or employ a hybrid approach. For example, if highly relevant thoughts exist in the cache, it might bypass the large model entirely to save computational resources. In one embodiment, model selector 1120 employs decision trees and heuristics that consider multiple factors including thought relevance scores, computational resource availability, response time requirements, and quality thresholds. It can dynamically adjust its selection criteria based on system load, cache hit rates, and historical performance metrics. Model selector 1120 also maintains statistics about the effectiveness of its decisions to continuously refine its selection strategy and may implement different selection policies based on user preferences or application requirements.

A cache manager 1130 handles the organization, storage, and retrieval of thoughts in both local and global caches. It implements indexing strategies for quick thought retrieval and manages cache memory efficiently. For example, it might maintain separate indices for different knowledge domains or implement priority-based storage systems where frequently accessed thoughts are kept in faster memory. Cache manager 1130 implements eviction policies to optimize cache utilization, considering factors such as but not limited to thought frequency of use, recency, size, and interdependencies with other cached thoughts. It also handles cache coherence between local and global stores, implements versioning and conflict resolution for distributed caches, and maintains metadata about cache performance and utilization patterns. The manager can dynamically adjust its caching strategies based on usage patterns and system resources, potentially implementing different policies for different types of thoughts or knowledge domains.

A thought selector 1140 implements algorithms to identify and select the most relevant thoughts from the cache. It uses similarity metrics and relevance scoring to rank cached thoughts based on their applicability to the current prompt. For instance, when processing a prompt about quantum computing applications in cryptography, it might prioritize thoughts that bridge both quantum and cryptographic concepts. Thought selector 1140 may employ multiple ranking algorithms that consider various aspects of thought relevance, including semantic similarity, contextual appropriateness, freshness, and historical success rates. It can perform multi-stage selection processes, first identifying broadly relevant thoughts and then refining the selection based on more specific criteria. The selector also considers relationships between thoughts, potentially selecting groups of related thoughts that together provide comprehensive coverage of the prompt's requirements. It maintains performance metrics about selection accuracy and can adapt its selection criteria based on feedback about the effectiveness of selected thoughts in generating successful responses.

A sync controller 1150 manages the complex task of synchronizing thoughts between local and global caches. It implements policies for when to upload local thoughts to the global cache and when to download global thoughts to local storage. For example, it might upload locally generated thoughts about emerging technologies to the global cache while downloading commonly accessed thoughts about fundamental concepts to local storage. Sync controller 1150 may employ synchronization strategies that balance network bandwidth usage, storage constraints, and data freshness requirements. It implements conflict resolution mechanisms for handling simultaneous updates, version control for tracking thought evolution, and differential synchronization to minimize data transfer. Sync controller 1150 can adapt its sync frequency and policies based on usage patterns, network conditions, and device capabilities. It also maintains detailed synchronization logs and metrics to optimize future sync operations and implements recovery mechanisms for handling failed synchronization attempts. Additionally, sync controller 1150 can prioritize synchronization tasks based on thought importance, urgency, and resource availability.

A quality assessor 1160 continuously evaluates thought quality and usefulness. It monitors factors such as thought relevance, accuracy, and usage patterns to maintain cache quality. For example, if certain thoughts consistently lead to high-quality responses (as measured by user feedback or other metrics), they might be prioritized for retention and synchronization. Conversely, thoughts that rarely prove useful might be flagged for removal or update. Quality assessor 1160 may employ multiple evaluation criteria including syntactic correctness, semantic coherence, factual accuracy, and practical utility. It maintains historical performance metrics for each thought, tracking success rates in different contexts and user satisfaction levels. Quality assessor 1160 can detect outdated or inconsistent thoughts, identify redundant thoughts that could be merged, and flag thoughts that may need revision due to changing knowledge or requirements. It implements adaptive quality thresholds that can vary based on thought domain, importance, and usage context. Quality assessor 1160 also provides detailed quality reports that can be used to guide cache maintenance operations and thought synthesis decisions, and it can trigger automatic thought improvement processes when quality metrics fall below acceptable thresholds.

Figure 12:
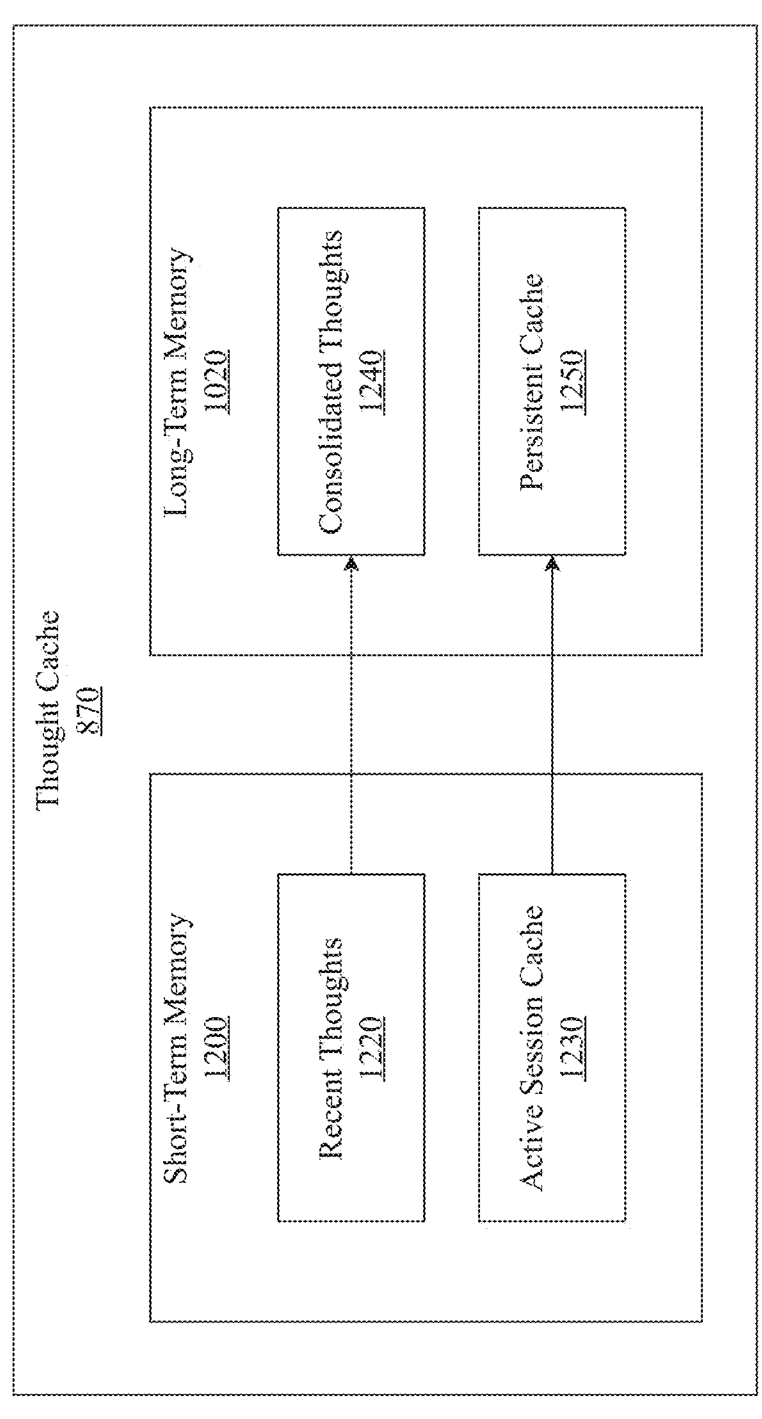
FIG. 12 is a block diagram illustrating an exemplary system architecture of a thought cache that has both a long-term memory and a short-term memory.

FIG. 12 is a block diagram illustrating an exemplary system architecture of a thought cache that has both a long-term memory and a short-term memory. In one embodiment, thought cache 870 represents a system for maintaining effectively unlimited context in language models through progressive compression and intelligent caching of thought patterns, enabling shared reasoning across multiple AI instances.

Thought cache 870 implements both a short-term memory 1200 and a long-term memory 1210. This dual-memory architecture enables the system to maintain both immediate computational context and historical reasoning patterns while managing computational resources efficiently.

The short-term memory 1200 comprises recent thoughts 1220 and an active session cache 1030. Recent thoughts 1220 maintain complete thought fidelity, storing both the explicit reasoning chains and the internal model states that generated them. This storage preserves not only the textual representation of thoughts but also the computational context and attention patterns that produced them, enabling precise replication of reasoning processes. The active session cache 1230 provides rapid access to these thoughts and their associated states, optimizing performance for ongoing interactions and enabling immediate thought sharing between different AI instances or specialized reasoning modules operating within the same session.

The long-term memory 1210 implements a more sophisticated storage approach through consolidated thoughts 1240 and a persistent cache 1250. Consolidated thoughts 1240 represent progressively compressed versions of thought patterns, where multiple related thoughts are combined into more compact representations while preserving essential reasoning patterns. This consolidation process employs various compression techniques, including attention-based compression, semantic clustering, and state space reduction. The persistent cache 1250 implements an indexed storage system that enables semantic search and retrieval of these consolidated thoughts, supporting efficient thought sharing across different AI instances and computing sessions.

The system implements bidirectional information flow between these components. Thoughts can move from recent thoughts 1220 to consolidated thoughts 1240 through progressive compression, while the active session cache 1230 can transfer frequently accessed patterns to the persistent cache 1250 for long-term retention. This bidirectional flow enables dynamic thought sharing between different system components and AI instances, supporting collaborative reasoning across multiple agents.

The architecture supports multiple implementation approaches for thought storage and transfer. Thoughts can be stored as chain-of-thought text, internal model states, attention patterns, or hybrid representations combining multiple formats. The system can dynamically select the most appropriate storage format based on the thought's intended use and the capabilities of the AI instances that may access it.

This architectural design enables the thought cache to serve as a central memory system for multiple AI instances, supporting collaborative reasoning while maintaining computational efficiency. The combination of short-term and long-term memory systems, along with progressive compression and flexible thought representation, allows the system to maintain effectively unlimited context while enabling efficient thought sharing across different AI agents and reasoning modules.

Through this architecture, the system achieves both unbounded context maintenance and efficient cross-instance thought sharing, two key innovations that enable more sophisticated and resource-efficient AI reasoning systems. The design's flexibility in implementation approaches and storage formats helps prevent trivial circumvention while enabling broad application across different types of language models and AI systems.

In one embodiment the system implements a collaborative thought sharing architecture that enables multiple AI agents to access and utilize a common thought cache. This shared cache architecture supports distributed reasoning across different types of language models and specialized reasoning modules while maintaining thought consistency and accessibility. When multiple users or AI agents operate within the system, they can all contribute to and benefit from the accumulated reasoning patterns stored in the shared cache.

The shared thought cache maintains a unified index that enables any authorized user or AI agent to access relevant thoughts regardless of which agent originally generated them. This indexing system tracks not only the content of thoughts but also their originating context, generating agent, and successful usage patterns. For example, when a specialized mathematical reasoning module generates a thought containing a proof strategy, that thought becomes available to general language models handling related mathematical queries, enabling them to leverage expert reasoning patterns without duplicating the computational effort.

Thought transfer between specialized reasoning modules occurs through a standardized thought protocol. This protocol defines how thoughts are packaged, transmitted, and unpacked between different types of AI agents. When transferring thoughts, the system includes not just the reasoning content but also relevant metadata such as the thought's context requirements, assumptions, and compatibility markers. For instance, if a natural language processing agent generates insights about sentence structure, these thoughts can be transferred to a grammar checking module in a format that preserves the structural analysis while adapting it to the specialized module's processing requirements.

The system coordinates collaborative reasoning through a central orchestration mechanism. This orchestrator tracks which agents are actively processing related prompts and manages the flow of thoughts between them. When multiple agents encounter similar reasoning requirements, the orchestrator can initiate thought sharing to prevent redundant computation. For example, if one agent has already performed detailed analysis of a complex concept, other agents can build upon that analysis rather than repeating it.

Cross-instance reasoning is enabled through thought synthesis capabilities. When different model instances approach similar problems from different angles, their thoughts can be combined to create more comprehensive understanding. The system tracks the complementary strengths of different model instances and can route thoughts to the most appropriate agent for specific types of reasoning tasks. For instance, a general language model might handle initial prompt analysis, while specialized agents process domain-specific aspects, with their combined thoughts contributing to the final response.

The shared cache implements sophisticated access control and version management to maintain thought integrity across multiple agents. Each thought is versioned to track its evolution as different agents interact with and build upon it. The system maintains provenance information that records how thoughts are transformed and combined through multi-agent collaboration, enabling attribution and quality assessment of collaborative reasoning patterns.

Through these mechanisms, the system enables efficient distribution of reasoning tasks across specialized modules while maintaining coherent thought flow. The collaborative architecture allows different AI agents to contribute their specialized capabilities while benefiting from the collective reasoning capacity of the system. This approach significantly reduces computational redundancy while enabling more sophisticated reasoning through the combination of multiple specialized perspectives.

Description of Method Aspects

Figure 14:
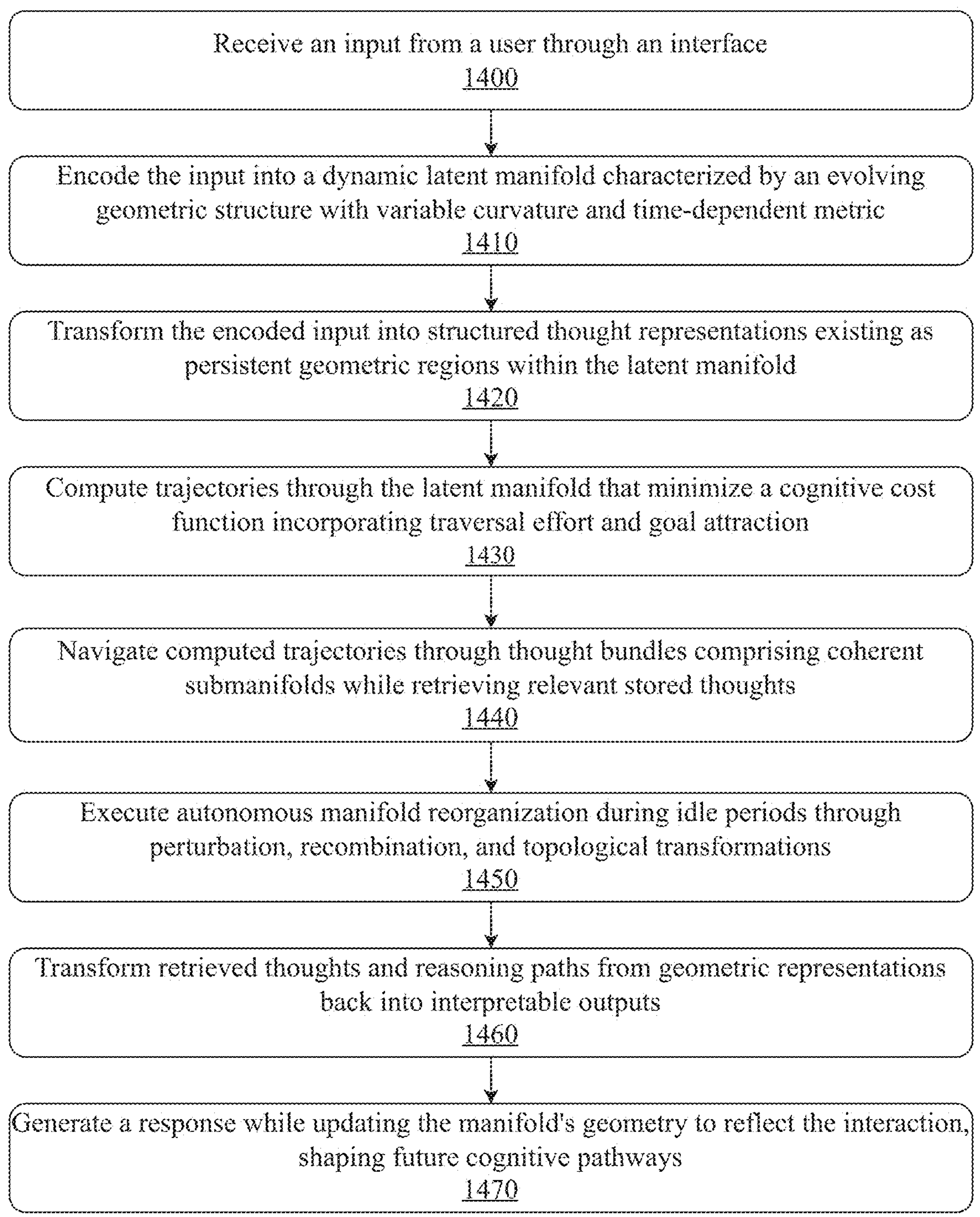
FIG. 14 is a flow diagram illustrating an exemplary method for implementing persistent cognitive computation through geometric representation and manipulation of thoughts within a dynamic latent manifold.

FIG. 14 is a flow diagram illustrating an exemplary method for implementing persistent cognitive computation through geometric representation and manipulation of thoughts within a dynamic latent manifold. In a first step 1400, receive an input from a user through an interface. This initial step establishes the entry point for external information into the cognitive process, where inputs may comprise natural language queries, multimodal data streams, commands, or any form of structured or unstructured information requiring cognitive processing. The interface serves as a bidirectional communication channel that not only receives inputs but maintains context from previous interactions, enabling coherent long-term dialogues where each new input can build upon established semantic foundations encoded within the geometric substrate.

In a step 1410, encode the input into a dynamic latent manifold characterized by an evolving geometric structure with variable curvature and time-dependent metric. This encoding process transforms raw external data into geometric representations within a high-dimensional space where semantic relationships are captured through curvature, distance, and topological features rather than static vector embeddings. The latent manifold operates as a living geometric substrate with a Riemannian or pseudo-Riemannian metric tensor that evolves based on usage patterns, wherein frequently accessed semantic regions develop distinct curvature characteristics that facilitate efficient navigation. The encoding respects existing manifold structure, placing new inputs in regions that maintain semantic coherence with previously encoded information while allowing the manifold itself to deform and adapt to accommodate novel concepts. This dynamic encoding ensures that the same input may be mapped to slightly different manifold locations at different times, reflecting the evolving understanding and context within the cognitive system.

In a step 1420, transform the encoded input into structured thought representations existing as persistent geometric regions within the latent manifold. Thoughts, as discrete units of reasoning or analysis generated during processing, are not mere points in space but extended geometric structures that may manifest as compact submanifolds, trajectories, or complex topological features. This transformation involves processing the encoded input through sophisticated algorithms that identify semantic components, establish relationships between concepts, and construct high-dimensional representations that capture not only explicit content but implicit contextual meanings and potential inferential pathways. The resulting thought structures exhibit internal geometry that reflects their semantic complexity, with simple atomic thoughts occupying relatively flat regions while complex structured thoughts may exhibit significant curvature and multi-dimensional extent. These thought representations become persistent features of the manifold, subject to future retrieval, recombination, and evolution through continued cognitive activity.

In a step 1430, compute trajectories through the latent manifold that minimize a cognitive cost function incorporating traversal effort and goal attraction. This computation implements geodesic attention, where focus or inference is achieved by computing minimal-energy paths through the manifold rather than discrete selection operations. The cognitive cost function balances multiple factors including kinetic energy that penalizes rapid shifts in attention, compression pressure derived from local semantic density that makes traversal through highly compressed regions more costly, and goal potential fields that create attractive forces toward relevant semantic areas. The trajectory computation employs variational principles to find paths that optimize this multi-factor cost function, resulting in smooth, continuous reasoning paths that respect the manifold's geometry while efficiently pursuing cognitive objectives. These trajectories may branch, merge, or exhibit complex topology depending on the interplay between manifold structure and goal requirements, enabling rich inferential patterns that go beyond linear reasoning chains.

In a step 1440, navigate computed trajectories through thought bundles comprising coherent submanifolds while retrieving relevant stored thoughts. Navigation involves traversing the computed paths while interacting with latent subspaces or thought bundles-localized, compressible regions containing structurally similar or semantically aligned thoughts. As trajectories pass through or near these bundles, relevant thoughts are activated and retrieved based on geometric proximity, semantic alignment, and contextual appropriateness. The navigation process respects bundle boundaries and internal structure, potentially following established paths within bundles that represent well-learned reasoning patterns or exploring novel connections between previously unrelated bundles. Retrieved thoughts contribute to the ongoing cognitive process, providing historical context, learned patterns, and relevant knowledge that enriches the current reasoning trajectory. This navigation implements a form of associative memory where retrieval is not based on exact matching but on geometric traversal through semantically organized space.

In a step 1450, execute autonomous manifold reorganization during idle periods through perturbation, recombination, and topological transformations. This dreaming process operates as a background mechanism for structural optimization and generalization discovery. Perturbation involves applying controlled stochastic variations to existing thought structures to test their stability and explore nearby semantic spaces. Recombination implements sophisticated interpolation and integration algorithms that synthesize new abstractions from existing thoughts, potentially discovering emergent patterns or generalizations not explicitly present in the original structures. Topological transformations may alter the fundamental connectivity of the manifold, creating new bridges between previously disconnected regions or splitting overly complex areas into more manageable components. These reorganization operations improve manifold efficiency, reduce redundancy, and enhance the system's capacity for creative inference and generalization, all while maintaining semantic coherence and preserving valuable learned structures.

In a step 1460, transform retrieved thoughts and reasoning paths from geometric representations back into interpretable outputs. This decoding process must interpret rich geometric information including positions within the manifold, traversed trajectories, local curvature contexts, and relationships between activated thought bundles. The transformation preserves not just the conclusions reached but the reasoning process itself, enabling explanatory outputs that reflect the structured path taken through semantic space. Decoding accounts for the multi-dimensional nature of thoughts, potentially generating outputs that capture nuanced relationships, conditional dependencies, and contextual qualifications that emerge from the geometric reasoning process. The decoded information maintains coherence with the original query while potentially introducing insights or connections discovered through manifold traversal that were not explicitly present in the input.

In a step 1470, generate a response while updating the manifold's geometry to reflect the interaction, shaping future cognitive pathways. Response generation synthesizes the decoded thoughts and reasoning paths into appropriate output formats while simultaneously modifying the underlying geometric substrate based on the completed cognitive cycle. Manifold updates may include but are not limited to strengthening frequently traversed paths through metric adjustment, increasing curvature around newly important semantic regions, establishing new connections between previously unrelated thoughts, and adjusting bundle boundaries to reflect evolved understanding. These geometric modifications ensure that future cognitive operations benefit from accumulated experience, with successful reasoning patterns becoming easier to traverse while maintaining flexibility for novel exploration. The bidirectional process of response generation and manifold update implements a form of continuous learning where each interaction contributes to the long-term evolution of the cognitive substrate, creating an increasingly sophisticated geometric landscape that embodies accumulated knowledge, learned patterns, and refined reasoning capabilities.

Figure 15:
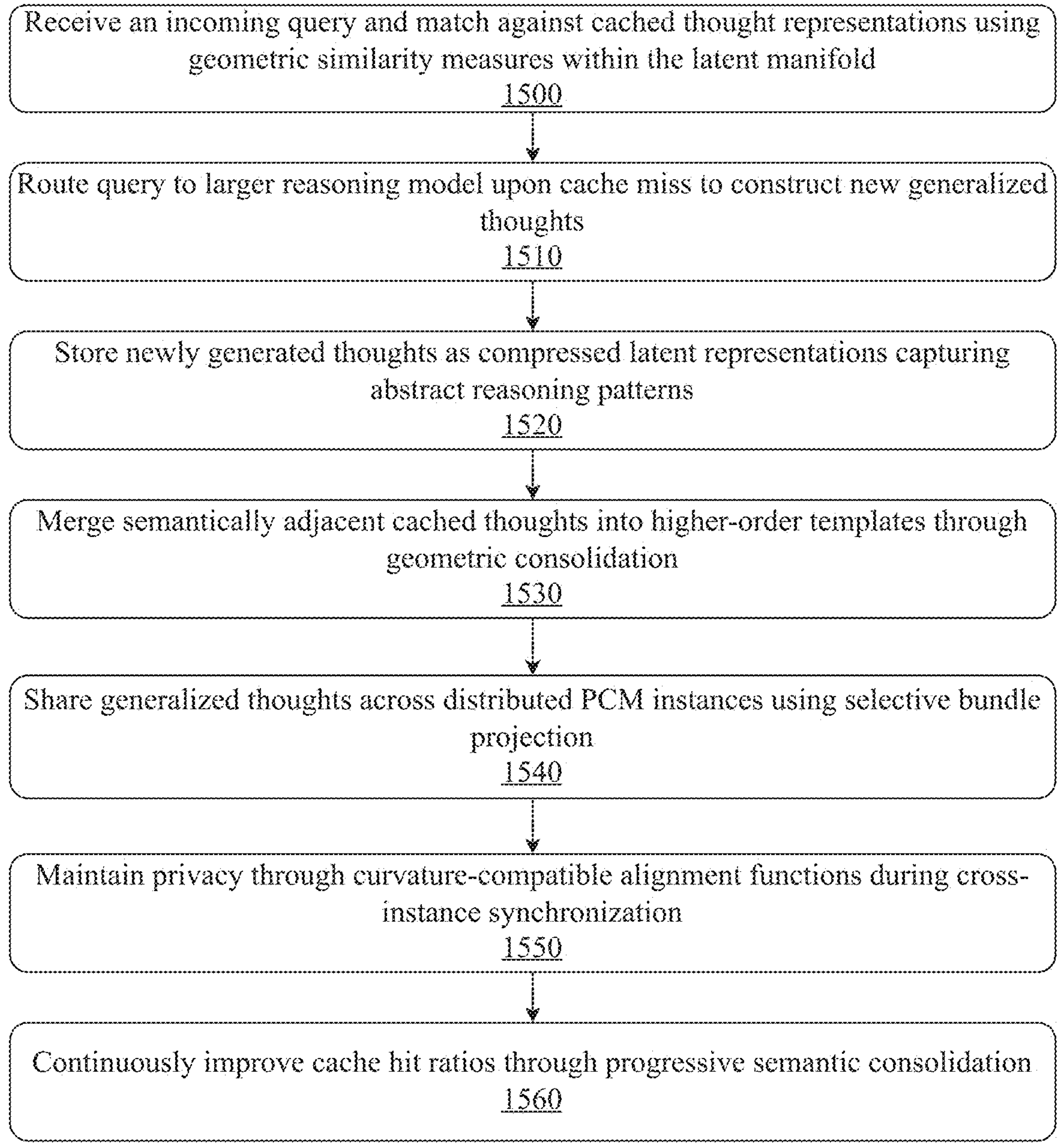
FIG. 15 is a flow diagram illustrating an exemplary method for implementing distributed thought caching with progressive generalization across multiple cognitive instances.

FIG. 15 is a flow diagram illustrating an exemplary method for implementing distributed thought caching with progressive generalization across multiple cognitive instances. In a first step 1500, receive an incoming query and match against cached thought representations using geometric similarity measures within the latent manifold. This initial matching process employs sophisticated geometric comparison techniques that go beyond simple vector similarity to evaluate semantic alignment within the curved space of the manifold. The thought cache, as a structured memory layer configured to store and retrieve thoughts based on semantic similarity, contextual alignment, or system policy, maintains indexed representations in latent space that can be accessed through multiple retrieval mechanisms. Geometric similarity measures account for manifold curvature, considering not just Euclidean distances but geodesic proximity that respects the semantic topology of the space. The matching process evaluates both direct similarity to individual cached thoughts and alignment with thought bundles or trajectories, enabling retrieval of relevant knowledge even when exact matches don't exist. This geometric matching approach allows for flexible retrieval that captures semantic relationships, analogical connections, and contextual relevance that would be missed by flat similarity metrics.

In a step 1510, route query to larger reasoning model upon cache miss to construct new generalized thoughts. When geometric matching fails to identify sufficiently relevant cached thoughts, the query triggers invocation of more comprehensive reasoning capabilities to generate new understanding. This routing decision is based on confidence thresholds that account for the quality of geometric matches, the specificity of the query, and the coverage of existing cached knowledge. The larger reasoning model processes the query with full computational resources, generating not just specific answers but generalized thoughts that capture abstract reasoning patterns suitable for future reuse. These newly constructed thoughts are designed from inception to be cacheable and generalizable, incorporating structured representations that encode not just conclusions but reasoning pathways, contextual dependencies, and semantic relationships that enable broad applicability across future queries.

In a step 1520, store newly generated thoughts as compressed latent representations capturing abstract reasoning patterns. The storage process implements sophisticated compression techniques that preserve essential semantic structure while reducing representational redundancy. Thoughts undergo geometric compression that identifies and preserves features such as key conceptual relationships, reasoning pathways that led to insights, contextual boundaries that define applicability, and connections to existing knowledge structures. The compressed representations maintain their geometric properties within the latent manifold, ensuring they can be properly integrated with existing cached thoughts and participate in future geometric operations. Compression occurs at multiple levels, from local optimization of individual thought representations to global reorganization of cache structure, ensuring efficient storage without loss of semantic fidelity or reasoning capability.

In a step 1530, merge semantically adjacent cached thoughts into higher-order templates through geometric consolidation. This merging process implements the generalization operation, synthesizing new thoughts from cached thoughts by identifying shared structure, meaning, or trajectory. The latent recombinator functionality examines geometric proximity and semantic alignment to identify candidates for consolidation, using criteria such as overlapping activation patterns, similar reasoning structures, compatible contextual constraints, and complementary knowledge domains. Geometric consolidation creates meta-thoughts that abstract common patterns while preserving distinctive features, employing manifold-aware interpolation techniques that respect curvature and maintain semantic coherence. The resulting higher-order templates serve as powerful generalizations that can match a broader range of future queries while maintaining specificity through parameterizable components that adapt to context.

In a step 1540, share generalized thoughts across distributed PCM instances using selective bundle projection. This sharing mechanism enables collaborative intelligence while respecting instance boundaries and privacy requirements. Selective bundle projection identifies portions of thought bundles suitable for sharing based on generalization level, privacy constraints, and cross-instance relevance. The projection process maps local geometric structures into a shared representational space that maintains semantic relationships while abstracting instance-specific details. Shared thoughts undergo geometric transformation that preserves their essential reasoning patterns and conceptual relationships while removing or generalizing contextual information tied to specific instances. This selective sharing enables different cognitive instances to benefit from collective learning without exposing sensitive or irrelevant local knowledge.

In a step 1550, maintain privacy through curvature-compatible alignment functions during cross-instance synchronization. Privacy preservation employs sophisticated geometric techniques that ensure knowledge sharing occurs at appropriate abstraction levels. Curvature-compatible alignment functions match geometric structures across instances while preventing reconstruction of detailed local information, using techniques such as differential privacy applied to manifold structures, homomorphic transformations that preserve reasoning capability while obscuring specific content, and selective geometric abstraction that shares patterns without revealing instances. The alignment process ensures that shared knowledge integrates properly with local manifold structures while maintaining boundaries that prevent unauthorized access to instance-specific information. This geometric approach to privacy enables rich knowledge sharing while providing mathematical guarantees about information disclosure limits.

In a step 1560, continuously improve cache hit ratios through progressive semantic consolidation. This ongoing optimization process analyzes cache performance metrics and identifies opportunities for structural improvement. Progressive consolidation examines patterns in cache hits and misses to identify frequently accessed semantic regions requiring enhanced representation, gaps in cached knowledge that lead to repeated cache misses, redundant representations that could be unified through further generalization, and emerging patterns in query streams that suggest new abstraction opportunities. The consolidation process operates continuously, making incremental improvements to cache structure through targeted operations such as merging highly correlated thoughts into unified representations, creating new intermediate abstractions that bridge frequently traversed semantic gaps, reorganizing bundle structures to improve retrieval efficiency, and pruning obsolete thoughts that no longer contribute to cache performance. This progressive refinement ensures that cache efficiency improves over time, with hit ratios increasing as the cache structure becomes better aligned with actual usage patterns and semantic requirements. The method creates a self-improving distributed knowledge system where each instance benefits from collective learning while maintaining autonomy and privacy through geometric abstraction principles.

Figure 16:
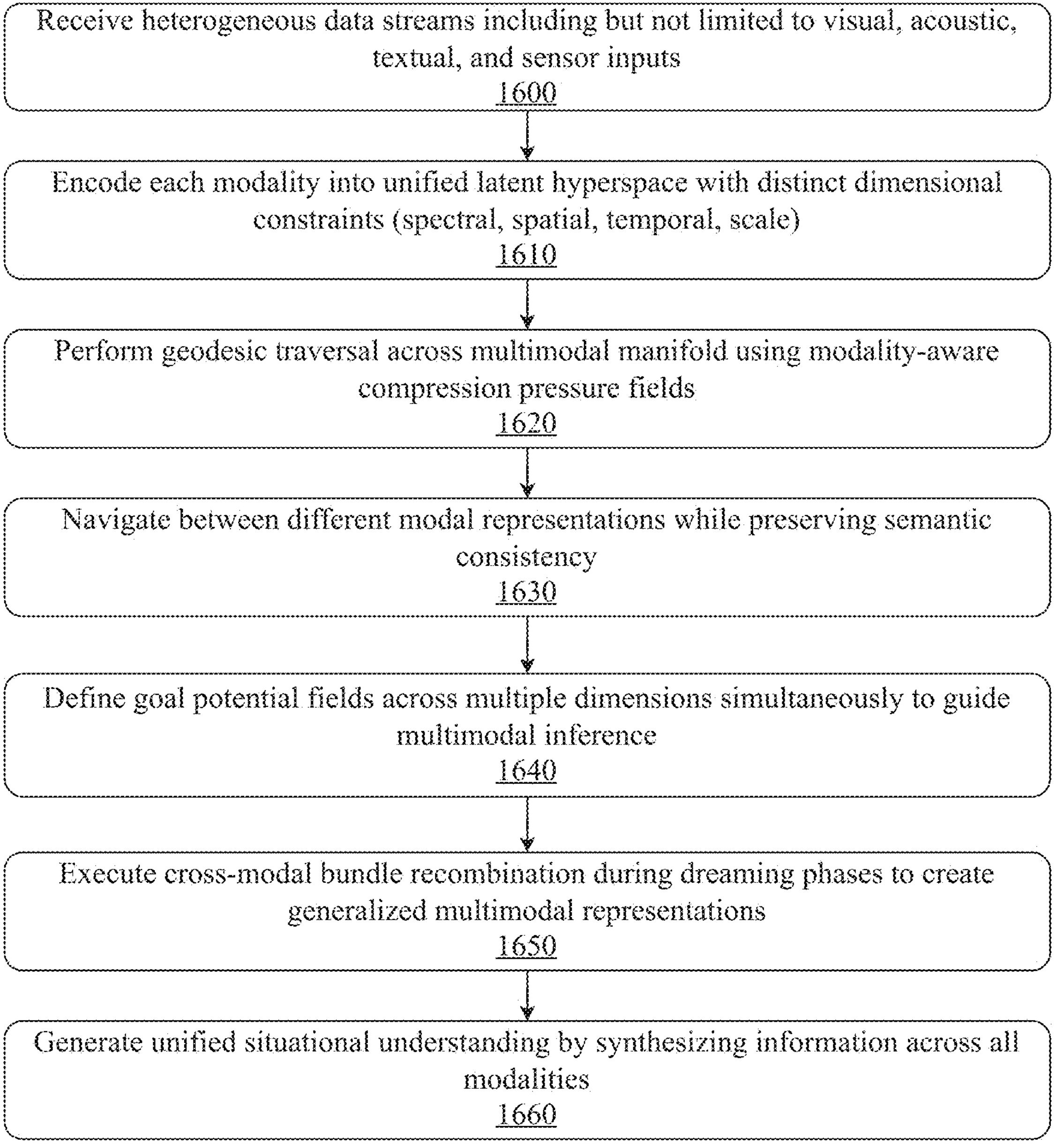
FIG. 16 is a flow diagram illustrating an exemplary method for processing and integrating heterogeneous sensory data streams within a unified geometric cognitive framework.

FIG. 16 is a flow diagram illustrating an exemplary method for processing and integrating heterogeneous sensory data streams within a unified geometric cognitive framework. In a first step 1600, receive heterogeneous data streams including but not limited to visual, acoustic, textual, and sensor inputs. This reception process accommodates diverse information sources arriving asynchronously and in varying formats, encompassing traditional sensory modalities such as visual imagery with spatial and color information, acoustic signals containing temporal patterns and frequency spectra, textual data carrying symbolic and semantic content, as well as specialized sensor inputs including thermal readings, pressure measurements, electromagnetic signatures, and chemical compositions. The data streams may arrive at different rates, resolutions, and levels of completeness, requiring robust handling of partial information, noise, and temporal misalignment. Each modality brings unique information characteristics that must be preserved during initial processing while preparing for integration into a unified representational framework.

In a step 1610, encode each modality into unified latent hyperspace with distinct dimensional constraints (spectral, spatial, temporal, scale). This encoding process transforms diverse input modalities into a shared geometric representation while maintaining modality-specific properties through structured dimensional organization. Spectral dimensions capture frequency-domain characteristics including harmonic relationships in audio, color spectra in visual data, and oscillatory patterns in sensor readings. Spatial dimensions encode geometric relationships, topological structures, and positional information relevant to visual scenes, acoustic source localization, and distributed sensor networks. Temporal dimensions represent sequential dependencies, causal flows, and dynamic evolution patterns across all modalities. Scale dimensions enable hierarchical abstraction from fine-grained local details to global patterns and high-level semantic structures. The encoding process respects the intrinsic geometry of each modality while establishing cross-modal connections through shared latent regions, creating a rich multidimensional space where different sensory inputs can interact meaningfully while preserving their distinctive characteristics.

In a step 1620, perform geodesic traversal across multimodal manifold using modality-aware compression pressure fields. This traversal implements specialized navigation that accounts for the varying information density and semantic complexity across different modal regions of the manifold. Modality-aware compression pressure fields reflect the distinct compression characteristics of each sensory domain, with visual regions exhibiting high pressure around detailed textures and edges, acoustic regions showing compression around harmonic structures and temporal patterns, textual regions displaying semantic density around conceptual clusters, and sensor regions indicating measurement precision and uncertainty bounds. The geodesic paths computed through this multimodal landscape balance traversal costs across modalities, finding optimal routes that may transition between sensory domains when such transitions offer more efficient inference paths. The traversal process maintains awareness of modal boundaries and implements smooth transitions that preserve semantic continuity even when shifting between fundamentally different representational schemes.

In a step 1630, navigate between different modal representations while preserving semantic consistency. This navigation capability enables fluid movement across sensory boundaries without losing coherent meaning or breaking inferential chains. Cross-modal navigation employs geometric bridges that connect semantically related regions across different modalities, such as linking visual representations of objects with their acoustic signatures, textual descriptions with corresponding sensory patterns, and abstract concepts with their multimodal manifestations. The navigation process maintains semantic invariants during modal transitions through preservation of relational structures, contextual embeddings, and higher-order patterns that transcend individual modalities. Consistency preservation mechanisms ensure that conclusions drawn in one modality remain valid when translated to another, enabling robust reasoning that leverages the complementary strengths of different sensory channels while avoiding contradictions or semantic drift during cross-modal inference.

In a step 1640, define goal potential fields across multiple dimensions simultaneously to guide multimodal inference. This multidimensional goal specification creates complex potential landscapes that can express objectives spanning multiple sensory domains and abstraction levels. Goal potential fields may simultaneously specify visual targets such as specific object configurations or scene compositions, acoustic objectives including sound source identification or pattern matching, textual constraints defining semantic requirements or linguistic structures, and sensor thresholds establishing measurement criteria or anomaly boundaries. The simultaneous definition across dimensions enables rich goal specifications that capture the full complexity of multimodal objectives, creating gradient fields that guide attention and inference toward regions where multiple modal constraints are satisfied. These multidimensional potentials interact with the modality-specific compression fields to create nuanced cognitive dynamics where the path to goal satisfaction may involve strategic transitions between modalities based on information availability and inference efficiency.

In a step 1650, execute cross-modal bundle recombination during dreaming phases to create generalized multimodal representations. This dreaming process operates on the accumulated multimodal experiences to discover and reinforce cross-modal patterns and abstractions. During these phases, the method identifies thought bundles from different modalities that exhibit structural similarity or semantic alignment, applying sophisticated recombination algorithms that blend modal-specific features while preserving essential relationships. The recombination process creates meta-modal representations that capture invariant patterns across sensory domains, such as motion patterns that manifest similarly in visual and acoustic data, structural regularities that appear across multiple sensor types, and abstract concepts that find expression through various sensory channels. These generalized representations enable more efficient future processing by providing unified templates that can be instantiated across modalities, reducing redundancy and enabling rapid recognition of complex multimodal patterns.

In a step 1660, generate unified situational understanding by synthesizing information across all modalities. This synthesis process integrates the multimodal traversals, cross-modal navigations, and generalized representations into a coherent understanding that transcends individual sensory channels. The synthesis employs geometric integration techniques that combine information from different modal subspaces while respecting their relative reliabilities and complementary contributions. Unified understanding emerges from the convergence of multiple inferential paths through the multimodal manifold, where conclusions are reinforced by agreement across modalities or refined by modal-specific insights. The generated understanding maintains explicit representation of its multimodal foundations, enabling traceable reasoning that can identify which modalities contributed to specific conclusions and how cross-modal interactions influenced the final synthesis. This comprehensive situational awareness provides a rich, nuanced understanding that leverages the full spectrum of available sensory information while maintaining coherent semantic structure through geometric organization in the unified latent hyperspace.

Figure 17:
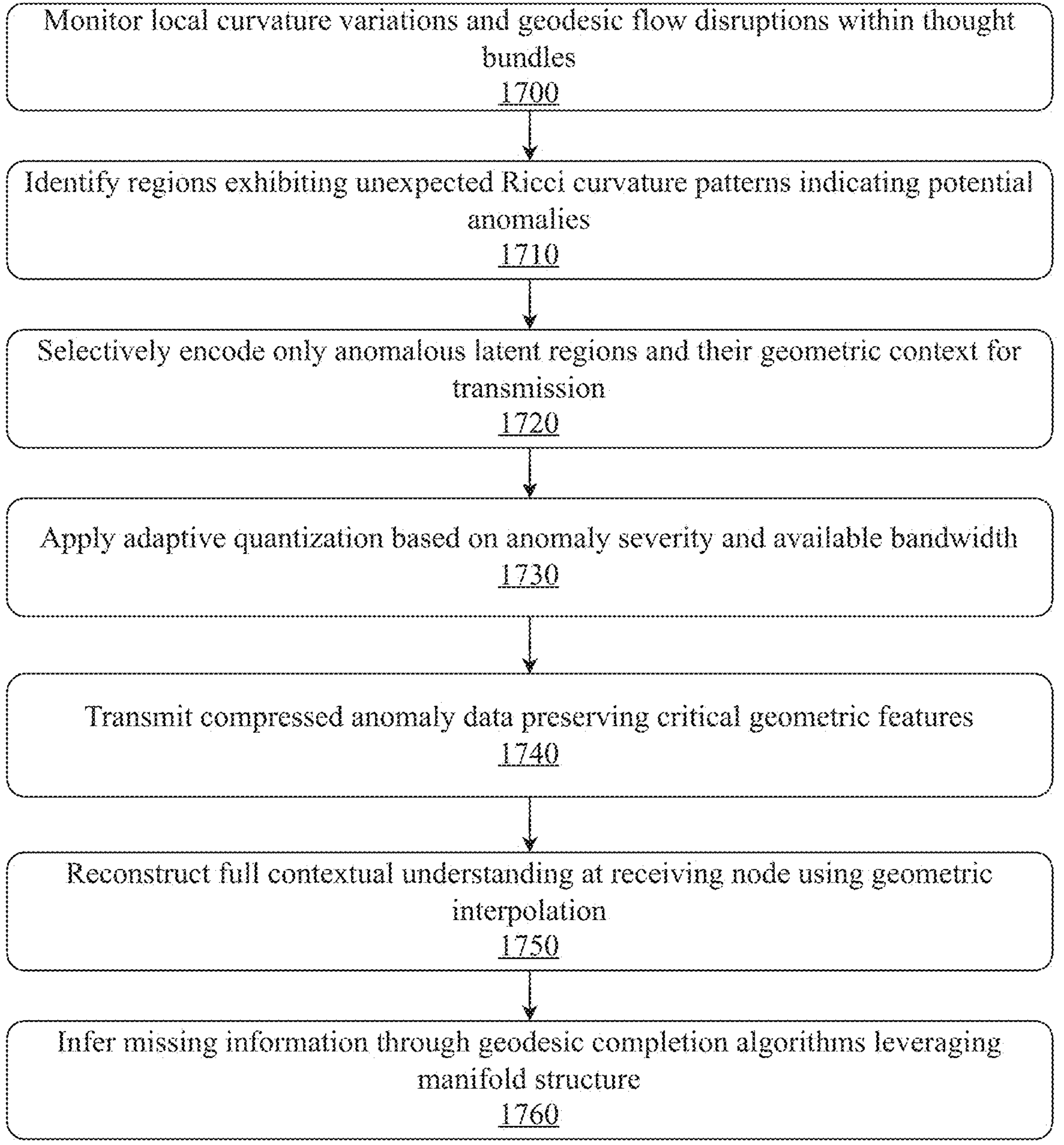
FIG. 17 is a flow diagram illustrating an exemplary method for detecting anomalies within cognitive manifolds and efficiently transmitting information through bandwidth-constrained channels using geometric compression and reconstruction techniques.

FIG. 17 is a flow diagram illustrating an exemplary method for detecting anomalies within cognitive manifolds and efficiently transmitting information through bandwidth-constrained channels using geometric compression and reconstruction techniques. In a first step 1700, monitor local curvature variations and geodesic flow disruptions within thought bundles. This monitoring process continuously tracks the geometric health of the latent manifold by observing how information flows through established cognitive structures. Thought bundles, as localized compressible regions containing structurally similar or semantically aligned thoughts, exhibit characteristic flow patterns under normal conditions where geodesic paths follow predictable trajectories through well-formed semantic spaces. The monitoring examines multiple geometric indicators including the smoothness of attention vector fields as they traverse bundle boundaries, the stability of local metric tensors within bundle interiors, the consistency of parallel transport along established reasoning paths, and the convergence or divergence rates of nearby geodesic trajectories. Disruptions in these flow patterns signal potential anomalies that warrant deeper investigation, such as unexpected turbulence in normally laminar regions, discontinuities in otherwise smooth semantic transitions, or irregular divergence patterns that break established geometric regularities.

In a step 1710, identify regions exhibiting unexpected Ricci curvature patterns indicating potential anomalies. This identification process analyzes the compression pressure field $P(x)=-R(x)$, where $R(x)$ represents the Ricci scalar curvature, to detect deviations from expected geometric patterns. Under normal conditions, thought bundles exhibit predictable curvature signatures based on their semantic content and usage patterns, with frequently accessed concepts showing higher but stable curvature, specialized knowledge domains maintaining consistent intermediate curvature, and exploratory regions displaying lower, more uniform curvature distributions. Anomalous patterns manifest as sudden spikes in curvature without corresponding semantic justification, irregular curvature oscillations within previously stable regions, inverted curvature relationships where sparse regions show unexpected compression, or curvature voids where expected semantic density disappears. These unexpected patterns often indicate underlying issues such as corrupted thought structures, emergent conceptual conflicts, novel information requiring manifold adaptation, or systemic problems affecting geometric integrity.

In a step 1720, selectively encode only anomalous latent regions and their geometric context for transmission. This selective encoding process implements intelligent data reduction by focusing transmission resources exclusively on information-rich anomalous regions while omitting normal background structure. The encoding captures not just the anomalous points themselves but sufficient geometric context to enable meaningful interpretation, including local manifold topology surrounding the anomaly, curvature gradients extending from normal to anomalous regions, geodesic paths that connect anomalies to known reference structures, and boundary conditions that delineate anomalous from normal regions. The selective encoding employs sophisticated algorithms that determine optimal context boundaries by analyzing information gradients radiating from anomaly centers, semantic dependencies that link anomalies to broader cognitive structures, and geometric continuity requirements for accurate reconstruction. This approach dramatically reduces transmission requirements while preserving the essential information needed to understand and respond to detected anomalies.

In a step 1730, apply adaptive quantization based on anomaly severity and available bandwidth. This quantization process dynamically adjusts encoding precision to optimize the trade-off between transmission efficiency and anomaly representation fidelity. Severity assessment considers multiple factors including the magnitude of curvature deviation from expected norms, the spatial extent of the anomalous region within the manifold, the rate of change in geometric parameters, and potential impact on cognitive operations. High-severity anomalies receive fine-grained quantization that preserves subtle geometric features helpful for accurate analysis, while lower-severity deviations undergo coarser quantization that captures essential patterns without excessive detail. Bandwidth-aware adaptation continuously monitors available transmission capacity and adjusts quantization parameters in real-time, implementing progressive encoding schemes that transmit core anomaly features first followed by refinement data, variable bit allocation that assigns more resources to some geometric features, and temporal multiplexing that balances multiple anomaly streams based on relative priorities.

In a step 1740, transmit compressed anomaly data preserving geometric features. The transmission process employs specialized compression algorithms designed to maintain geometric integrity despite aggressive data reduction. Preserved features during compression include but are not limited to topological invariants that define anomaly structure, curvature signatures that characterize deviation patterns, geodesic connectivity that links anomalies to the broader manifold, and semantic anchors that provide interpretive context. Compression techniques leverage the inherent structure of geometric data through differential encoding that transmits changes rather than absolute values, manifold-aware transforms that exploit local geometric regularities, predictive coding based on normal manifold behavior, and entropy coding optimized for geometric data distributions. The transmission protocol may include error protection mechanisms weighted toward preserving geometric consistency, ensuring that reconstruction errors don't fundamentally alter anomaly interpretation.

In a step 1750, reconstruct full contextual understanding at receiving node using geometric interpolation. This reconstruction process rebuilds comprehensive anomaly context from the sparse transmitted data by leveraging knowledge of manifold structure and geometric principles. Geometric interpolation techniques employed include but are not limited to geodesic interpolation that fills gaps along natural manifold paths, curvature field reconstruction using partial differential equations, metric tensor completion based on smoothness constraints, and topology inference from boundary conditions. The reconstruction process is guided by prior knowledge of normal manifold behavior, enabling intelligent filling of untransmitted regions through reference to similar known structures, application of learned geometric regularities, and constraint satisfaction based on manifold consistency requirements. The reconstructed context provides sufficient detail to understand not just what anomalies occurred but their relationship to the broader cognitive landscape, enabling appropriate response strategies.

In a step 1760, infer missing information through geodesic completion algorithms leveraging manifold structure. This inference process goes beyond simple interpolation to actively reconstruct probable missing information based on deep understanding of manifold geometry and semantic relationships. Geodesic completion algorithms trace partial paths through the manifold and extend them according to learned trajectory patterns, identifying likely path continuations based on curvature flow, semantic coherence along extended paths, and convergence toward stable attractor regions. The algorithms leverage manifold structure through multiple mechanisms including bundle membership inference that assigns reconstructed regions to appropriate semantic clusters, cross-bundle connection discovery that identifies probable relationships between separated anomalous regions, and temporal evolution modeling that predicts how anomalies might develop over time. This inference capability enables the receiving node to develop actionable understanding from minimal transmitted data, supporting effective anomaly response even in severely bandwidth-constrained environments while maintaining the geometric and semantic integrity essential for meaningful cognitive processing.

Figure 18:
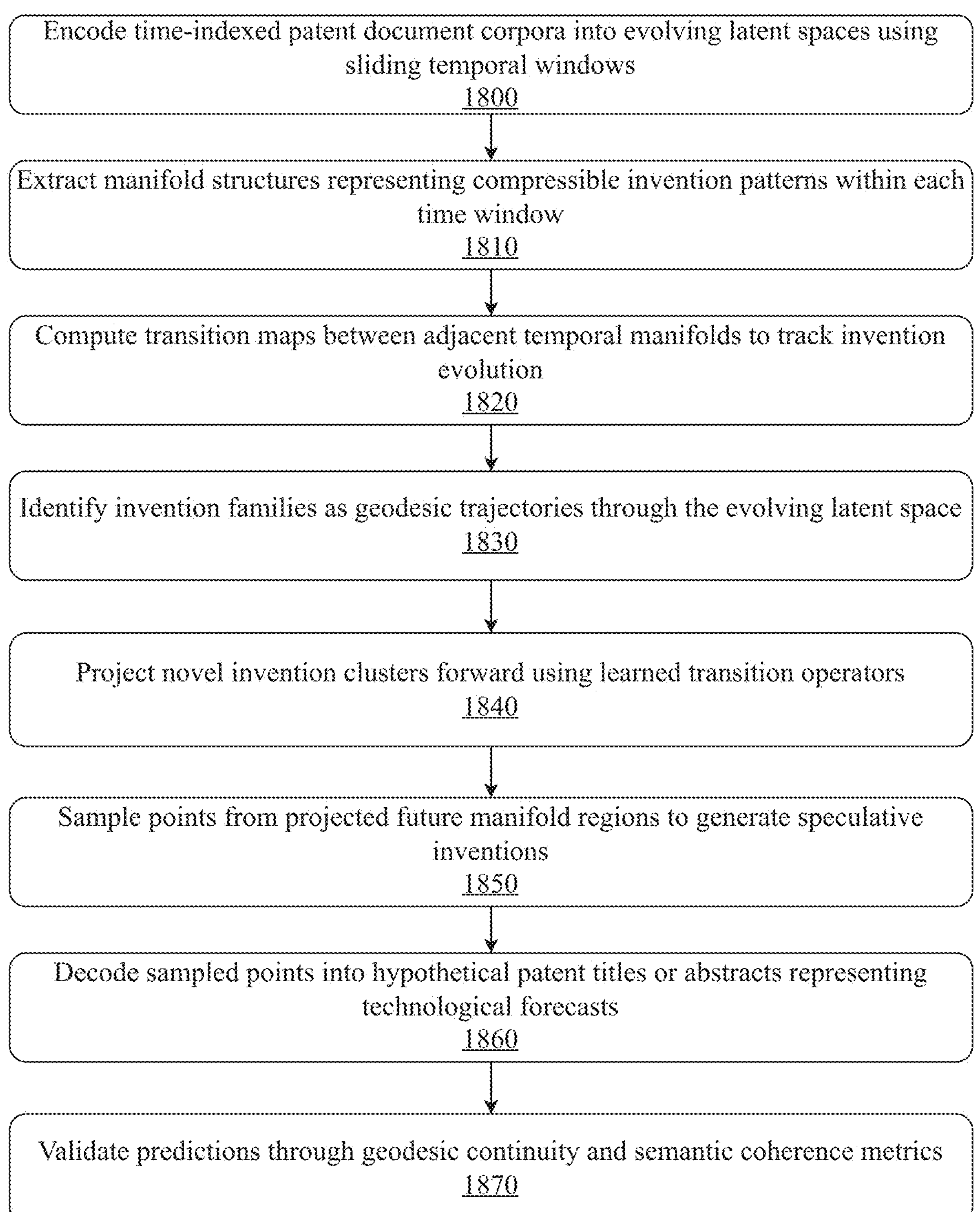
FIG. 18 is a flow diagram illustrating an exemplary method for analyzing technological evolution through patent document corpora and forecasting future inventions by tracking geodesic trajectories through time-evolving latent manifolds.

FIG. 18 is a flow diagram illustrating an exemplary method for analyzing technological evolution through patent document corpora and forecasting future inventions by tracking geodesic trajectories through time-evolving latent manifolds. In a first step 1800, encode time-indexed patent document corpora into evolving latent spaces using sliding temporal windows. This encoding process transforms collections of patent documents organized by publication time into dynamic geometric representations that capture the evolution of technological innovation. The sliding temporal windows, such as three-month periods with one-month overlap, create a sequence of overlapping document sets that enable smooth tracking of invention progression while maintaining temporal continuity. Each window's corpus undergoes encoding through sophisticated natural language processing and semantic analysis that extracts not just keywords and classifications but deeper structural patterns including technological dependencies, conceptual relationships, innovation trajectories, and cross-domain influences. The encoding process generates high-dimensional latent representations that preserve the rich semantic structure of patent information while enabling geometric analysis of how technologies evolve and interact over time.

In a step 1810, extract manifold structures representing compressible invention patterns within each time window. This extraction process identifies coherent geometric structures within each temporal latent space that correspond to meaningful technological themes and innovation clusters. The manifold extraction employs dimensionality reduction and structure discovery techniques that reveal underlying patterns in the high-dimensional patent representations, identifying regions of dense innovation activity corresponding to hot technological areas, sparse regions indicating unexplored or emerging fields, curved paths connecting related inventions across domains, and topological features revealing innovation barriers or breakthroughs. Compressible patterns emerge where multiple patents share fundamental conceptual structures despite surface differences, enabling the identification of core technological principles that drive innovation within specific periods. The extracted manifolds capture not just static snapshots but the dynamic terrain of technological possibility within each time window.

In a step 1820, compute transition maps between adjacent temporal manifolds to track invention evolution. These transition maps capture how the landscape of innovation transforms from one time period to the next, encoding both gradual evolution and disruptive changes. The computation of transition maps involves sophisticated alignment algorithms that match corresponding structures across temporal boundaries while accounting for the emergence of novel concepts, the obsolescence of outdated technologies, the transformation of existing ideas into new forms, and the migration of innovations across domain boundaries. The maps are learned through analysis of patents that appear in overlapping windows, tracking how their latent representations shift as the surrounding technological context evolves. These transition operators encode the dynamics of technological progress, capturing patterns such as convergent evolution where disparate technologies merge, divergent innovation where single concepts spawn multiple directions, and paradigm shifts where entire regions of the manifold undergo radical transformation.

In a step 1830, identify invention families as geodesic trajectories through the evolving latent space. This identification process traces the paths of related inventions as they develop over time, revealing the continuous threads of innovation that connect early concepts to their mature realizations. Invention families manifest as geodesic trajectories. These trajectories exhibit characteristic properties including consistent directionality indicating focused technological development, smooth curvature reflecting incremental innovation, and branching patterns where core technologies spawn multiple applications. The geodesic nature of these paths reflects the principle of least action in innovation, where technological development tends to follow paths of minimal resistance through the space of possibilities. By analyzing these trajectories, the method reveals how inventions build upon predecessors, how technological capabilities accumulate over time, and how breakthrough innovations create new directions for future development.

In a step 1840, project novel invention clusters forward using learned transition operators. This projection employs the composed transition maps to extrapolate current innovation patterns into future time periods. The projection process identifies clusters of recent inventions representing technological frontiers and applies learned dynamics to predict their evolution. The forward projection accounts for multiple factors including momentum of current research directions, convergence patterns between previously separate fields, saturation effects in mature technological areas, and emergence of enabling technologies that open new possibilities. The projection generates future manifold regions that represent plausible technological landscapes, maintaining geometric consistency with historical patterns while allowing for novel combinations and breakthrough possibilities that respect the learned dynamics of innovation.

In a step 1850, sample points from projected future manifold regions to generate speculative inventions. This sampling process explores the predicted future technological landscape to identify specific innovation possibilities. Sampling strategies include but are not limited to focused sampling around high-potential regions identified through projection analysis, exploratory sampling in sparse areas representing untapped opportunities, interpolative sampling between projected clusters to identify bridging technologies, and perturbative sampling that tests variations on projected trajectories. Each sampled point represents a potential future invention embedded within the projected technological context. The sampling process maintains geometric coherence, ensuring that generated points respect the manifold structure and exhibit plausible relationships to projected innovation clusters. Multiple samples capture the range of possibilities within predicted technological domains, from incremental improvements to radical innovations.

In a step 1860, decode sampled points into hypothetical patent titles or abstracts representing technological forecasts. This decoding process transforms abstract geometric representations back into human-interpretable descriptions of potential future inventions. The decoder leverages the semantic structure preserved through the encoding and projection process to generate coherent technological concepts that reflect the position and context of each sampled point. Generated titles and abstracts maintain consistency with patent language conventions while introducing novel combinations of concepts that emerge from the geometric positioning within projected manifolds. The decoding process produces outputs that capture both the specific technical features suggested by the geometric location and the broader technological context implied by surrounding manifold structure. These hypothetical patents serve as concrete illustrations of predicted technological directions, providing actionable insights for research planning, investment strategies, and innovation policy.

In a step 1870, validate predictions through geodesic continuity and semantic coherence metrics. This validation ensures that forecasted inventions represent plausible technological developments rather than arbitrary extrapolations. Geodesic continuity validation verifies that predicted inventions lie along smooth extensions of historical innovation trajectories, maintaining consistent development patterns with established technological paths, exhibiting reasonable innovation velocities based on historical rates, and preserving topological relationships with existing technology clusters. Semantic coherence metrics evaluate whether predicted inventions maintain meaningful technological content through analysis of conceptual consistency with domain knowledge, technical feasibility given projected capabilities, market and application relevance, and compatibility with emerging technological ecosystems. The validation process provides confidence measures for each prediction, enabling prioritization of forecasts most likely to represent genuine future innovations. This systematic validation ensures that the method produces actionable technological intelligence grounded in rigorous analysis of innovation dynamics rather than speculative fantasy.

Figure 19:
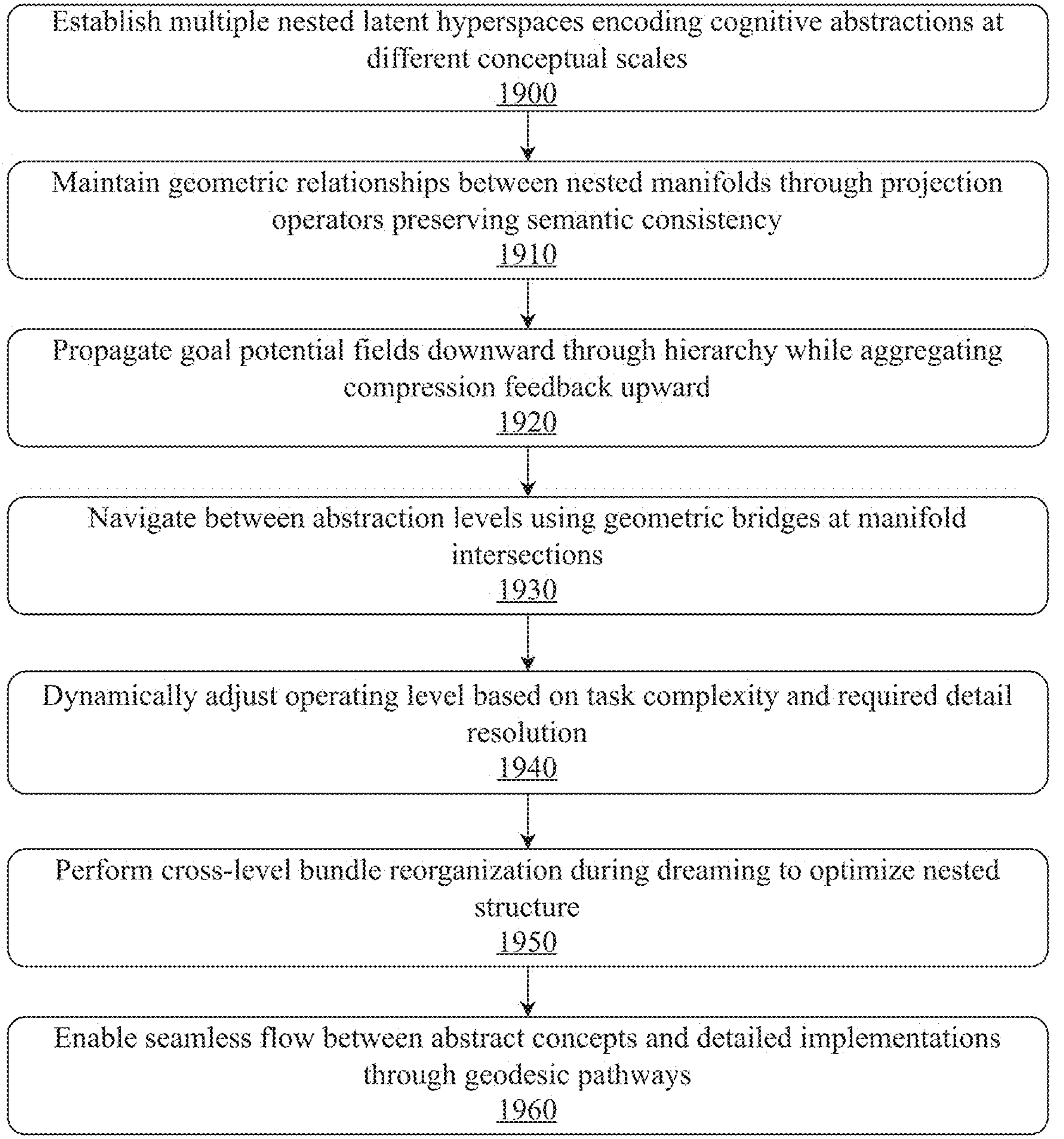
FIG. 19 is a flow diagram illustrating an exemplary method for implementing multi-level cognitive processing through hierarchically nested latent manifolds.

FIG. 19 is a flow diagram illustrating an exemplary method for implementing multi-level cognitive processing through hierarchically nested latent manifolds. In a first step 1900, establish multiple nested latent hyperspaces encoding cognitive abstractions at different conceptual scales. This establishment creates a hierarchical structure where each level represents a different granularity of cognitive representation. The highest levels encode broad abstract concepts, general principles, and overarching patterns that span multiple domains. Intermediate levels capture domain-specific knowledge, categorical relationships, and structured methodologies. Lower levels represent detailed implementations, specific instances, and concrete operational parameters. Each hyperspace maintains its own geometric structure with appropriate dimensionality for its abstraction level, where abstract spaces may have lower intrinsic dimension but higher curvature reflecting conceptual density, while detailed spaces exhibit higher dimension but flatter local geometry accommodating specific variations. The nesting relationship ensures that detailed thoughts exist within the scope of their governing abstractions, creating a natural hierarchy that mirrors how complex knowledge organizes from general principles to specific applications.

In a step 1910, maintain geometric relationships between nested manifolds through projection operators preserving semantic consistency. These projection operators map between different hierarchical levels while preserving essential semantic relationships and structural coherence. The operators implement sophisticated transformations that aggregate detailed information when projecting upward to abstract levels, capturing essential patterns while abstracting away specifics, and instantiate abstract concepts when projecting downward, generating plausible detailed realizations guided by higher-level constraints. Semantic consistency preservation ensures that meanings remain stable across levels through maintenance of relational structures between concepts, preservation of logical dependencies and constraints, and conservation of semantic distance relationships appropriately scaled for each level. The projection operators adapt dynamically as the manifolds evolve, learning from traversal patterns to improve cross-level mappings and maintaining homeomorphic relationships that prevent semantic drift during repeated projections.

In a step 1920, propagate goal potential fields downward through hierarchy while aggregating compression feedback upward. This bidirectional information flow creates a unified cognitive dynamics across all abstraction levels. Goal potential fields defined at abstract levels cascade downward through the hierarchy, becoming progressively more specific and actionable at each level. The downward propagation transforms high-level objectives into concrete subgoals, distributes potential gradients to guide detailed implementations, and maintains goal coherence while allowing level-appropriate interpretations. Simultaneously, compression pressure information aggregates upward from detailed levels, informing abstract levels about implementation complexity, resource constraints, and feasibility boundaries. This upward flow enables abstract reasoning to remain grounded in realistic constraints while providing feedback about which high-level approaches lead to tractable implementations. The bidirectional flow creates a dynamic equilibrium where abstract goals shape detailed actions while implementation realities inform strategic planning.

In a step 1930, navigate between abstraction levels using geometric bridges at manifold intersections. These bridges represent semantic connections that enable fluid movement between conceptual scales without discontinuous jumps. Navigation utilizes specialized geometric structures at level boundaries including transition zones where adjacent levels share overlapping representations, portal regions providing efficient access points between levels, and connector pathways that maintain semantic continuity during level transitions. The navigation process selects appropriate bridges based on current cognitive context, required level of detail, and semantic alignment with ongoing reasoning. Bridge traversal implements smooth interpolation between abstraction levels, gradually adjusting representational granularity, maintaining inferential coherence across transitions, and preserving relevant context while shifting focus. This enables cognitive processes to fluidly zoom in for detailed analysis or zoom out for strategic overview as needed by the task at hand.

In a step 1940, dynamically adjust operating level based on task complexity and required detail resolution. This adjustment mechanism continuously evaluates cognitive demands and selects the most appropriate hierarchical level for current processing. Task complexity assessment considers factors such as the breadth of domains involved requiring higher-level integration, the specificity of required outputs demanding detailed representation, the novelty of problems potentially requiring multiple levels, and time constraints favoring appropriate abstraction levels. The dynamic adjustment implements smooth transitions between levels rather than discrete switches, maintaining partial activation across multiple levels when tasks require integrated processing. The mechanism learns optimal level selection strategies through experience, developing heuristics for rapid level identification and maintaining statistics on task-level associations. This adaptive behavior ensures efficient cognitive resource utilization by operating at the simplest level sufficient for task requirements while enabling rapid escalation to more complex levels when needed.

In a step 1950, perform cross-level bundle reorganization during dreaming to optimize nested structure. This reorganization process operates during inactive periods to improve the hierarchical organization and cross-level connectivity. Bundle reorganization examines thought bundles across all levels to identify opportunities for better hierarchical alignment, including promoting frequently accessed detailed bundles to higher abstraction levels, decomposing overly complex abstract bundles into hierarchical components, and creating new intermediate levels when gaps in the hierarchy impede smooth navigation. The process implements sophisticated recombination algorithms that respect level-appropriate constraints while enabling creative restructuring. Cross-level optimization ensures that related concepts maintain appropriate geometric relationships across the hierarchy, frequently traversed paths between levels become more efficient, and the overall hierarchical structure evolves to match actual usage patterns. This dreaming-phase reorganization enables the hierarchical system to adapt its structure based on accumulated experience, becoming progressively more efficient at supporting the specific types of multi-level reasoning required by its task domain.

In a step 1960, enable seamless flow between abstract concepts and detailed implementations through geodesic pathways. This final step ensures that the hierarchical structure supports fluid cognitive movement across all conceptual scales. Geodesic pathways through the nested manifolds are computed to minimize traversal cost while maintaining semantic coherence, creating smooth reasoning chains that can start with high-level objectives and flow naturally to specific actions, or begin with detailed observations and ascend to general principles. These pathways leverage the optimized hierarchical structure to provide multiple routes between levels, enabling flexible reasoning strategies, redundant paths for robustness, and creative connections between previously unrelated concepts at different scales. The seamless flow supports various cognitive operations including top-down planning from strategy to tactics, bottom-up learning from examples to principles, middle-out reasoning that connects theory with practice, and lateral thinking that bridges across hierarchies. This comprehensive connectivity ensures that the hierarchical cognitive system can fluidly adapt its processing level to match task demands while maintaining the rich interconnections that enable sophisticated multi-scale reasoning.

Figure 20:
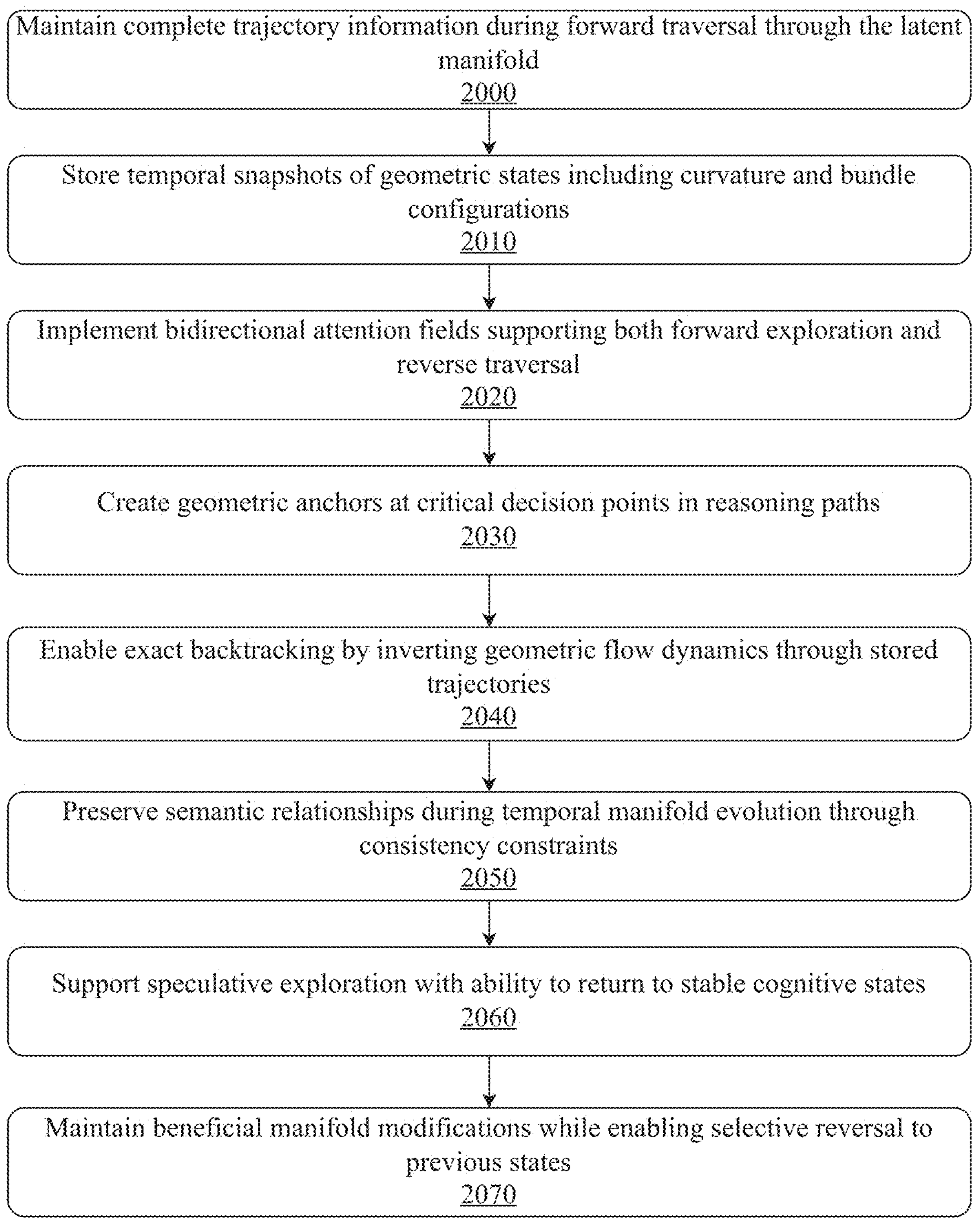
FIG. 20 is a flow diagram illustrating an exemplary method for implementing reversible navigation within dynamic latent manifolds.

FIG. 20 is a flow diagram illustrating an exemplary method for implementing reversible navigation within dynamic latent manifolds. In a first step 2000, maintain complete trajectory information during forward traversal through the latent manifold. This maintenance process creates a comprehensive record of the cognitive path taken, capturing not just the sequence of positions visited but the full geometric context of the traversal. The trajectory information includes but is not limited to the precise coordinates of each point along the path, the velocity and acceleration of attention movement, local curvature values and metric tensor components at each position, and the compression pressure and goal potential fields encountered. This detailed recording enables faithful reconstruction of the cognitive journey, preserving information about why specific paths were chosen, how attention flowed through different regions, what semantic relationships were activated, and which thought bundles were engaged during reasoning. The maintenance mechanism operates continuously during active cognition, creating a rich trace that serves as both a record of reasoning and a foundation for potential backtracking.

In a step 2010, store temporal snapshots of geometric states including curvature and bundle configurations. These snapshots capture the complete state of relevant manifold regions at specific time points, creating a temporal sequence that documents how the cognitive landscape evolves during reasoning. Each snapshot preserves local and global curvature patterns reflecting semantic density and relationships, thought bundle boundaries and internal structures, metric tensor values defining distance relationships, active attention fields and their flow patterns, and compression pressure distributions across the manifold. The storage mechanism implements efficient compression techniques that preserve essential geometric information while managing memory requirements through identification of state changes requiring full snapshots, incremental storage of modifications between snapshots, and hierarchical representation enabling multi-resolution retrieval. These temporal snapshots enable not just backtracking through a static landscape but navigation to previous manifold configurations even as the underlying structure continues to evolve.

In a step 2020, implement bidirectional attention fields supporting both forward exploration and reverse traversal. The attention vector field is enhanced to include reverse flow components that enable backward navigation along previously traversed paths. This bidirectional implementation maintains dual flow potentials at each manifold point, with forward components guided by goal attraction and exploration drives, and reverse components following stored trajectory gradients back toward previous positions. The field dynamics incorporate memory of past traversals, creating preferential flow channels along well-traveled paths while maintaining flexibility for deviation. The bidirectional nature enables smooth transitions between forward and backward navigation, supporting cognitive operations such as retracing steps to reconsider alternatives, returning to decision points for different choices, and comparing forward predictions with backward reconstructions. The implementation ensures that reverse traversal respects the evolved manifold geometry rather than simply replaying stored coordinates.

In a step 2030, create geometric anchors at various decision points in reasoning paths. These anchors mark significant locations in the cognitive journey where important choices were made, multiple paths diverged, or key insights emerged. Anchor creation identifies points through analysis of trajectory bifurcations indicating choice points, local extrema in goal potential suggesting achievement milestones, curvature anomalies marking conceptual transitions, and high compression pressure regions requiring significant cognitive effort. Each anchor stores comprehensive local state information including the complete geometric configuration, available path options and their initial directions, decision criteria and goal states active at that point, and semantic context explaining the significance of the location. These anchors serve as cognitive waypoints that enable efficient navigation to important reasoning states without requiring full trajectory replay, supporting operations like returning to reconsider major decisions or comparing outcomes from different choice branches.

In a step 2040, enable exact backtracking by inverting geometric flow dynamics through stored trajectories. This inversion process reverses the mathematical operations that generated forward motion, creating precise backward paths through the evolved manifold. The flow inversion accounts for the original geodesic equations by reversing time parameters, the influence of compression pressure and goal fields by negating their gradients, the effects of manifold evolution by applying inverse transformations, and the accumulation of path-dependent modifications. The backtracking mechanism enables exact retracing even through complex geometric regions including high-curvature zones where forward paths strongly converged, bifurcation regions where choices were made, and dynamically evolved areas where the manifold has changed. This precise reversal capability ensures that cognitive exploration can be truly reversible, enabling confident speculation knowing that return to stable states is guaranteed.

In a step 2050, preserve semantic relationships during temporal manifold evolution through consistency constraints. As the manifold evolves through use and learning, this preservation mechanism ensures that semantic meanings remain stable enough to support meaningful backtracking. Consistency constraints maintain topological relationships between thought bundles, relative distance orderings between related concepts, essential curvature patterns that define semantic regions, and geodesic connections between ideas. The preservation process implements sophisticated transformation tracking that records how manifold regions evolve over time, applies compensating adjustments during backtracking to account for evolution, and maintains semantic anchors that provide stable reference points. This enables navigation to previous cognitive states even when the underlying geometry has been modified by intervening learning and adaptation, ensuring that backtracking arrives at semantically equivalent rather than merely geometrically identical states.

In a step 2060, support speculative exploration with ability to return to stable cognitive states. This capability enables bold cognitive ventures into uncertain or potentially unstable regions while maintaining safety through guaranteed return paths. Speculative exploration is facilitated through creation of temporary manifold branches for experimental reasoning, suspension of normal stability constraints during exploration, monitoring of cognitive health metrics during speculation, and automatic triggering of return navigation if instability is detected. The return mechanism provides rapid retreat to the nearest stable anchor point, gradual unwinding of speculative modifications, and preservation of valuable discoveries while discarding unstable structures. This creates a cognitive sandbox where novel connections can be explored, unconventional reasoning paths can be tested, and creative insights can emerge, all while maintaining the security of proven stable states.

In a step 2070, maintain beneficial manifold modifications while enabling selective reversal to previous states. This final step implements intelligent preservation of positive changes discovered during exploration while still enabling return to earlier configurations. The selective reversal mechanism analyzes modifications made during forward traversal to identify beneficial changes such as new connections that improve reasoning efficiency, compressed representations that reduce cognitive load, discovered shortcuts between previously distant concepts, and refined curvature patterns that better capture semantic relationships. During reversal operations, the method preserves these beneficial modifications by maintaining them as overlays on reversed base geometry, creating parallel path options that include improvements, and marking enhanced regions for integration into the stable manifold. This selective approach ensures that the cognitive system continuously improves through exploration while maintaining the ability to recover from unsuccessful ventures, creating an optimal balance between stability and adaptability in the evolving geometric substrate of thought.

Figure 21:
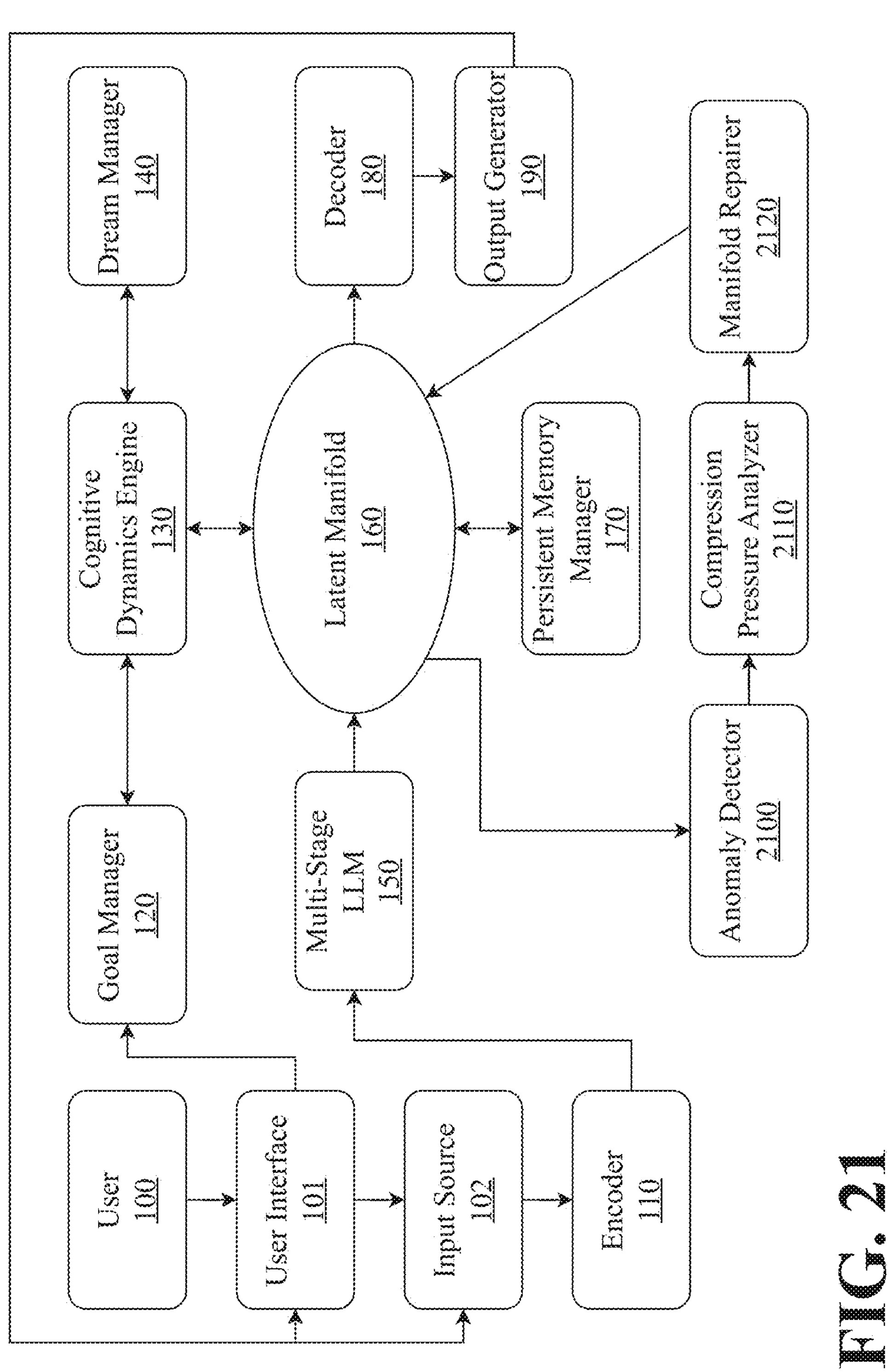
FIG. 21 is a block diagram illustrating an exemplary system architecture of a persistent cognitive machine (PCM) configured to perform latent anomaly detection with variable transmission.

FIG. 21 is a block diagram illustrating an exemplary system architecture of a persistent cognitive machine (PCM) configured to perform latent anomaly detection with variable transmission. In one embodiment, the PCM architecture is augmented with an anomaly detector 2100, a compression pressure analyzer 2110, and a manifold repairer 2120. These subsystems cooperate to identify deviations within the manifold, encode and transmit those deviations under adaptive compression regimes, and restore manifold coherence when anomalies or sparse transmissions introduce discontinuities.

Anomaly detector 2100 is a monitoring subsystem that evaluates the latent manifold 160 for departures from expected geometric and dynamical behavior. During standard PCM operation, attention flows across the manifold along geodesic paths calculated by cognitive dynamics engine 130, with bundle stability reinforced by persistent memory manager 170 and reorganized during background dreaming by dream manager 140. Anomaly detector 2100 identifies deviations by measuring changes in local curvature, monitoring divergence in the attention vector field, and observing distortions at bundle boundaries that suggest semantic incoherence. For example, if attention vectors scatter unpredictably in regions where smooth traversal has been established, or if Ricci curvature values increase or collapse unexpectedly, anomaly detector 2100 designates the affected region as anomalous. By localizing anomalies at the manifold level rather than the raw data level, anomaly detector 2100 ensures downstream processes focus on information-rich deviations rather than retransmitting entire data streams.

The operation of anomaly detector 2100 is integrated with existing PCM subsystems. It consumes flow and curvature data produced by cognitive dynamics engine 130, memory references from persistent memory manager 170, and goal-directed potentials from goal manager 120. This integration allows anomaly detector 2100 to differentiate between anomalies produced by irregularities and deviations caused by intentional goal-driven traversal. For instance, when curvature distortion occurs in alignment with an active goal potential, the deviation is not registered as anomalous. When curvature or flow diverges absent goal relevance or in contradiction to prior bundle stability, anomaly detector 2100 identifies it as an anomaly.

Compression pressure analyzer 2110 is a decision subsystem that determines how anomalies identified by anomaly detector 2100 should be transmitted, particularly under bandwidth constraints. Compression pressure analyzer 2110 leverages the manifold's compression pressure field, which encodes semantic density and traversal cost based on curvature. Regions of elevated compression pressure may represent dense or semantically significant anomalies, while regions of lower pressure may correspond to areas of redundancy or lower importance. Compression pressure analyzer 2110 evaluates anomalies against these fields and applies variable transmission protocols. For anomalies with elevated semantic density, compression pressure analyzer 2110 allocates higher fidelity to ensure structural details are maintained. For anomalies in less dense regions, compression pressure analyzer 2110 applies stronger compression or transmits symbolic summaries.

Compression pressure analyzer 2110 may employ adaptive quantization schemes to balance fidelity with efficiency. For instance, in a sensor monitoring application, when curvature changes indicate a potential fault condition, compression pressure analyzer 2110 can transmit the anomaly region with fine-grained encoding. In contrast, when anomalies correspond to fluctuations in less relevant regions, compression pressure analyzer 2110 may transmit a reduced representation. Transmission decisions are dynamically adjusted based on anomaly persistence, available channel capacity, and operating requirements. By sending only anomaly data at appropriate fidelity, compression pressure analyzer 2110 supports high compression while retaining anomaly interpretability.

Manifold repairer 2120 is a restorative subsystem that maintains stability in the latent manifold 160 when anomalies are transmitted in compressed or partial form. Sparse anomaly data can leave gaps in manifold continuity or alter bundle coherence. Manifold repairer 2120 restores structure using manifold-aware repair strategies including geodesic interpolation, bundle recombination, and curvature smoothing. Geodesic interpolation reconstructs missing trajectory segments by solving minimal-action paths across incomplete regions. Bundle recombination merges partial anomalies with related bundles managed by persistent memory manager 170, reinforcing semantic alignment. Curvature smoothing diffuses irregularities, restoring stable flow fields across the affected region.

For example, when compression pressure analyzer 2110 transmits only the core of an anomaly without surrounding detail, manifold repairer 2120 reconstructs missing structure by interpolating neighboring geodesics and aligning them with memory anchors from persistent memory manager 170. When anomalies disrupt established bundles, manifold repairer 2120 integrates partial anomaly data with existing semantic structures to regain coherence. In operation, this allows a PCM operating in a distributed environment to transmit sparse anomaly updates while ensuring receiving nodes reconstruct full semantic context locally.

Together, anomaly detector 2100, compression pressure analyzer 2110, and manifold repairer 2120 create a cooperative anomaly lifecycle. Anomaly detector 2100 identifies anomalies by monitoring manifold curvature, flow, and bundle stability. Compression pressure analyzer 2110 selects compression strategies that adjust transmission fidelity based on anomaly significance and bandwidth availability. Manifold repairer 2120 restores manifold coherence after compressed anomaly transmission, reconstructing missing information and reinforcing semantic integrity. These subsystems integrate with the broader PCM: anomaly detector 2100 relies on data from cognitive dynamics engine 130, compression pressure analyzer 2110 applies compression values shaped by memory reuse in persistent memory manager 170, and manifold repairer 2120 employs repair strategies informed by reorganizations from dream manager 140. The result is a PCM architecture capable of detecting, transmitting, and repairing anomalies in real time while operating under constrained communication and processing conditions.

Figure 22:
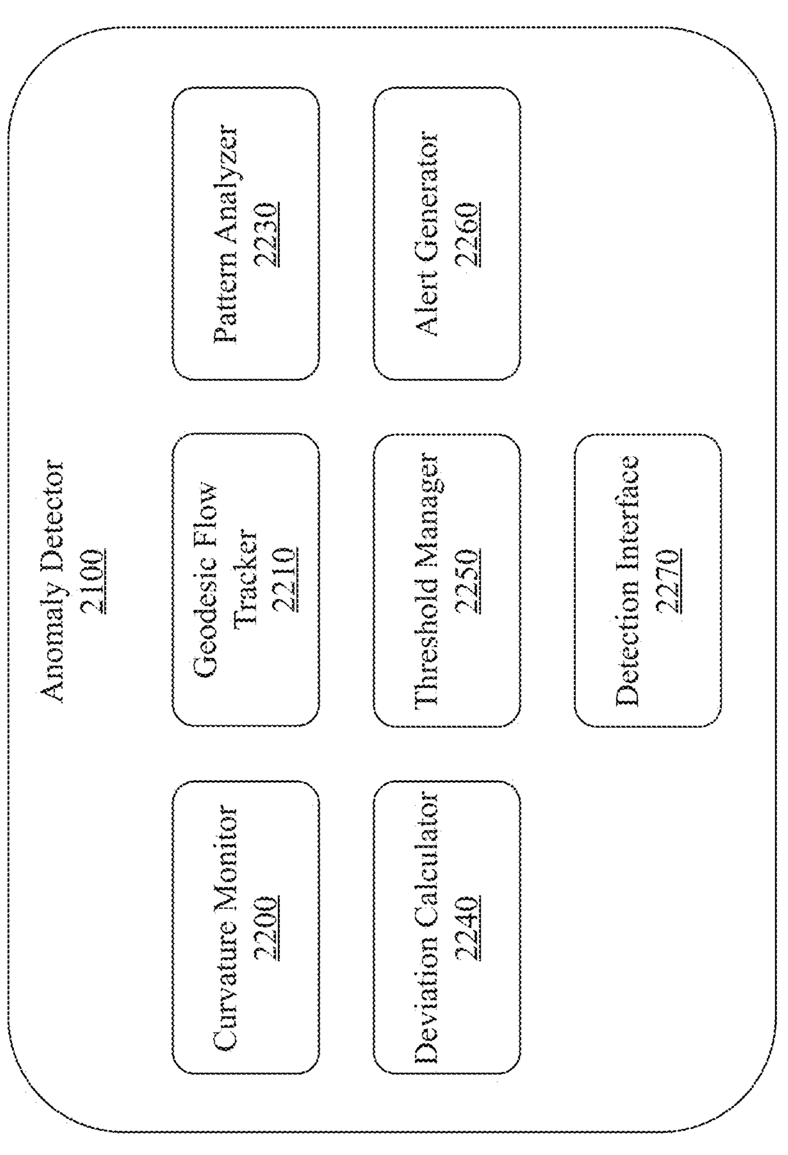
FIG. 22 is a block diagram illustrating an exemplary architecture of a component within a persistent cognitive machine (PCM) configured to perform latent anomaly detection with variable transmission, an anomaly detector.

FIG. 22 is a block diagram illustrating an exemplary architecture of a component within a persistent cognitive machine (PCM) configured to perform latent anomaly detection with variable transmission, an anomaly detector. In one embodiment, anomaly detector 2100 utilizes a curvature monitor 2200, a geodesic flow tracker 2210, a pattern analyzer 2230, a deviation calculator 2240, a threshold manager 2250, an alert generator 2260, and a detection interface 2270. These subsystems cooperate to observe manifold signals, transform observations into structured features, estimate the magnitude of deviation, apply adaptive criteria, and publish detection events to the rest of the PCM.

Curvature monitor 2200 observes local geometric quantities across regions of the latent manifold 160 and derives signals used to characterize structural shape and density. In operation, curvature monitor 2200 samples manifold neighborhoods and estimates quantities such as directional or scalar curvature proxies obtained from repeated traversals, local dispersion of nearby trajectories, and historical curvature baselines inferred from persistent memory manager 170. Curvature monitor 2200 maintains a rolling field of curvature statistics that include short-horizon snapshots for rapid change detection and longer-horizon summaries for trend analysis. These statistics are indexed to manifold coordinates and bundle identifiers to preserve spatial and semantic locality, enabling downstream subsystems to tie potential anomalies to specific subspaces and memory structures.

Geodesic flow tracker 2210 measures attentional motion and transport dynamics generated by cognitive dynamics engine 130. Geodesic flow tracker 2210 records instantaneous attention vectors, local divergence and convergence of flow, and temporal stability of frequently traversed paths. When flows that previously exhibited smooth laminar behavior begin to oscillate, bifurcate, or stall, geodesic flow tracker 2210 produces structured flow features that capture the onset, duration, and extent of the disturbance. Integration with goal manager 120 allows geodesic flow tracker 2210 to annotate features with goal-context metadata, distinguishing flow changes aligned with active goals from those that arise independently of intent.

Pattern analyzer 2230 transforms raw curvature and flow observations into higher-level descriptors that reflect expected manifold behavior. Pattern analyzer 2230 maintains reference models learned from historic operation, such as canonical flow signatures within specific bundles, typical curvature envelopes during reuse, and cross-bundle transition motifs. Using these references, pattern analyzer 2230 computes residual features that quantify how current observations depart from established patterns. For example, when repeated traversals of a bundle normally contract geodesics toward a stable submanifold, pattern analyzer 2230 flags dispersion features when current traversals diverge beyond learned envelopes. By operating on features rather than raw measurements, pattern analyzer 2230 reduces noise sensitivity and enables consistent comparison across tasks and sessions.

Deviation calculator 2240 aggregates outputs from curvature monitor 2200, geodesic flow tracker 2210, and pattern analyzer 2230 to estimate anomaly magnitude in a common score space. Deviation calculator 2240 combines multiple indicators—curvature residuals, flow instability metrics, and pattern mismatches—into a normalized deviation score. The fusion process can apply weighting derived from usage statistics in persistent memory manager 170 (e.g., more weight for regions with extensive prior stability) and may incorporate confidence factors from encoder 110 or multi-stage large language model 150 when those subsystems provide quality signals about recent encodings. The resulting score captures both instantaneous departures and accumulated evidence of drift, enabling robust detection across fast spikes and slow-evolving shifts.

Threshold manager 2250 converts deviation scores from deviation calculator 2240 into detection decisions using adaptive criteria. Static thresholds can be configured for known operating regimes, while adaptive thresholds adjust to manifold conditions such as global activity level, bandwidth budgets, or mission priorities supplied by goal manager 120. Threshold manager 2250 may maintain per-bundle baselines so that regions with historically higher variability are judged relative to their own distributions, whereas highly stable regions apply stricter criteria. Hysteresis windows, cooldown periods, and quorum rules across adjacent regions reduce spurious toggling and support spatially coherent detections that align with manifold topology.

Alert generator 2260 packages detections into events consumable by downstream subsystems. Alert generator 2260 enriches each event with manifold-localization data (e.g., bundle identifiers, coordinate extents), summaries of dominant contributing features from pattern analyzer 2230, and suggested transmission profiles that can seed compression pressure analyzer 2110. When requested, alert generator 2260 emits progressive alerts as evidence accumulates, enabling early heads-up notifications followed by higher-confidence confirmations. Event payloads can include compact sketches of curvature and flow signatures to support variable transmission and later reconstruction by manifold repairer 2120.

Detection interface 2270 exposes anomaly detector 2100 outputs and controls to the PCM. Detection interface 2270 publishes detection streams to compression pressure analyzer 2110 for encoding strategy selection, to manifold repairer 2120 for repair planning, and to cognitive dynamics engine 130 for optional routing adjustments or exploratory probing. Detection interface 2270 also accepts policies from goal manager 120 (e.g., elevation of specific regions of interest), retention and logging directives from persistent memory manager 170, and introspection requests from decoder 180 or output generator 190 for explanatory reporting. Interfaces support synchronous queries for immediate checks and asynchronous subscriptions for continuous monitoring.

In operation, anomaly detector 2100 progresses through an observation-to-decision pipeline: curvature monitor 2200 and geodesic flow tracker 2210 capture the state of geometry and flow; pattern analyzer 2230 compares those observations to learned structure; deviation calculator 2240 fuses departures into a single deviation score; threshold manager 2250 applies adaptive criteria; alert generator 2260 formalizes and emits events; and detection interface 2270 coordinates integration with the rest of the platform. Consider a case in which repeated use of a knowledge bundle yields stable curvature and cohesive geodesic transport over weeks of operation. A new input stream arrives from input source 102 that perturbs the same bundle: geodesic flow tracker 2210 records emerging vortices in attention flow, curvature monitor 2200 observes localized curvature elevation, pattern analyzer 2230 computes a high residual against the bundle's canonical pattern, deviation calculator 2240 assigns an elevated deviation score, threshold manager 2250 triggers a detection using a per-bundle adaptive threshold, and alert generator 2260 emits an event with a suggested high-fidelity transmission profile for compression pressure analyzer 2110. The PCM then encodes and transmits only the localized anomaly while manifold repairer 2120 prepares to reconstruct context at the receiving node using bundle-aware interpolation.

The architecture enables anomaly detector 2100 to remain aligned with the PCM's geometric substrate while providing a clear, inspectable path from raw manifold signals to actionable events. Curvature and flow are observed where they arise, pattern comparison respects the manifold's learned structure, deviation estimation unifies heterogeneous evidence, decision logic adapts to context, alerts are transmission-aware, and interfaces bind detection to compression, repair, memory, and goal-conditioning across the platform.

Figure 23:
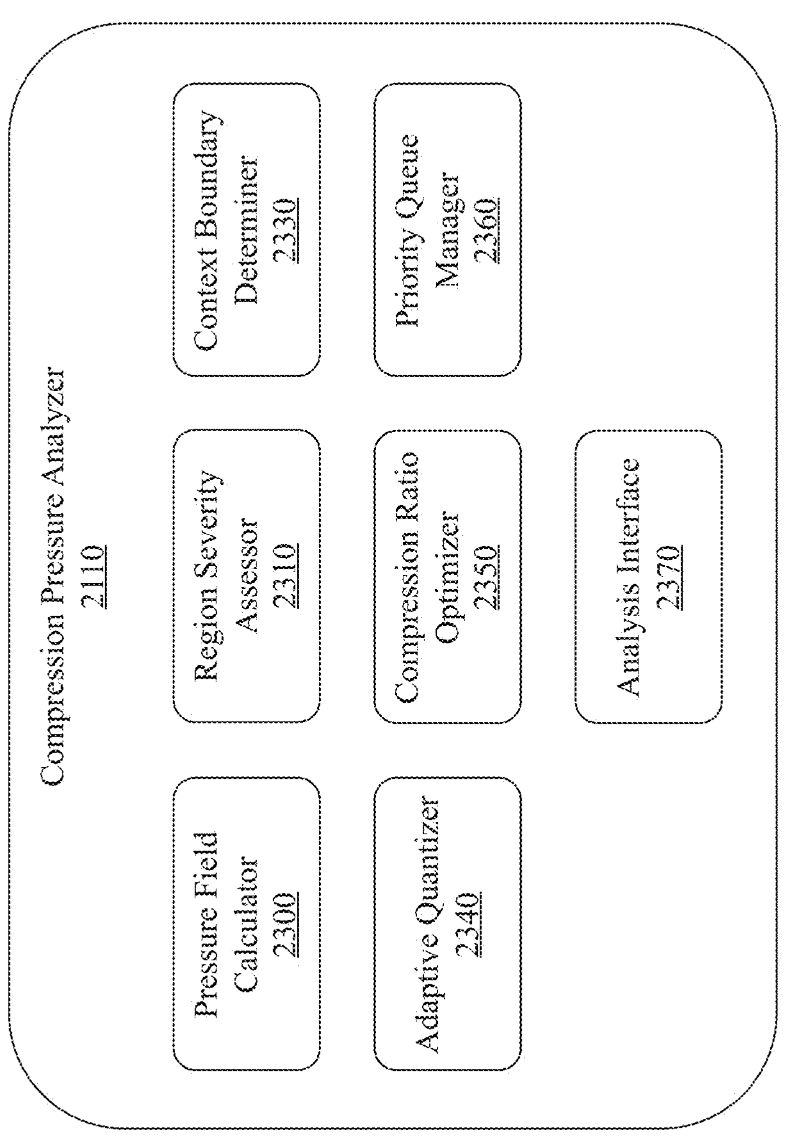
FIG. 23 is a block diagram illustrating an exemplary architecture of a component within a persistent cognitive machine (PCM) configured to perform latent anomaly detection with variable transmission, a compression pressure analyzer.

FIG. 23 is a block diagram illustrating an exemplary architecture of a component within a persistent cognitive machine (PCM) configured to perform latent anomaly detection with variable transmission, a compression pressure analyzer. Compression pressure analyzer 2110 transforms anomaly data into transmission decisions by calculating semantic density, estimating severity, defining contextual boundaries, applying adaptive quantization, optimizing compression ratios, managing prioritization, and exposing its results through an analysis interface. The subcomponents include but are not limited to a pressure field calculator 2300, a region severity assessor 2310, a context boundary determiner 2330, an adaptive quantizer 2340, a compression ratio optimizer 2350, a priority queue manager 2360, and an analysis interface 2370.

Pressure field calculator 2300 derives compression pressure values across regions of the latent manifold 160. Compression pressure is a geometric signal tied to Ricci curvature, local trajectory convergence, and manifold reuse, reflecting the cognitive cost of representing or transmitting a given area. Pressure field calculator 2300 samples geometric measures supplied by cognitive dynamics engine 130, such as flow divergence, local curvature estimates, and bundle density. It outputs a scalar field that quantifies which areas of the manifold are dense, redundant, or diffuse. For example, a region containing repeatedly traversed memory bundles may yield high pressure values, while a novel exploratory region may register lower pressure. Pressure field calculator 2300 forms the quantitative basis upon which subsequent encoding decisions are made.

Region severity assessor 2310 classifies anomalies according to their relative importance. Region severity assessor 2310 consumes anomaly descriptors and scores provided by anomaly detector 2100 and maps them against compression pressure estimates from pressure field calculator 2300. By combining deviation magnitude with semantic density, region severity assessor 2310 computes a severity score that balances how unusual an event is with how much information the region already contains. For example, a moderate deviation inside a high-pressure knowledge bundle may be scored more severely than a large deviation in a sparse exploratory area. Region severity assessor 2310 produces structured severity metrics that are used to drive transmission fidelity and prioritization downstream.

Context boundary determiner 2330 defines the geometric extent of regions to be encoded. Anomalies can spill across bundle borders or overlap multiple manifold neighborhoods. Context boundary determiner 2330 analyzes curvature gradients, flow coherence, and bundle alignments to determine whether an anomaly should be represented as a small, sharply bounded patch or a larger contextual envelope. For instance, if curvature spikes are highly localized, context boundary determiner 2330 may select a narrow boundary that minimizes transmission size. If anomalies distort adjacent flows and affect surrounding bundles, context boundary determiner 2330 enlarges the boundary to capture contextual information necessary for reconstruction. These boundaries ensure that compressed transmissions remain interpretable to manifold repairer 2120 at the receiving system.

Adaptive quantizer 2340 applies encoding schemes that vary precision according to anomaly severity and bandwidth constraints. Adaptive quantizer 2340 uses severity metrics from region severity assessor 2310 and boundaries from context boundary determiner 2330 to determine the appropriate number of bits or encoding resolution per region. High-severity anomalies may be quantized with fine resolution to preserve subtle structural cues, while low-severity anomalies may be represented with fewer bits or symbolic approximations. Adaptive quantizer 2340 adapts dynamically as anomalies evolve over time, permitting fidelity to increase if an anomaly persists or spreads, or to decrease if the anomaly stabilizes. This adaptive process allows anomaly encoding to maintain interpretability while minimizing communication overhead.

Compression ratio optimizer 2350 calculates transmission strategies that balance overall efficiency with anomaly fidelity. Compression ratio optimizer 2350 integrates feedback on channel capacity, mission priorities from goal manager 120, and memory reuse statistics from persistent memory manager 170. It runs optimization routines that adjust quantization levels, context boundaries, and sequencing of anomaly packets to achieve desired compression ratios. For example, if bandwidth temporarily decreases, compression ratio optimizer 2350 can tighten compression on less relevant anomalies while preserving higher fidelity for anomalies deemed more consequential by region severity assessor 2310. By managing trade-offs, compression ratio optimizer

2350 ensures that compression pressure analyzer 2110 adapts flexibly to changing operating conditions.

Priority queue manager 2360 sequences anomaly transmissions according to their severity, temporal urgency, and bandwidth availability. Priority queue manager 2360 maintains a dynamic queue where each anomaly packet is assigned a rank based on severity scores from region severity assessor 2310, optimization directives from compression ratio optimizer 2350, and external priorities provided by goal manager 120. High-severity anomalies rise to the top of the queue, while lower-ranked anomalies may be delayed, aggregated, or dropped if conditions demand. Priority queue manager 2360 allows anomalies with greater importance to be communicated first, ensuring anomaly information is not overwhelmed by background events.

Analysis interface 2370 exposes the outputs of compression pressure analyzer 2110 to the rest of the PCM. Analysis interface 2370 packages anomaly encoding profiles, compression ratios, and priority metadata for consumption by manifold repairer 2120, decoder 180, and output generator 190. It also accepts feedback and policy adjustments, such as preference shifts from goal manager 120 or reorganization updates from dream manager 140. Through analysis interface 2370, compression pressure analyzer 2110 operates as a transparent subsystem whose decisions can be inspected, adjusted, and integrated into broader PCM workflows.

In operation, compression pressure analyzer 2110 follows a multi-stage process: pressure field calculator 2300 quantifies compression pressure across the manifold, region severity assessor 2310 evaluates anomaly severity, context boundary determiner 2330 defines encoding boundaries, adaptive quantizer 2340 applies adaptive quantization, compression ratio optimizer 2350 selects optimized compression ratios, priority queue manager 2360 manages prioritization, and analysis interface 2370 communicates results to downstream systems. For example, consider an anomaly detected in a sensor bundle representing environmental conditions. Pressure field calculator 2300 identifies high curvature in the bundle, region severity assessor 2310 scores the deviation as severe due to reuse density, context boundary determiner 2330 expands boundaries to capture surrounding flows, adaptive quantizer 2340 allocates fine quantization, compression ratio optimizer 2350 balances compression across anomalies to stay within bandwidth, priority queue manager 2360 prioritizes this anomaly for immediate transmission, and analysis interface 2370 provides encoding metadata so manifold repairer 2120 can reconstruct context at the receiving node.

Through this layered structure, compression pressure analyzer 2110 ensures that anomaly transmission is both efficient and semantically meaningful, integrating geometric awareness, adaptive fidelity, and contextual prioritization into a unified subsystem of the PCM.

Figure 24:
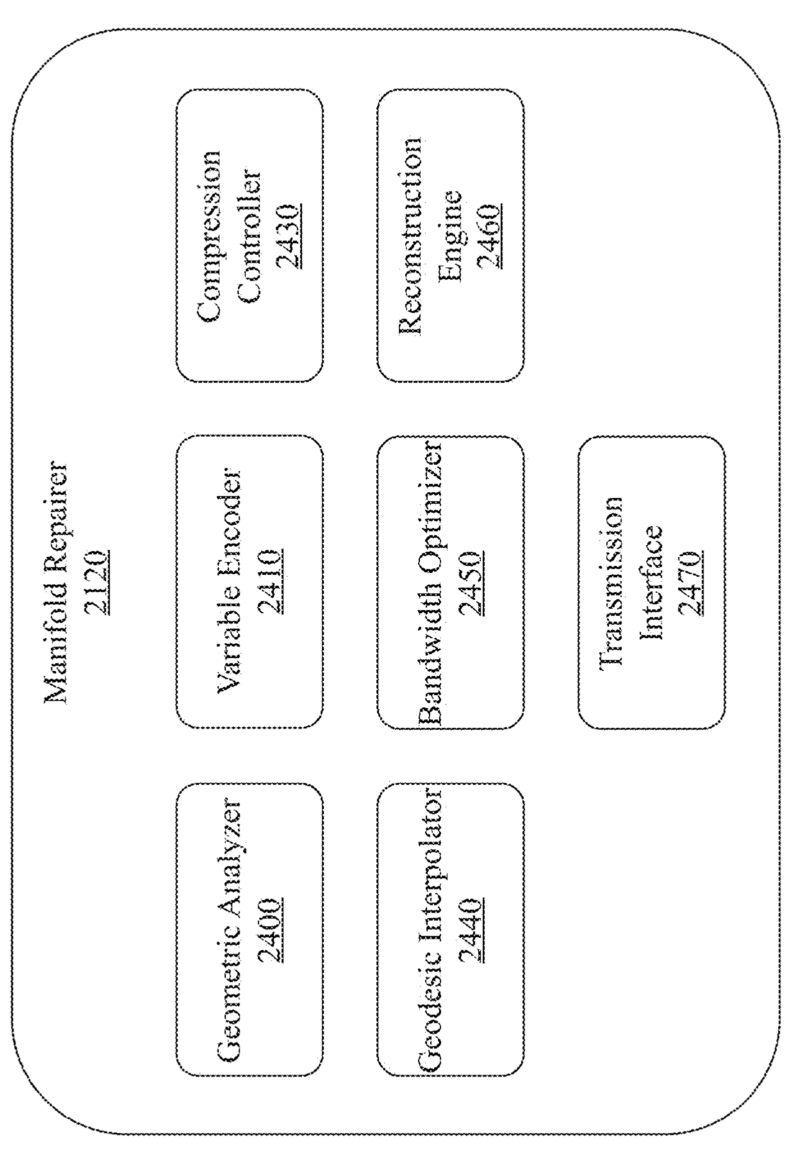
FIG. 24 is a block diagram illustrating an exemplary architecture of a component within a persistent cognitive machine (PCM) configured to perform latent anomaly detection with variable transmission, a manifold repairer.

FIG. 24 is a block diagram illustrating an exemplary architecture of a component within a persistent cognitive machine (PCM) configured to perform latent anomaly detection with variable transmission, a manifold repairer. When anomalies are encoded by compression pressure analyzer 2110 and transmitted with reduced fidelity, the receiving PCM may lack full detail about local curvature, geodesic paths, or bundle coherence. Manifold repairer 2120 addresses these gaps using dedicated subsystems such as a geometric analyzer 2400, a variable encoder 2410, a compression controller 2430, a geodesic interpolator 2440, a bandwidth optimizer 2450, a reconstruction engine 2460, and a transmission interface 2470. Together, these subsystems enable manifold repairer 2120 to infer missing structure, manage reconstruction precision, and maintain manifold continuity.

Geometric analyzer 2400 evaluates incoming anomaly packets against the receiving manifold's existing structure. Geometric analyzer 2400 examines curvature signatures, bundle alignments, and flow fields in the vicinity of received anomalies. By comparing transmitted features against local expectations derived from cognitive dynamics engine 130 and persistent memory manager 170, geometric analyzer 2400 identifies where structural gaps exist and what aspects require interpolation or recombination. For example, if transmitted anomaly data captures the core of a bundle deviation but omits peripheral flows, geometric analyzer 2400 detects inconsistencies at bundle boundaries and flags them for repair. This front-end analysis ensures the repair process is localized and efficient.

Variable encoder 2410 prepares intermediate representations of anomaly data at multiple fidelity levels for use during reconstruction. Variable encoder 2410 generates compact symbolic encodings, mid-resolution summaries, and high-fidelity feature expansions that can be swapped depending on available resources or accuracy requirements. For instance, if bandwidth optimizer 2450 determines reconstruction can tolerate lower fidelity, variable encoder 2410 supplies symbolic approximations. If resources permit, variable encoder 2410 provides more detailed encodings. This multi-resolution support enables manifold repairer 2120 to dynamically adapt repair strategies.

Compression controller 2430 manages how repair processes consume anomaly data and supplemental manifold information. Compression controller 2430 selects between compressed encodings provided by variable encoder 2410 and contextual manifold data provided by geometric analyzer 2400. For example, when the transmitted anomaly packet omits background flows, compression controller 2430 directs the repair process to blend low-resolution anomaly encodings with local curvature fields derived from memory bundles. This blending allows repair to be efficient without reintroducing unnecessary redundancy.

Geodesic interpolator 2440 reconstructs missing trajectory segments across incomplete anomaly regions. Geodesic interpolator 2440 computes geodesic paths consistent with both transmitted anomaly markers and the broader manifold geometry. These interpolated paths fill gaps where compression pressure analyzer 2110 dropped detail, ensuring that manifold traversal remains smooth. For example, if an anomaly affects the curvature of a submanifold but only core features were transmitted, geodesic interpolator 2440 reconstructs peripheral geodesic flows to restore coherence for subsequent reasoning processes.

Bandwidth optimizer 2450 determines how much detail to restore during manifold repair, based on communication constraints and system priorities. Bandwidth optimizer 2450 integrates policies from goal manager 120, channel conditions from transmission interface 2470, and memory reuse statistics from persistent memory manager 170. When bandwidth is limited, bandwidth optimizer 2450 directs manifold repairer 2120 to use symbolic approximations or partial interpolations. When bandwidth is more plentiful, bandwidth optimizer 2450 authorizes higher-fidelity reconstruction using full encodings from variable encoder 2410. By aligning repair fidelity with resource availability, bandwidth optimizer 2450 ensures that reconstruction supports both efficiency and semantic integrity.

Reconstruction engine 2460 performs the actual reassembly of manifold regions affected by anomalies. Reconstruction engine 2460 integrates anomaly data, interpolated geodesics, and bundle information into a coherent structure. This may involve smoothing curvature transitions, merging partial anomaly features with pre-existing bundles, and restoring continuity in the attention vector field. For example, when a sparse anomaly packet represents only the high-pressure center of a disruption, reconstruction engine 2460 expands this into a complete bundle-aligned region by interpolating boundaries and reinforcing connections to nearby bundles. Once applied, the repaired region behaves as though the anomaly had been fully transmitted at high fidelity, enabling seamless reasoning and traversal by cognitive dynamics engine 130.

Transmission interface 2470 connects manifold repairer 2120 to upstream and downstream PCM subsystems. Transmission interface 2470 receives anomaly packets, metadata, and compression directives from compression pressure analyzer 2110, and delivers repaired regions to latent manifold 160. It also exchanges repair status with decoder 180 and output generator 190, providing explanations of how anomaly data was reconstructed. In distributed environments, transmission interface 2470 can coordinate with other PCM instances to share repair strategies, enabling federated reconstruction of anomalies across multiple systems.

In operation, manifold repairer 2120 executes a repair pipeline: geometric analyzer 2400 analyzes received anomaly data against manifold expectations, variable encoder 2410 generates encodings at multiple fidelity levels, compression controller 2430 manages compressed versus contextual information, geodesic interpolator 2440 interpolates missing geodesics, bandwidth optimizer 2450 decides on reconstruction fidelity, reconstruction engine 2460 rebuilds coherent manifold regions, and transmission interface 2470 interfaces with the broader PCM. For example, in a scenario where anomaly detector 2100 flags a bundle disruption, compression pressure analyzer 2110 transmits only high-pressure anomaly features, and manifold repairer 2120 reconstructs the missing details locally. Geometric analyzer 2400 identifies the missing flows, geodesic interpolator 2440 interpolates trajectories, reconstruction engine 2460 rebuilds the bundle structure, and transmission interface 2470 updates latent manifold 160 with a stable repaired region.

Through these coordinated subsystems, manifold repairer 2120 restores continuity and coherence to the latent manifold after compressed anomaly transmission, ensuring that compression decisions made upstream do not prevent the PCM from maintaining stable, semantically aligned cognitive geometry.

Figure 25:
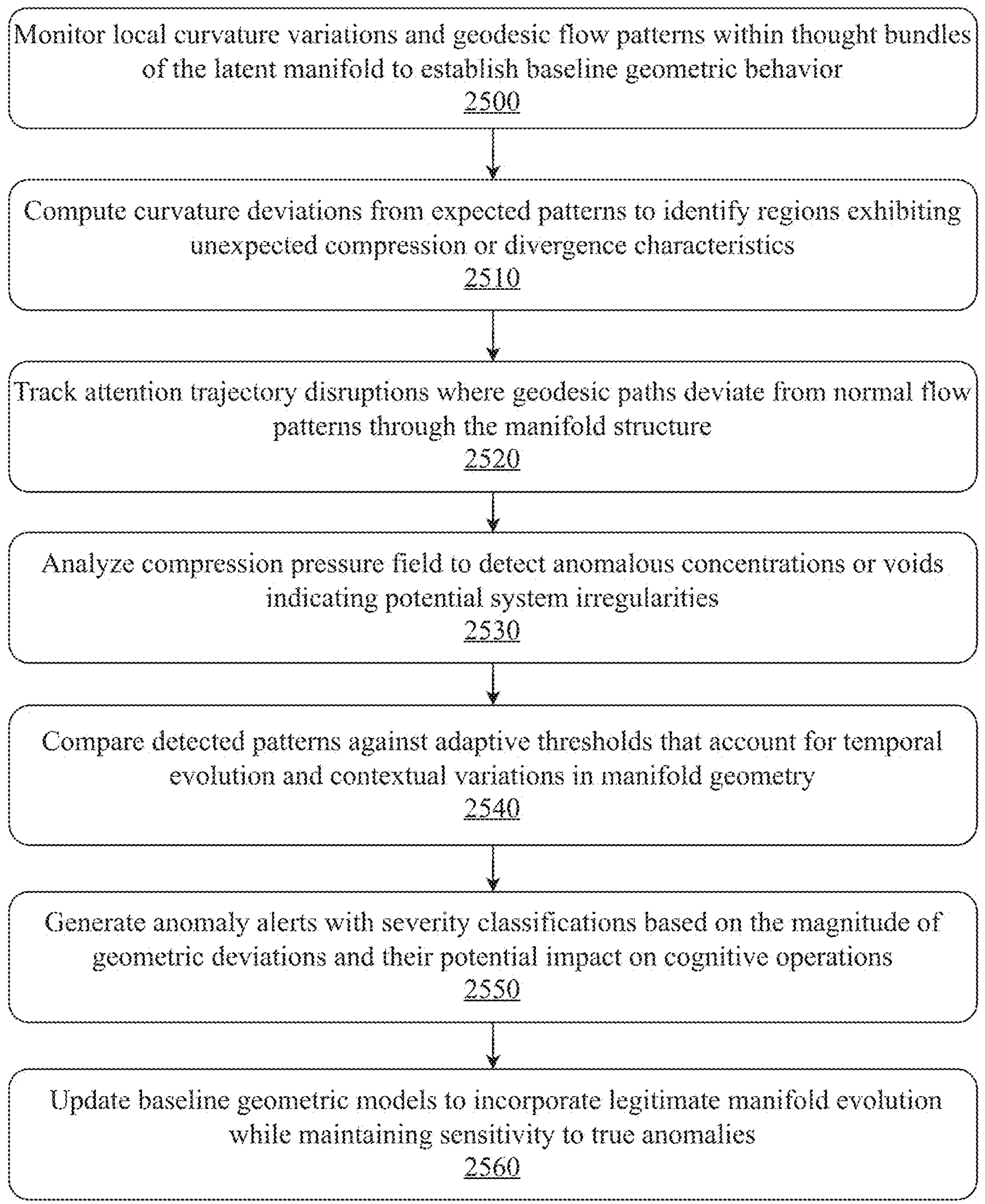
FIG. 25 is a flow diagram illustrating an exemplary method for implementing multi-level cognitive processing through hierarchically nested latent manifolds.

FIG. 25 is a flow diagram illustrating an exemplary method for implementing multi-level cognitive processing through hierarchically nested latent manifolds. In a first step 2500, monitor local curvature variations and geodesic flow patterns within thought bundles of the latent manifold to establish baseline geometric behavior. This involves observing the natural curvature values associated with regions of the manifold and tracking how geodesic paths normally traverse those regions. By continuously measuring curvature and flow stability across thought bundles, a baseline model of expected geometric behavior is established. This baseline provides a reference frame against which deviations can later be identified.

In a step 2510, compute curvature deviations from expected patterns to identify regions exhibiting unexpected compression or divergence characteristics. Once baseline curvature has been established, subsequent curvature measurements are compared against the reference model. Regions where curvature increases or decreases in unexpected ways can signal areas of abnormal compression or divergence, indicating that the underlying semantic structure of the thought bundle has been altered. These deviations highlight candidate regions for anomaly classification.

In a step 2520, track attention trajectory disruptions where geodesic paths deviate from normal flow patterns through the manifold structure. Attention trajectories typically follow smooth, predictable geodesics shaped by prior memory and goal alignment. By tracking these trajectories over time, deviations such as turbulence, divergence, or abrupt shifts are detected. These disruptions represent departures from expected flow dynamics and are indicative of anomalies in the manifold's geometric structure.

In a step 2530, analyze the compression pressure field to detect anomalous concentrations or voids indicating potential irregularities. Compression pressure is a scalar field derived from curvature that reflects the cognitive effort associated with traversing specific regions of the manifold. By examining this field, concentrations of unusually high pressure or voids of unexpectedly low pressure can be identified. These irregularities provide further evidence of anomalous behavior, highlighting regions where information density or semantic structure has changed unexpectedly.

In a step 2540, compare detected patterns against adaptive thresholds that account for temporal evolution and contextual variations in manifold geometry. Thresholding ensures that only deviations beyond a meaningful level are treated as anomalies. Adaptive thresholds are used so that the detection process remains sensitive to true irregularities while avoiding false positives caused by normal manifold evolution. These thresholds may adjust over time to reflect both short-term fluctuations and long-term structural changes.

In a step 2550, generate anomaly alerts with severity classifications based on the magnitude of geometric deviations and their potential impact on cognitive operations. Anomaly alerts serve as outputs of the detection method, communicating both the presence of an anomaly and its relative importance. Severity classifications are derived from factors such as the size of curvature deviations, the degree of attention trajectory disruption, and the impact of compression pressure changes. These classifications allow anomalies to be prioritized for downstream handling.

In a step 2560, update baseline geometric models to incorporate legitimate manifold evolution while maintaining sensitivity to true anomalies. The latent manifold is dynamic, evolving through repeated traversal and use. To remain effective, baseline models are periodically updated with confirmed non-anomalous changes so that natural evolution is captured. At the same time, sensitivity to genuine anomalies is preserved by excluding abnormal deviations from the baseline update process. This ensures that the detection method remains accurate, adaptive, and resilient over time.

Figure 26:
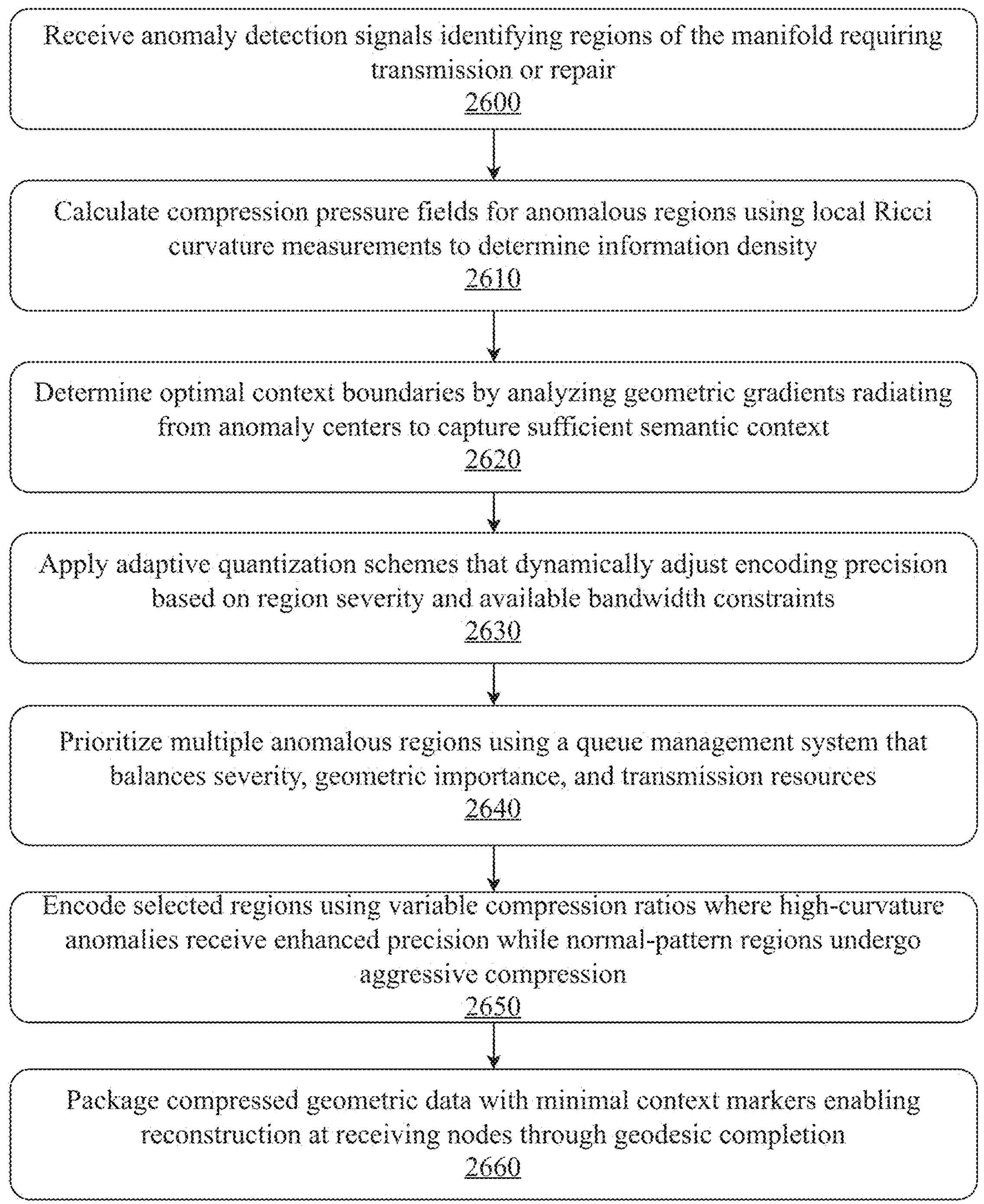
FIG. 26 is a flow diagram illustrating an exemplary method for anomaly detection in a latent manifold.

FIG. 26 is a flow diagram illustrating an exemplary method for anomaly detection in a latent manifold. In a first step 2600, receive anomaly detection signals identifying regions of the manifold requiring transmission or repair. Anomaly detection signals serve as inputs indicating which regions deviate from baseline geometric behavior. These signals may specify anomaly centers, the type of deviation observed, or a severity classification. By receiving these signals, the method isolates the portions of the manifold that require further processing, eliminating the need to transmit unaffected or redundant regions.

In a step 2610, calculate compression pressure fields for anomalous regions using local Ricci curvature measurements to determine information density. Compression pressure fields quantify the traversal effort or representational density of specific regions. By computing these fields, anomalies can be evaluated in terms of how compressed or divergent the manifold structure has become around them. High compression pressure corresponds to dense or heavily reused structures, while lower pressure indicates underexplored or diffuse areas. This measurement provides a scalar basis for guiding compression and transmission decisions.

In a step 2620, determine optimal context boundaries by analyzing geometric gradients radiating from anomaly centers to capture sufficient semantic context. Anomalies may influence not only their immediate centers but also surrounding regions. By examining gradients in curvature, flow coherence, and compression pressure, boundaries are defined that balance minimal size with sufficient coverage. Narrow boundaries reduce transmission overhead, while broader boundaries ensure anomalies are not stripped of necessary context for interpretation. This step ensures transmitted data retains semantic continuity with the manifold.

In a step 2630, apply adaptive quantization schemes that dynamically adjust encoding precision based on region severity and available bandwidth constraints. Encoding precision is varied to reflect both the importance of an anomaly and the transmission resources available at the time. Severe anomalies may be encoded with fine resolution to preserve detail, while less significant anomalies or background regions are encoded at lower resolution. Bandwidth conditions further shape quantization levels, allowing transmission to flexibly scale with resource availability.

In a step 2640, prioritize multiple anomalous regions using a queue management system that balances severity, geometric importance, and transmission resources. When several anomalies are present, they cannot always be transmitted simultaneously. Prioritization ensures that anomalies with higher severity or greater geometric impact are handled first. A balancing mechanism may also account for transmission costs, ensuring that limited resources are allocated where they provide the most meaningful contribution.

In a step 2650, encode selected regions using variable compression ratios where high-curvature anomalies receive enhanced precision while normal-pattern regions undergo aggressive compression. Encoding strategies are therefore non-uniform: areas of high information density retain greater detail, while predictable or redundant areas are compressed more aggressively. This variability achieves extreme compression while preserving essential anomaly characteristics.

In a step 2660, package compressed geometric data with minimal context markers enabling reconstruction at receiving nodes through geodesic completion. Rather than transmitting every detail, compressed data includes sufficient markers such as anomaly centers, curvature indicators, or boundary outlines. These markers allow a receiving entity to reconstruct missing details by leveraging geodesic interpolation and manifold continuity. This enables efficient communication of anomalies without transmitting full manifold states.

Figure 27:
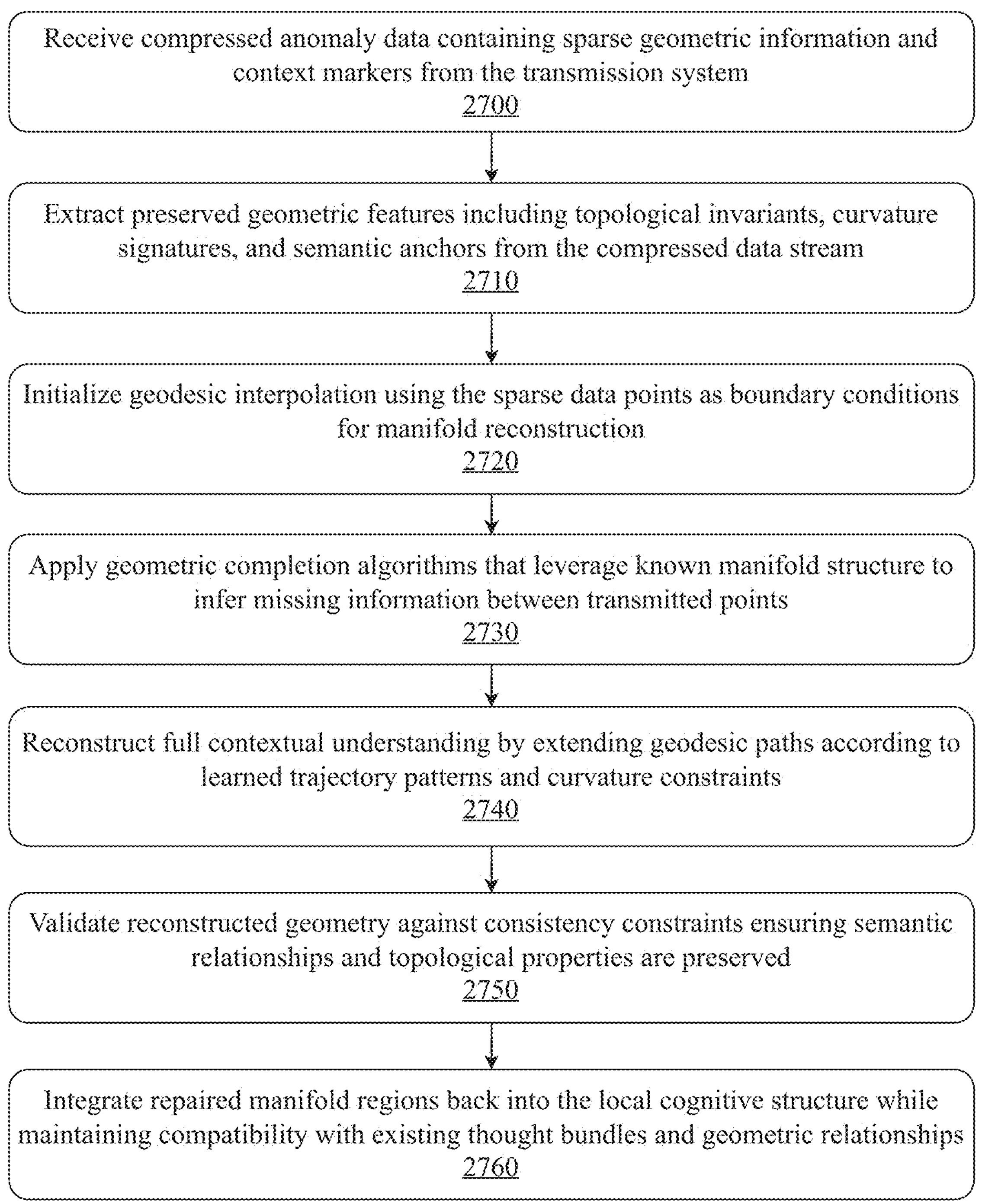
FIG. 27 is a flow diagram illustrating an exemplary method for reconstructing anomalies transmitted in compressed or sparse form within a latent manifold.

FIG. 27 is a flow diagram illustrating an exemplary method for reconstructing anomalies transmitted in compressed or sparse form within a latent manifold. In a first step 2700, receive compressed anomaly data containing sparse geometric information and context markers from the transmission system. The compressed anomaly data represents a reduced subset of the anomaly, preserving only key geometric descriptors such as curvature spikes, flow divergences, or positional anchors. Context markers, such as anomaly centers or bounding coordinates, provide reference points that allow the receiving side to align sparse data with its local manifold structure.

In a step 2710, extract preserved geometric features including topological invariants, curvature signatures, and semantic anchors from the compressed data stream. Topological invariants represent structural properties that remain consistent under compression, such as the presence of a loop, hole, or connected component. Curvature signatures describe local bending or compression characteristics that identify the anomaly's unique shape. Semantic anchors are landmark-like features that maintain alignment with established thought bundles. Extracting these preserved features ensures that even a sparse anomaly transmission can be reconstructed coherently.

In a step 2720, initialize geodesic interpolation using the sparse data points as boundary conditions for manifold reconstruction. Sparse anomaly data often consists of points along anomaly boundaries or central features. By using these preserved points as constraints, geodesic interpolation extends smooth paths through the manifold that connect them. This interpolation fills gaps left by compression, ensuring anomaly reconstruction aligns with the underlying geometry of the latent space.

In a step 2730, apply geometric completion algorithms that leverage known manifold structure to infer missing information between transmitted points. These algorithms may include methods for curvature smoothing, trajectory extrapolation, or bundle-based alignment. By exploiting patterns learned from prior manifold evolution, missing data is inferred rather than transmitted. This allows the receiving side to restore the anomaly to a more complete form without requiring full transmission of all details.

In a step 2740, reconstruct full contextual understanding by extending geodesic paths according to learned trajectory patterns and curvature constraints. Attention trajectories and curvature gradients captured during prior use provide a basis for extending sparse anomaly data into complete structures. By following trajectory continuity rules and respecting curvature distributions, anomalies are expanded into coherent subregions of the manifold that capture both their local detail and global context.

In a step 2750, validate reconstructed geometry against consistency constraints ensuring semantic relationships and topological properties are preserved. Validation may include checking that reconstructed bundles remain consistent with established semantic neighborhoods, confirming that interpolated paths converge appropriately, or verifying that reconstructed regions do not introduce distortions inconsistent with surrounding manifold structure. This step ensures that reconstruction produces geometrically valid and semantically meaningful results.

In a step 2760, integrate repaired manifold regions back into the local cognitive structure while maintaining compatibility with existing thought bundles and geometric relationships. Repaired regions are incorporated as persistent subspaces, aligned with adjacent bundles and stabilized by existing manifold curvature. This integration ensures that reconstructed anomalies not only restore local structure but also maintain continuity with the broader manifold, preserving both memory coherence and semantic integrity.

Hardware Architecture

Figure 28:
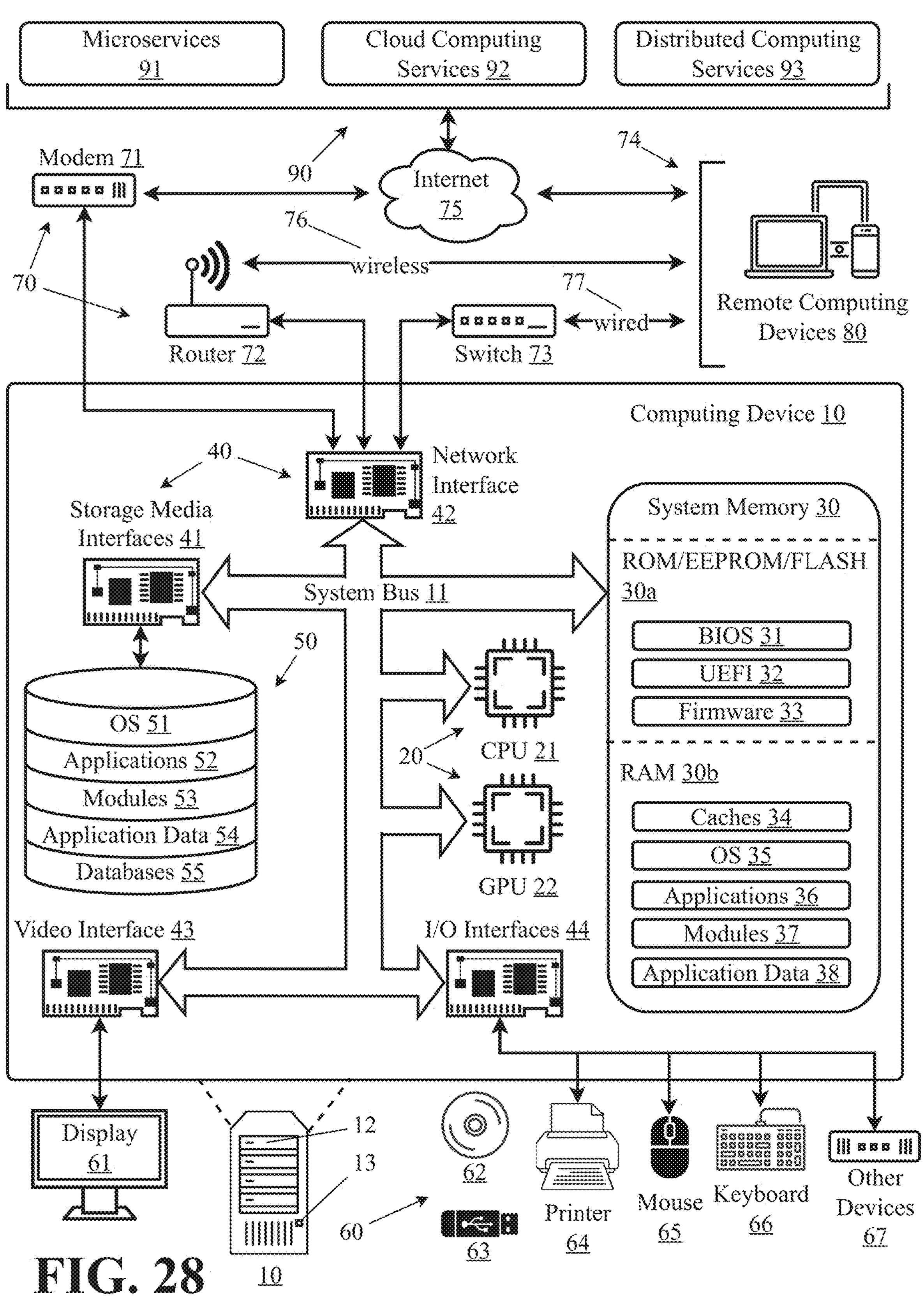
FIG. 28 illustrates an exemplary computing environment on which an embodiment described herein may be implemented.

FIG. 28 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory **30*a* is not erased when power to the memory is removed, and includes memory types such as read only memory (ROM), electronically-erasable programmable memory (EEPROM), and rewritable solid state memory (commonly known as “flash memory”). Non-volatile memory 30***a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Container provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Federated distributed computing services 93 provide large-scale processing using multiple interconnected computers or nodes to solve computational problems or perform tasks collectively. In federated distributed computing, the processing and storage capabilities of multiple machines are leveraged to work together as a unified system, even when different tiers or tessellations may have limited or even no visibility into the resources and processing layer up or downstream. Federated distributed computing services are designed to address problems that cannot be efficiently solved by a single computer or that require large-scale computational power and require dynamism and workload distribution for economic, security or privacy reasons not well supported by canonical distributed computing resources; e.g. most commonly cloud-based computing applications, resources or analytics. Federated DCG coordinated variants of these services enable superior decentralization and further enhance parallel processing, fault tolerance, and scalability by distributing tasks across multiple tiers or tessellations while enabling computing process dependency calculation with varying degrees of visibility, assurance and privacy or security based on constituent computing system, network, workload and user or provider needs and preferences as well as practical legal and regulatory concerns to include but not limited to data localization, national data transfer restrictions, privacy and consumer protections, wiretap/telecommunications monitoring requirements, encryption and data routing and intermediate processing restrictions.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computer system comprising a hardware memory, wherein the computer system is configured to execute software instructions stored on nontransitory machine-readable storage media that:

maintain a latent manifold as a geometric substrate for cognitive operations, wherein the latent manifold evolves through use;

encode inputs into geometric structures within the latent manifold, wherein semantic relationships are represented through geometric properties including distance and curvature;

compute paths through the latent manifold for cognitive processing, wherein the paths are influenced by the geometric structure of the manifold;

monitor curvature variations, geodesic flow patterns, and compression pressure fields within the latent manifold to identify anomalous regions exhibiting irregular geometric behavior;

apply variable transmission encoding to the anomalous regions using adaptive quantization schemes or variable compression ratios that preserve anomaly-defining features while reducing transmission overhead;

reconstruct transmitted anomalies at a receiving node by performing geodesic interpolation and geometric completion to restore coherence of the latent manifold; and generate outputs by traversing the latent manifold and decoding geometric information into user-interpretable responses.

2. The computer system of claim 1, wherein the computer system is further configured to store persistent representations as geometric regions within the latent manifold, such that frequently accessed representations develop characteristic geometric properties that facilitate future access.

3. The computer system of claim 1, wherein the software instructions further:

organize persistent representations into thought bundles comprising coherent submanifolds of semantically related concepts, wherein the thought bundles support operations including consolidation, expansion, and recombination.

4. The computer system of claim 1, wherein the software instructions further:

execute autonomous reorganization of the latent manifold during idle periods, including perturbation of existing structures, synthesis of new connections between disparate regions, and removal of unused or redundant structures.

5. The computer system of claim 1, wherein the software instructions further:

implement a distributed thought cache that stores frequently accessed geometric structures, wherein cache hits enable direct response generation without full path computation through the latent manifold.

6. The computer system of claim 1, wherein the software instructions further:

track activation energy for each persistent representation, wherein representations with low activation energy undergo thermodynamic decay and eventual removal from the latent manifold.

7. The computer system of claim 1, wherein the software instructions further:

maintain bidirectional attention fields that support both forward exploration toward goals and reverse traversal along previously computed paths, enabling backtracking and path revision.

8. The computer system of claim 1, wherein the software instructions further:

establish goal potential fields that create attractive forces within the latent manifold, guiding path computation toward semantically relevant regions for achieving specific objectives.

9. The computer system of claim 1, wherein the software instructions further:

implement hierarchical organization with multiple nested latent manifolds operating at different levels of abstraction, wherein paths can traverse between abstraction levels through geometric bridges.

10. A method for a persistent cognitive computation through geometric representation of thought in a dynamic latent manifold, comprising the steps of:

maintaining a latent manifold as a geometric substrate for cognitive operations, wherein the latent manifold evolves through use;

encoding inputs into geometric structures within the latent manifold, wherein semantic relationships are represented through geometric properties including distance and curvature;

computing paths through the latent manifold for cognitive processing, wherein the paths are influenced by the geometric structure of the manifold;

monitoring curvature variations, geodesic flow patterns, and compression pressure fields within the latent manifold to identify anomalous regions exhibiting irregular geometric behavior;

applying variable transmission encoding to the anomalous regions using adaptive quantization schemes or variable compression ratios that preserve anomaly-defining features while reducing transmission overhead;

reconstructing transmitted anomalies at a receiving node by performing geodesic interpolation and geometric completion to restore coherence of the latent manifold; and generating outputs by traversing the latent manifold and decoding geometric information into user-interpretable responses.

11. The method of claim 10, further comprising the step:

storing persistent representations as geometric regions within the latent manifold, such that frequently accessed representations develop characteristic geometric properties that facilitate future access.

12. The method of claim 10, further comprising the step:

organizing persistent representations into thought bundles comprising coherent submanifolds of semantically related concepts, wherein the thought bundles support operations including consolidation, expansion, and recombination.

13. The method of 10, further comprising the step:

executing autonomous reorganization of the latent manifold during idle periods, including perturbation of existing structures, synthesis of new connections between disparate regions, and removal of unused or redundant structures.

14. The method of claim 10, further comprising the step:

implementing a distributed thought cache that stores frequently accessed geometric structures, wherein cache hits enable direct response generation without full path computation through the latent manifold.

15. The method of claim 10, further comprising the step:

tracking activation energy for each persistent representation, wherein representations with low activation energy undergo thermodynamic decay and eventual removal from the latent manifold.

16. The method of claim 10, further comprising the step:

maintaining bidirectional attention fields that support both forward exploration toward goals and reverse traversal along previously computed paths, enabling backtracking and path revision.

17. The method of claim 10, further comprising the step:

establishing goal potential fields that create attractive forces within the latent manifold, guiding path computation toward semantically relevant regions for achieving specific objectives.

18. The method of claim 10, further comprising the step:

implementing hierarchical organization with multiple nested latent manifolds operating at different levels of abstraction, wherein paths can traverse between abstraction levels through geometric bridges.

* * * * *